(12) United States Patent
Russell et al.

(10) Patent No.: US 6,391,400 B1
(45) Date of Patent: May 21, 2002

(54) THERMAL CONTROL FILMS SUITABLE FOR USE IN GLAZING

(76) Inventors: Thomas A. Russell, 7 Mustard Rd., Rancho Palos Verdes, CA (US) 90275; Michael L. Fulton, 2155 Havemeyer La., Redondo Beach, CA (US) 90276

( * ) Notice: Subject to any disclaimer, the term of this patent is extended or adjusted under 35 U.S.C. 154(b) by 0 days.

(21) Appl. No.: 09/057,077

(22) Filed: Apr. 8, 1998

(51) Int. Cl.[7] ......................... B32B 17/00; B32B 18/00; B32B 27/36; B60J 1/00
(52) U.S. Cl. ......................... 428/34; 428/332; 428/426; 428/430; 428/212; 359/359; 52/786.11; 52/786.12; 296/84.1; 296/96.14
(58) Field of Search ......................... 359/359; 428/426, 428/430, 332, 34, 212; 52/786.11, 786.12; 296/84.1, 96.14

(56) References Cited

U.S. PATENT DOCUMENTS

| 1,425,967 A | 8/1922 | Hoffman | 313/112 |
| 2,412,496 A | 12/1946 | Dimmick | 359/588 |

(List continued on next page.)

FOREIGN PATENT DOCUMENTS

| WO | WO 97/01778 | 1/1997 |
| WO | WO 99/25173 | 5/1999 |

(List continued on next page.)

OTHER PUBLICATIONS

Ando et al., 1991, "Solar Control Glass with Neutral Color for Automobiles," International Congress and Exposition, Detroit Michigan, Feb. 25–Mar. 1, 1991, published by Society of Automotive Engineers, No. 910541, pp. 1–7.

Buchel et al., 1993, "Properties of $TiO_2$ and $SiO_2$ Films Prepared by Ion–Assisted Deposition Using a Gridless End–Hall Ion Source," Society of Vacuum Coaters, 36th Annual Technical Conference Proceedings, pp. 82–87.

Chiou, 1986, "Application of Solar–Powered Ventilator in Automobiles," Automobile Heating and Cooling SP–668, published by Society of Automotive Engineers, Inc., No. 860585, pp. 13–22.

(List continued on next page.)

*Primary Examiner*—Paul Thibodeau
*Assistant Examiner*—Ramsey Zacharia
(74) *Attorney, Agent, or Firm*—Stout, Uxa, Buyan & Mullins, LLP

(57) ABSTRACT

This invention pertains to coated polymer sheets which are useful as visibly transparent heat reflective thermal control films and which are suitable for use in glazing applications. The coated polymer sheets are characterized by a high transmission of visible radiation (i.e., visibly transparent) and a high reflectance at one or more near infrared radiation center wavelengths (i.e., heat reflective), and rely primarily on the interference effects of the dielectric layers to achieve these results. More specifically, the present invention pertains to thermal control films comprising (a) a thin flexible polymeric sheet having a first face and an opposite second face and a thickness of from 0.1 to 100 mils; and, (b) a multilayer coating adhered to said first face, said coating comprising two or more contiguous alternating layers of high and low index of refraction inorganic dielectric material of optical thickness approximately equal to one quarter of an infrared center wavelength, $\lambda_0$, between 750 and 2000 nm; said thermal control film characterized by an average transmittance of visible radiation of wavelength 380 to 750 nm at 0° incidence of at least 50%; said thermal control film further characterized an average reflectance of infrared radiation in an infrared radiation band which is at least 100 nm wide and falls within the wavelength band 750 to 2000 nm, at 0° incidence, of at least 50%.

64 Claims, 19 Drawing Sheets

U.S. PATENT DOCUMENTS

| | | | |
|---|---|---|---|
| 2,624,238 A | 1/1953 | Widdop et al. | 359/359 |
| 2,668,478 A | 2/1954 | Schroder | 359/359 |
| 3,279,317 A | 10/1966 | Ploke | 359/359 |
| 3,290,203 A | 12/1966 | Antonson et al. | 428/336 |
| 3,410,625 A | 11/1968 | Edwards | 359/359 |
| 3,637,294 A | 1/1972 | Berthold, III | 359/582 |
| 3,681,179 A | 8/1972 | Theissen | 428/336 |
| 3,697,153 A | 10/1972 | Zycha | 359/588 |
| 3,956,559 A | 5/1976 | Wildorf | 428/214 |
| 4,095,013 A | 6/1978 | Burger | 428/522 |
| 4,157,417 A | 6/1979 | Murphy | 428/344 |
| 4,226,910 A | 10/1980 | Dahlen et al. | 428/336 |
| 4,229,066 A | 10/1980 | Rancourt et al. | 359/359 |
| 4,247,599 A | 1/1981 | Hopper | 428/458 |
| 4,335,166 A | 6/1982 | Lizardo et al. | 428/34 |
| 4,337,990 A | 7/1982 | Fan et al. | 359/360 |
| 4,368,945 A | 1/1983 | Fujimorei et al. | 359/360 |
| 4,386,130 A | 5/1983 | Hayashi et al. | 428/215 |
| 4,461,532 A | 7/1984 | Sato et al. | 359/359 |
| 4,565,719 A | 1/1986 | Phillips et al. | 428/34 |
| 4,590,118 A | 5/1986 | Yatabe et al. | 428/215 |
| 4,634,637 A | 1/1987 | Oliver et al. | 428/622 |
| 4,639,069 A | 1/1987 | Yatabe et al. | 359/360 |
| 4,721,349 A | 1/1988 | Fan et al. | 359/360 |
| 4,747,666 A | 5/1988 | Ishida | 359/588 |
| 4,799,745 A | 1/1989 | Meyer et al. | 359/360 |
| 4,853,264 A | 8/1989 | Vincent et al. | 428/34 |
| 4,865,405 A | 9/1989 | Kageyama | 359/359 |
| 4,896,928 A | 1/1990 | Perilloux et al. | 359/359 |
| 4,965,121 A | 10/1990 | Young et al. | 428/213 |
| 4,983,001 A | 1/1991 | Haguida et al. | 359/359 |
| 5,024,895 A | 6/1991 | Kavanagh et al. | 428/437 |
| 5,047,131 A | 9/1991 | Wolfe et al. | 204/192.23 |
| 5,071,206 A | 12/1991 | Hood et al. | 359/360 |
| 5,073,450 A | 12/1991 | Nietering | 428/336 |
| 5,073,451 A | 12/1991 | Iida et al. | 428/336 |
| 5,103,337 A | 4/1992 | Schrenk et al. | 359/359 |
| 5,189,551 A | 2/1993 | Woodard | 359/360 |
| 5,306,547 A | 4/1994 | Hood et al. | 428/213 |
| 5,336,565 A | 8/1994 | Muromachi et al. | 428/432 |
| 5,337,191 A | 8/1994 | Austin | 359/885 |
| 5,377,045 A | 12/1994 | Wolfe et al. | 359/585 |
| 5,424,119 A | 6/1995 | Phillips et al. | 428/328 |
| 5,523,132 A | 6/1996 | Zhang et al. | 428/34.4 |
| 5,563,734 A | 10/1996 | Wolfe et al. | 359/360 |
| 5,571,574 A | 11/1996 | Misiano et al. | 427/536 |
| 5,595,825 A | 1/1997 | Guiselin | 428/428 |
| 5,646,781 A | 7/1997 | Johnson, Jr. | 359/589 |
| 5,776,612 A | 7/1998 | Fisher | 428/426 |
| 5,902,634 A | 5/1999 | Maschwitz et al. | 427/162 |
| 5,956,175 A | 9/1999 | Hojnowski | 359/360 |

FOREIGN PATENT DOCUMENTS

| | | |
|---|---|---|
| WO | WO 99/25660 | 5/1999 |
| WO | WO 99/34431 | 7/1999 |
| WO | WO 99/36257 | 7/1999 |
| WO | WO 99/39224 | 8/1999 |

OTHER PUBLICATIONS

Fulton et al., 1994, "Application of ion–assisted–deposition using a gridless end–Hall ion source for volume manufacturing of thin–film optical filters," *Optical Interference Coatings*, (Florin Abeles, Editor), Proc. SPIE 2253, pp. 374–393.

Fulton et al., 1996, "Approaches explored for producing a variety of ion–assisted–deposited thin–film coatings using an end–Hall ion source," in *Developments in Optical Component Coatings* (Ian Reid, Editor), Proc. SPIE 2276, pp. 114–125.

Granqvist, 1983, "Optical Coatings for Energy Efficiency and Solar Applications: Some Recent Developments," Thin Film Technologies, vol. 401, pp. 330–355.

Huber, 1988, "Physical Characteristics of Heat–Absorbing Glass and Their Influence on the Driver," published by Society of Automotive Engineers, Inc., No. 885052, pp. 427–433.

Hymore et al., 1991, "Development of a Test Procedure for Quantifying Performance Benefits of Solar Control Glazing on Occupant Comfort," International Congress and Exposition, Detroit Michigan, Feb. 25–Mar. 1, 1991, published by Society of Automotive Engineers, No. 910536, pp. 1–8.

Lynam, 1990, "Smart Windows for Automobiles," International Congress and Exposition, Detroit Michigan, Feb. 26–Mar. 2, 1990, published by Society of Automotive Engineers, No. 900419, pp. 1–21.

Macleod, 1995, *Introduction to Thin Film Optical Coatings and Filters*, Thin Film Center, Inc., Tucson, Arizona, pp. 1–45.

Meyers et al., 1987, *Encyclopedia of Physical Science and Technology*, Academic Press, Inc., vol. 6, p. 656–657.

Moyer, 1995, "Analytical and Empirical Evaluation of the Impact of Solar Control Glazing on the Thermal Environment in Vans," International Congress and Exposition, Detroit Michigan, Feb. 27–Mar. 2, 1995, published by Society of Automotive Engineers, No. 950052, pp. 1–13.

R.D. Mathis Company, "Thin Film Evaporation Source Reference," R.D. Mathis Company, Long Beach, California, USA, pp. 1–10.

Southwall Technologies, "1997 Product Guide for High Performance Glazing," publication No. 6/96 100–0160, pp. 1–15, published 1996.

Southwall Technologies, "Solis: Clear Heat Control for Windows," publication No. 6/94 100–1004, published 1994 (4 pages).

Thelen, 1996, "Design of a Hot Mirror: Contest Results," Optics, vol. 35, No. 25, pp. 4966–4977.

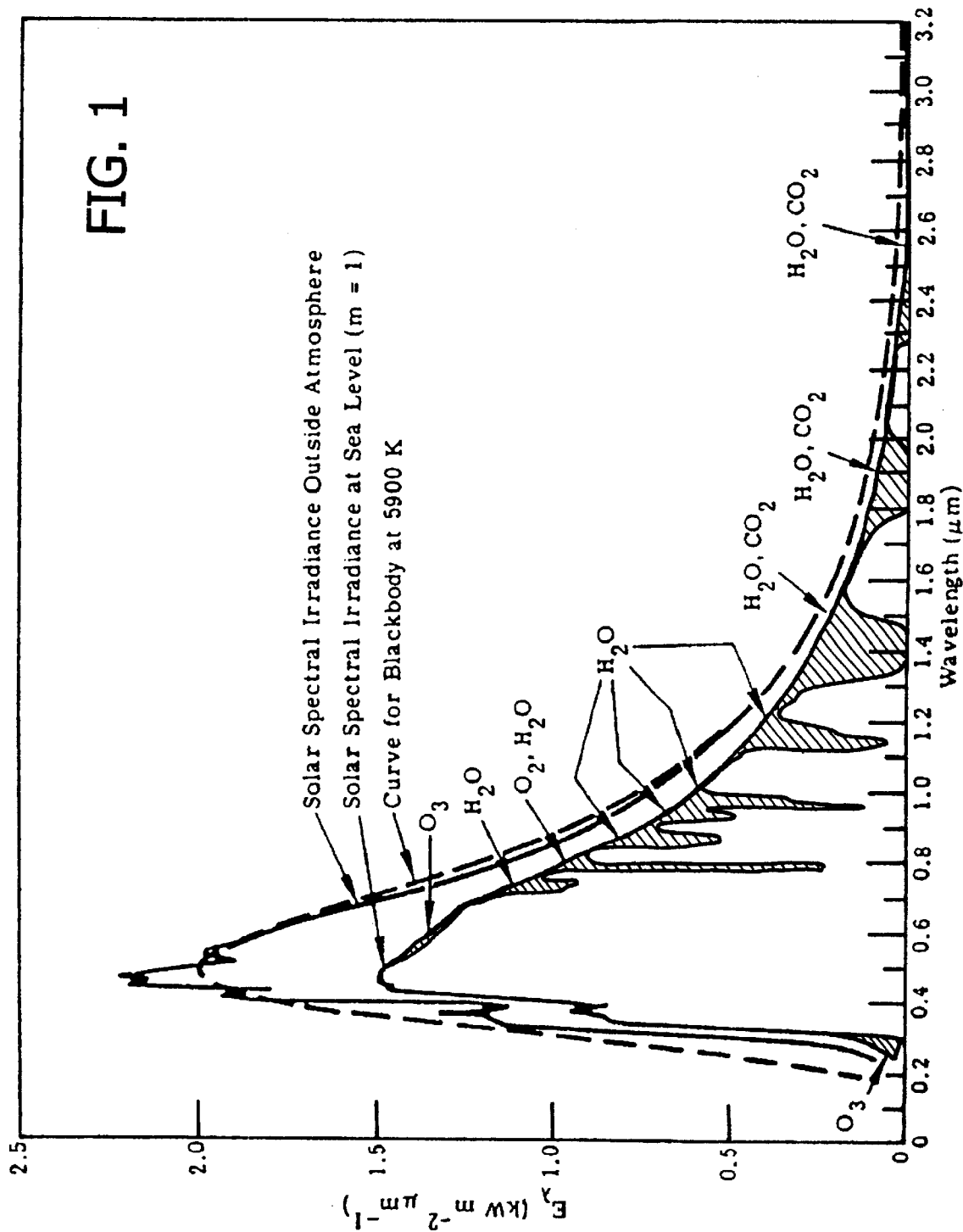

THERMAL CONTROL FILMS SUITABLE FOR USE IN GLAZING

TECHNICAL FIELD

This invention pertains generally to the field of thermal control films. More particularly, the present invention pertains to visibly transparent heat reflective thermal control films which comprise an optical coating and which are suitable for use in glazing applications. More specifically, the present invention pertains to coated polymer sheets which comprise a thin flexible polymeric sheet (which serves as the substrate), and at least one multilayer coating coated thereon, said coating comprising two or more contiguous alternating layers of high and low index of refraction inorganic dielectric material. The coated polymer sheets are characterized by a high transmission of visible radiation (i.e., visibly transparent) and a high reflectance at one or more near infrared radiation center wavelengths (i.e., heat reflective), and rely primarily on the interference effects of the dielectric layers to achieve these results.

BACKGROUND

Throughout this application, various publications, patents, and published patent applications are referred to by an identifying citation; full citations for these documents may be found at the end of the specification immediately preceding the claims. The disclosures of the publications, patents, and published patent specifications referenced in this application are hereby incorporated by reference into the present disclosure to more fully describe the state of the art to which this invention pertains.

The term "glazing" is used herein in its conventional sense and relates to the use of transparent materials (e.g., glass) to fill apertures as in, for example, windows, viewports, and the like. Vehicular glazing generally refers to the use of transparent materials such as windows, windshields, windscreens, canopies, panes, and the like, in vehicles such as automobiles, trains, boats, aircraft, and spacecraft. Architectural glazing generally refers to the use of transparent materials as windows, viewports, skylights, panes, and the like in buildings, such as domestic buildings and commercial buildings.

Conventional window glass, which has been used since medieval times as the glazing material of choice, is highly transparent to visible radiation. Visible light is transmitted through the glass and is absorbed or reflected by materials on the opposite side (e.g., floor, walls, flirniture, plants, and other objects in the interior of a building). These absorbing materials re-emit some of the absorbed radiation according to their temperature. Near ambient temperatures (i.e., ~5 to 40° C.), these objects have a blackbody peak emission in the infrared region at approximately 7–10 microns (see below). Although conventional glass is largely transparent between ~0.2 microns and ~3.5 microns, it is substantially opaque at infrared wavelengths greater than ~4 microns, and the re-radiated heat (e.g., at 7–10 microns and longer wavelengths) is either absorbed by the glass or reflected back (e.g., into the interior of the building). This is the fundamental basis for glass-covered greenhouses.

While windows often enhance the aesthetics and futnctionality of buildings and vehicles, they can also cause undesirable gain or loss of heat. In warm climates, exterior heat may enter through windows, thereby increasing air conditioning loads. In cold climates, interior heat is lost through windows, thereby increasing heating demands. Increases in the size of windows used in automobiles coupled with reductions in the size of vehicular air conditioners have increased the need for vehicle windows which reduce heat load. See, for example, Chiou, 1986; Nyman, 1990; Huber, 1988; Hymore etal., 1991; Lynam, 1990.

Heat loss through a window may arise from a convective/conductive/emissive process, for example, where interior hot air raises the temperature of the glass, by convection, the thermal energy is distributed throughout the glass, by conduction, and some of the thermal energy is emitted or radiated, by emission, to the exterior. Heat loss by emission can be ameliorated by reducing the emissivity of the window glass, for example, by introducing a low emittance or "low E" (for infrared) coating (which is typically a thin metal film). Emissivity or emittance refers to the propensity of a surface to emit or radiate radiation of a specified wavelength, and is quantified as the ratio of radiant flux per unit area emitted by body to that of a blackbody radiator at the same temperature and under the same conditions. Thus, a perfect blackbody has an emissivity of 1.0. Ordinary window glass has an infrared emissivity of about 0.84. Window glass with a "low E" coating has a much lower infrared emissivity, often as low as 0.15, and heat loss through such a window is greatly reduced.

Optical coatings have found widespread application in the field of glazing, particularly as a means to control heat loss and/or heat gain. In many applications, optical coatings are used to "block" the transmission of electromagnetic radiation (e.g., infrared radiation, visible radiation, ultraviolet radiation) to some degree. In some applications, it is desirable to block some or all of the electromagnetic radiation of a particular wavelength band while transmitting some or all of the electromagnetic radiation of another particular wavelength band.

Thus, in one conunon application, an optical coating is employed to substantially block infrared electromagnetic radiation while substantially transmitting visible electromagnetic radiation. Such optical coatings are often referred to as "heat mirrors," "hot mirrors," or "thermal control films." For glazing applications, it is usually desirable that these optical coatings also be substantially visibly transparent.

An important application for optical coatings is as thermal control films for solar radiation. The sun, which is the source of solar radiation, is a modest yellow star with a diameter of about 1.4 million kilometers at an average distance from the earth of about 150 billion kilometers. The sun has interior temperatures on the order of 8 to 40 million K and a surface temperature of about 5800 K. The rate of energy emission from the sun is about $3.8 \times 10^{23}$ kW, of which $1.7 \times 10^{14}$ kW is intercepted by the earth. Of this amount, 30% is reflected, 47% is converted into low temperature heat and re-radiated into space, and about 23% powers the evaporation and precipitation cycle of the earth's biosphere. The extraterrestrial solar irradiance at normal incidence is about 1373 $W/m^2$. At an air mass of one (see below), the irradiance is about 925 $W/m^2$, the bulk of which falls in the wavelength band from about 200 nm (in the ultraviolet) to about 2000 nm (in the near infrared).

To accurately predict solar intensity in the visible region, the sun may be characterized as a blackbody with a temperature e of approximately 5800 K. To accurately predict solar intensity in the infrared region, the sun may be characterized as a blackbody with a temperature of approximately 5900 K. Blackbody radiation may be modeled using a Planck distribution, according to which the energy density in the range $\lambda$ to $\lambda+d\lambda$, denoted $dU(\lambda)$, is given by:

$$dU(\lambda)=[(8\pi hc/\lambda^5)(e^{-hc/\lambda kT})/(1-e^{-hc/\lambda kT})]d\lambda$$

wherein T is the blackbody temperature, $\lambda$ is the wavelength, h is the Planck constant, c is the speed of light, and k is the Boltzmann constant. The wavelength of peak emission, $\lambda_{max}$, as a function of temperature, may be determined for the Planck distribution as:

$$T\lambda_{max}=hc/5k=2.878\times10^{-3}\text{m K}$$

Using this model, and a temperature of 5800 K, the sun's peak emission occurs at approximately 0.50 microns (i.e., 500 nm), near the middle of the visible region. By comparison, a human body with a surface temperature of about 25° C. (~300 K) has peak emission at approximately 9.6 microns, well into the far infrared region. An object which is hot to the touch at about 100° C. (~375 K) has peak emission at approximately 7.7 microns.

Solar radiation is attenuated, both non-selectively and selectively, by the Earth's atmosphere by scattering and absorption processes. The atmospheric constituents primarily responsible for scattering are gas molecules (via Rayleigh scattering), particulates, and water droplets. Absorbing molecules in the atmosphere, such as ozone (i.e., $O_3$), water (i.e., $H_2O$), oxygen (i.e., $O_2$), and carbon dioxide (i.e., $CO_2$) absorb substantial solar intensity at specific wavelengths. The amount of atmospheric absorption depends on the length of the radiation path through the atmosphere, which can be characterized by the so-called "air mass," denoted m, which is defined as the ratio of path length and thickness of atmosphere, that is, $m=1/\cos\eta_z$ where $\eta_z$ is the angle between the sun's rays and the normal to the earth's surface. With the sun directly overhead (e.g., $\eta_z\sim0°$), the air mass is 1; with the sun at the horizon (e.g., $\eta_z\sim85°$), the air mass is ~11. At approximately $\theta_z\sim83°$, only about 10% of visible solar radiation is transmitted.

A graph of the solar intensity outside the atmosphere and at an air mass of one, along with the intensity of emission from a blackbody at 5900 K, all as a function of wavelength from about 200 to about 3200 nm, is shown in FIG. 1 (from Meyers et al., 1987). At sea level, approximately 3% of the total solar irradiance falls in the ultraviolet region (150 to 380 nm), approximately 47% of the total solar irradiance falls in the visible region (380 to 750 nm), approximately 44% falls in the near infrared region (750 to 2000 nm), and approximately 6% falls in the far infrared region (2000 to 10,000 nm).

A common approach to thermal control coatings has been to prepare a coating which transmits most or all of the incident visible radiation, while blocking (reflecting or absorbing) most or all of the incident infrared radiation.

Kirchoff's Law states that, for a given wavelength, the sum of transmitted intensity (T), reflected intensity (R), and absorbed intensity (A) must equal one; that is, T+R+A=1. Transmitted radiation passes through the material without a substantial change in wavelength or intensity, while reflected radiation is reflected without a substantial change in wavelength or intensity. Absorbed radiation is absorbed by the material, usually resulting in an increase in temperature, and some or all of the absorbed intensity may be re-emitted, typically at lower wavelengths in accordance with the material's temperature. Thus, for thermal control films, it is often desirable to have high transmission, low reflectivity, and low absorptivity in the visible region, and to have low transmission, high reflectivity, and low absorptivity in the infrared region.

Suitable materials for use in optical coatings, particularly for those which are useful in glazing applications, are preferably non-toxic, inexpensive, easily available, and required in as thin as possible a layer consistent with durability. A variety of materials have been used as optical coatings, and most of these materials can be broadly classed in two categories, those used for their intrinsic electronic properties (e.g., metals), and those used as optical interference films (e.g., dielectrics), and combinations thereof (e.g., metal-dielectrics).

Metals, and metal-like materials, are characterized by intrinsic electronic and electrical properties which may permit the reflection and/or absorption of incident radiation at the wavelength of interest, while permitting the unimpeded transmission of other wavelengths. Metals which have the lowest absorptivity are preferred, and these include the high performance free-electron metals aluminum, silver, and gold, and alloys of these. Other metals are also used, including, for example, rhodium and alloys thereof (see, for example, Austin, 1994). The reflectance of metal layers may be calculated from measured optical constants (i.e., optical admittance constants n and k). For wavelengths throughout the visible and infrared, such metal layers, even very thin metals layers, are typically highly reflective. In addition, such metals films are also highly absorptive. Nonetheless, metal films can be semitransparent for visible radiation and opaque (reflective and/or absorptive) for thermal infrared radiation if they are sufficiently thin. However, due to the film-forming properties of these metals and the need for continuous uninterrupted layers, thicknesses of at least 10 nm are often necessary, thereby limiting the transmission of visible light to less than about 50%. Typically, the metal layer has a thickness of from about 5 nm to about 20 nm. Even with such thin layers, these metal coatings are invariably characterized by a distinct, and often undesirable, metal tint which is visible to the naked eye.

Examples of metal coatings are described in Wildorf, 1976; Murphy, 1979; Dahlen et al., 1980; Hopper, 1981; Granqvist, 1983; Oliver et al., 1987.

The optical and interference properties of thin coatings of dielectric materials have also been exploited for thermal control. Such interference coatings rely on the interaction of incident radiation with one or more boundaries between materials of high and low indices of refraction. The interference effects are caused primarily by partial reflections at boundaries between layers and recombination of the resulting beams in which their phase differences are significant. By exploiting the optical properties of the one or more thin layers with different indices of refraction, it is possible to substantially reduce or substantially increase reflection or transmission of one or more wavelengths, or wavelength bands, from a surface.

Examples of dielectric coatings are described in Hoffman, 1922; Dimmick, 1946; Widdop et al., 1953; Schroder, 1954; Ploke, 1966; Edwards, 1968; Zycha, 1972; Rancourt et al., 1980; Granqvist, 1983; Sato et al., 1984; Ishida, 1988; Kageyama, 1989; Perilloux et al., 1990; Hagindae tal., 1991; Ando etal., 1991; Thelen, 1996.

Coatings which employ a metal film in combination with a thin dielectric film have also been examined, usually to enhance the reflectance of one wavelength band while reducing the reflectance of another wavelength band (e.g., to improve bandpass properties). Thin layers of dielectric materials may be used to "induce" transmission through the metal layer (and thereby reduce reflection from the metal layer). Nonetheless, such combination films still suffer from a relatively low transmittance of visible light caused by the metal layers.

Examples of metal-dielectric combination coatings are described in Fan et al., 1982, 1988; Hayashi et al., 1983;

Fujimori et al., 1983; Granqvist, 1983; Yatabe etal., 1986, 1987; Phillips etal., 1986, 1995; Meyer etal., 1989; Nistering, 1991; Hood etal., 1991; Woodard, 1993; Hood et al., 1994; Muromachi et al., 1994; Austin, 1994; Belkind et al., 1994, 1996; Wolfe et al., 1996; Mills et al., 1996; Guiselen, 1997.

Until now, the coating materials of choice have not been those which rely on interference effects (e.g., dielectrics), but instead have been those with intrinsic material effects which exhibit optical properties determined by the free electrical conducting carriers within it (e.g., metals), as discussed above. Although multilayer dielectric interference coatings have been examined in the past, they have been largely dismissed as candidates for many practical glazing applications. The need for a relatively thick coating of these brittle materials, coupled with the relatively intensive and expensive methods used for their deposition, has instead led those of skill in the art to develop new materials (e.g., alloys, semiconductors) with improved intrinsic material effects similar to the high performance metals discussed above, rather than pursue dielectric coatings.

The need forflexible thermal control films is well established. Flexible films are useful in a number of applications such as non-planar windows and retrofitting, as well as in the streamlined manufacture of standard windows. A number of such films, which employ primarily metal coatings on polymer sheets and combination metal-dielectric coatings, are commercially available.

Nonetheless, those of skill in the art have generally dismissed the possibility using known relatively thick, brittle, multilayer dielectric interference coatings on flexible substrates. Those of skill in the art have turned away from using dielectric coatings on flexible substrates for a number of practical reasons, including (1) the significant differential in the thermal expansion of the dielectric coating materials and the substrate, which often results in mechanical failure of the film; (2) the intrinsic stress (e.g., compressive, tensile) of the coating materials which can deform the substrate and often leads to a loss of adhesion, and (3) the need to heat the substrate for conventional methods for dielectric deposition, which is detrimental to temperature-sensitive substrates, such as polymeric sheets.

The present invention addresses these and other needs, and pertains to coated polymer sheets which comprise a thin flexible polymeric sheet (which serves as the substrate), and at least one multilayer coating coated thereon, said coating comprising at least two contiguous alternating layers of high and low index of refraction inorganic dielectric material. The coated polymer sheets are characterized by a high transmission of visible radiation (i.e., visibly transparent) and a high reflectance at one or more near infrared radiation center wavelengths (i.e., heat reflective), and rely primarily on the interference effects of the dielectric layers to achieve these results.

SUMMARY OF THE INVENTION

One aspect of the present invention pertains to a thermal control film comprising: (a) a thin flexible polymeric sheet having a first face and an opposite second face and a thickness of from 0.1 to 100 mils; and, (b) a multilayer coating adhered to said first face, said coating comprising two or more contiguous alternating layers of high and low index of refraction inorganic dielectric material of optical thickness approximately equal to one quarter of an infrared center wavelength, $\lambda_0$, between 750 and 2000 nm; said thermal control film characterized by an average transmittance of visible radiation of wavelength 380 to 750 nm at 0° incidence of at least 50%; said thermal control film further characterized an average reflectance of infrared radiation in an infrared radiation band which is at least 100 nm wide and falls within the wavelength band 750 to 2000 nm, at 0° incidence, of at least 50%.

Another aspect of the present invention pertains to a thermal control film comprising: (a) a thin flexible polymeric sheet having a first face and an opposite second face and a thickness of from 0.1 to 100 mils; and, (b) a first multilayer coating adhered to said first face, said coating comprising two or more contiguous alternating layers of high and low index of refraction inorganic dielectric material of optical thickness approximately equal to one quarter of a first infrared center wavelength, $\lambda_1$, between 750 and 2000 nm; (c) a second multilayer coating adhered to said second face, said coating comprising two or more contiguous alternating layers of high and low index of refraction inorganic dielectric material of optical thickness approximately equal to one quarter of a second infrared center wavelength, $\lambda_2$, between 750 and 2000 nm; said thermal control film characterized by an average transmittance of visible radiation of wavelength 380 to 750 nm at 0° incidence of at least 50%; said thermal control film further characterized an average reflectance of infrared radiation in an infrared radiation band which is at least 100 nm wide and falls within the wavelength band 750 to 2000 nm, at 0° incidence, of at least 50%.

Another aspect of the present invention pertains to a composite thermal control film comprising: (i) a first thermal control film comprising: (a) a first thin flexible polymeric sheet having a first face and an opposite second face and a thickness of from 0.1 to 100 mils; and, (b) a first multilayer coating adhered to said first face of said first sheet, said coating comprising two or more contiguous alternating layers of high and low index of refraction inorganic dielectric material of optical thickness approximately equal to one quarter of a first infrared center wavelength, $\lambda_1$, between 750 and 2000 nm; (ii) a second thermal control film comprising: (a) a second thin flexible polymeric sheet having a first face and an opposite second face and a thickness of from 0.1 to 100 mils; and, (b) a second multilayer coating adhered to said first face of said second sheet, said coating comprising two or more contiguous alternating layers of high and low index of refraction inorganic dielectric material of optical thickness approximately equal to one quarter of a second infrared center wavelength, $\lambda_2$, between 750 and 2000 nm; wherein said first thermal control film is adhered to said second thermal control film; said composite thermal control film characterized by an average transmittance of visible radiation of wavelength 380 to 750 nm at 0° incidence of at least 50%; said thermal control film further characterized an average reflectance of infrared radiation in an infrared radiation band which is at least 100 nm wide and falls within the wavelength band 750 to 2000 nm, at 0° incidence, of at least 50%.

Another aspect of the present invention pertains to a glazing assembly comprising: (i) a glazing substrate having at least one face; and, (ii) a thermal control film or a composite thermal control film, as described herein, adhered to said face. Another aspect of the present invention pertains to a glazing assembly comprising: (i) a first glazing substrate; (ii) a second glazing substrate; and, (iii) a thermal control film or a composite thermal control film, as described herein, positioned between said first and second glazing substrates, and adhered to said first and second glazing substrates. Another aspect of the present invention pertains to a glazing assembly comprising: (i) a first glazing substrate; (ii) a second glazing substrate; and, (iii) a thermal control film or a composite thermal control film, as described herein, positioned between said first and second glazing substrates, but separated from said first and second glazing substrates by layer of a gas.

Additional preferred embodiments are described below. As will be appreciated by one of skill in the art, features of one aspect or embodiment of the invention are also applicable to other aspects or embodiments of the invention.

BRIEF DESCRIPTION OF THE DRAWINGS

FIG. 1 is graph of the (i) solar intensity outside the atmosphere, (ii) solar intensity at an air mass of one, and (iii) intensity of emission from a blackbody at 5900 K, all as a function of wavelength from about 200 nm to about 3200 nm.

FIG. 4B is a schematic diagram (not to scale) illustrating the cross-section of a glazing assembly of the present invention comprising a double-sided thermal control film positioned between two glazing substrates with air spaces between.

FIG. 4D is a schematic diagram (not to scale) illustrating the cross-section of a glazing assembly of the present invention comprising a composite thermal control film (comprising two single-sided thermal control films adhered face-to-face via a bonding layer) positioned between two glazing substrates with air spaces between.

FIG. 4F is a schematic diagram (not to scale) illustrating the cross-section of a glazing assembly of the present invention comprising a composite thermal control film (comprising one single-sided thermal control film and one double-sided thermal control film adhered face-to-face via a bonding layer) positioned between two glazing substrates with air spaces between.

DETAILED DESCRIPTION OF THE INVENTION

Figure 2A:
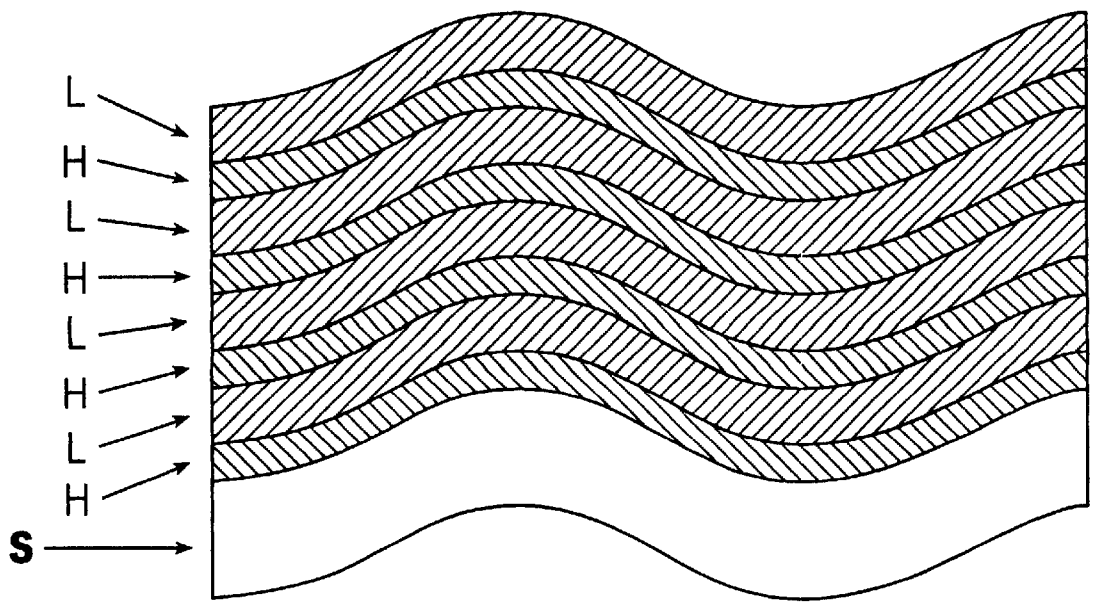
FIG. 2A is a schematic diagram (not to scale) illustrating the cross-section of a single-sided thermal control film.

This invention pertains generally to the field of thermal control films. More particularly, the present invention pertains to visibly transparent heat reflective thermal control films which comprise an optical coating and which are suitable for use in glazing applications. More specifically, the present invention pertains to coated polymer sheets which comprise a thin flexible polymeric sheet (which serves as the substrate), and at least one multilayer coating coated thereon, said coating comprising two or more contiguous alternating layers of high and low index of refraction inorganic dielectric material. The coated polymer sheets are characterized by a high transmission of visible radiation (i.e., visibly transparent) and a high reflectance at one or more near infrared radiation center wavelengths (i.e., heat reflective), and rely primarily on the interference effects of the dielectric layers to achieve these results.

The term "visibly transparent," as used herein, pertains to thermal control films which transmit a large fraction (e.g., an average of at least about 50%) of visible radiation (i.e., 380 nm to 750 nm). The term "heat reflective," as used herein, pertains to thermal control films which reflect a large fraction of radiation (e.g., an average of at least about 50%) at one or more near infrared radiation center wavelengths (e.g., 750 nm to 2000 nm).

The thermal control films of the present invention rely primarily on the interference effects of the dielectric layers to achieve a high transmission of visible radiation and a high reflectance at one or more near infrared radiation center wavelengths. For convenience, a simplified discussion of the optical and interference properties of dielectrics (derived from Macleod, 1995) is provided below.

Interference films rely on interaction of incident radiation with one or more boundaries between materials of high and low indices of refraction, for example, the substrate and the materials in the optical coating. Interference effects are caused primarily by partial reflections at boundaries between layers and recombination of the resulting beams in which their phase differences are significant. By exploiting the optical properties of the one or more thin layers with different indices of refraction, it is possible to substantially reduce or substantially increase reflection or transmission of one or more wavelengths, or bands of wavelengths, from a surface.

For example, it often desirable to reduce the reflection of visible radiation striking eye-glasses and camera optics. This can be achieved by coating the eye-glasses and camera optics with a thin coating of dielectric material, thereby introducing two or more boundaries (e.g., air-coating and coating-glass). By carefully controlling the thickness of the coating (and therefore the pathlength of the travelling ray), it is possible to have reflected rays from the (e.g., first and second) boundaries which are substantially out of phase and a reduced net reflection is observed. This is the basis of simple anti-reflective coatings. By employing several layers of varying thicknesses and materials, it is possible to substantially reduce the reflection of different wavelengths at different angles of incidence, and thereby improve the anti-reflective properties.

Alternatively, it is similarly possible to exploit the interference effects of optical coatings in order to increase the net reflection for a particular wavelength band and/or for a particular angle of incidence, and thus form optical coatings which act as "mirrors."

When electromagnetic radiation, travelling through a first medium (i.e., the "incident medium"), strikes the boundary between the first medium and a second medium (i.e., the "emergent medium"), some fraction (i.e., from 0 to 1) of the radiation is reflected at the boundary (and re-enters the first medium), and some fraction (i.e., from 0 to 1) crosses the boundary (and enters the second medium).

According to fundamental laws of optics, when an incident ray travelling through a first medium, strikes the boundary between the first medium and a second medium at an angle of incidence, $\theta_i$, some fraction of the ray's intensity is reflected back into the first medium. The incident ray and the reflected ray lie within a plane, and the angle of the incident ray and the angle of the reflected ray are identical (both angles measured from the boundary normal). Thus, a ray with normal incidence ($\theta_i=0°$) is reflected back over the same path, whereas a ray at grazing incidence ($\theta_i\sim85°$) is reflected onward at a grazing angle (in this case, $\theta\sim85°$, or 170° from the incident ray).

If an incident ray of electromagnetic radiation, travelling through a first medium (i.e., incident medium), crosses the boundary between the first medium and a second medium (i.e., emergent medium), and enters the second medium, the propagating ray is altered (i.e., refracted) according to the properties of the incident and emergent media. Both the incident and emergent rays lie within a plane, but their wavelengths (and therefore their velocities) and directions of propagation differ. The incident and refracted rays are related by the equation (the first part of which is known as Snell's Law):

$$n_2/n_1 = \sin\theta_i/\sin\theta_r = \lambda_i/\lambda_r = v_i/v_r$$

wherein $n_1$ is the index of refraction of the incident medium, $n_2$ is the index of refraction of the emergent medium, $\theta_i$ is the angle of incidence (measured from the boundary normal in the incident medium), $\theta_r$ is the angle of refraction (measured from the boundary normal in the emergent medium), $\lambda_i$ is the wavelength of the incident ray in the incident medium, $\theta_r$ is the wavelength of the emergent beam in the emergent medium, $v_i$ is the velocity of the incident ray in the incident medium, and $v_r$ is the velocity of the emergent beam in the emergent medium.

Typically, indices of refraction are reported with respect to a vacuum; that is, the first medium is a vacuum, which is defined to have an index of refraction of 1. Indices of refraction are usually a strong function of wavelength (and typically decrease monotonically with increasing wavelength) and temperature. The indices of refraction for water, fused quartz, crown glass, sodium chloride, dense flint glass, and diamond are 1.33, 1.46, 1.52, 1.53, and 1.66, and 2.42 respectively, all measured at 20° C. and at 589 nm with respect to a vacuum. The indices of refraction for most practical coating materials range from about 1.3 to about 2.8.

The characteristic optical admittance, y, of a material may be conventionally defined with reference to a simple harmonic wave of electromagnetic radiation propagating through the material, according to the equation y=E/H, wherein E is the electric field amplitude and H is the magnetic field amplitude. The characteristic optical admittance of a homogenous material is related to the index of refraction, n, and the coefficient of extinction, k, by the equation $y=(n-ik)^2$, where i is the imaginary number $\sqrt{(-1)}$. For metals, k is usually large in comparison with n. In contrast, for dielectric materials, and for wavelengths less than microwave radiation (i.e., less than about 1000 microns), including visible and infrared radiation, k is very small compared to n, and the characteristic optical admittance, y, (expressed in free space units) and the index of refraction, n, are approximately the same number.

When a wave with electric field amplitude $E_0$, travelling through a first medium (i.e., the "incident medium") of index of refraction $n_0$, strikes the boundary between the first medium and a second medium (i.e., the "emergent medium") of index of refraction $n_1$, a reflected wave with electric field amplitude $E_r$ and a transmitted wave with electric field amplitude $E_t$ result. The amplitude reflection coefficient, ρ, and the amplitude transmission coefficient, τ, are given by the equations:

$$\tau = E_r/E_t = (y_0-y_1)/(y_0+y_1)$$

$$\tau = E_t/E_t = (2y_0)/(y_0+y_1)$$

The reflectance, R, and the transmittance, T, at the interface between the incident medium and the emergent medium are then given by the equations below, and are a measure of how much of the incident radiation is reflected and transmitted, respectively:

$$R = |\rho|^2 = |(y_0-y_1)/(y_0+y_1)|^2$$

$$T = (n_1/n_0)|\tau|^2 = (n_1/n_0)|(2y_0)/(y_0+y_1)|^2$$

The phenomenon of interference is primarily observed for electromagnetic radiation incident on, and travelling through, transparent thin films of dielectric materials, more specifically, for films with an optical thickness (see below) which is less than the coherence length of electromagnetic radiation of interest. The coherence length may be approximated by the equation:

$$L \approx \lambda_m^2/\Delta\lambda_m$$

wherein L is the approximate coherence length of the light source, $\lambda_m$ is the median wavelength, and $\Delta\lambda_m$ is one-half of the range of wavelength. For example, for a visible light source from 400 to 700 nm, $\lambda_m$ is 550 nm and $\Delta\lambda_m$ is 150 nm. In this way, L is approximately 2017 nm, or about 2.0 microns. Thus, for a material with an index of refraction of 1.52, interference phenomena will be observed for films of physical thickness of less than about 1327 nm, or about 1.3 microns. The coherence length for solar radiation is approximately 0.6 microns, whereas the coherence length for visible solar radiation is approximately 2.0 microns. Similarly, the coherence length for a conventional incandescent light bulb is approximately 1.5 microns, and the coherence length for a blackbody at 300 K is about 15.0 microns.

Again, interference effects are caused primarily by partial reflections at boundaries between layers and recombination of the resulting beams in which their phase differences are significant. For example, if an incident wave and a reflected wave are exactly "out of phase" (i.e., a phase difference of 180°, or (2k+1)λ where k is an integer), the two waves combine destructively to yield zero intensity: reflection is decreased. Conversely, if an incident wave and a reflected wave are exactly "in phase" (i.e., a phase difference of 0°, or 2kλ where k is an integer), the two waves combine constructively to yield an increased intensity: reflection is increased.

For simple reflection from an interface, where an incident ray travelling through a first medium strikes the boundary between the first medium and a second medium, the reflected ray suffers a phase change of either 0° (if the index of refraction of the incident medium is greater than the index of refraction of the emergent medium) or 180° (if the index of refraction of the incident medium is less than the index of refraction of the emergent medium). Thus, a ray travelling in air, incident on glass, yields a reflected ray which is 180° out of phase. Conversely, a ray travelling in glass, incident on a glass-air interface, yields a reflected ray which is in phase (i.e., a phase difference of 0°).

The phase shift, δ, suffered by a wave travelling through a thin film of physical thickness (also referred to as geometrical thickness or metric thickness), d, is given by the equation:

$$\delta = -2\pi nd/\lambda (\text{or } \delta = -360° \, nd/\lambda)$$

The quantity δ is also referred to as the "phase thickness" of the layer. The quantity nd (i.e., the product of the index of the refraction of the layer material with respect to vacuum, n, and the physical thickness of the layer material, d) is referred to as the "optical thickness."

If a dielectric layer has a phase thickness of 90° (i.e., π/2), then a beam which is incident on a first interface, travels through the layer, is reflected at the back interface, and then travels back through the layer, will emerge from the layer with a net phase change of 180° (i.e., λ) or 0°; that is, it will either be exactly in phase or exactly out of phase. A phase thickness of 90° (i.e., π/2) implies n d=λ/4, or an optical thickness of one quarter of a wavelength. Such a layer is often referred to as a "quarterwave layer."

Of course, a particular layer is strictly a quarterwave layer only for a particular wavelength at normal incidence, and this wavelength is referred to as the reference wavelength (or center wavelength), $\lambda_0$. The phase thickness equation can then be written as:

$$\delta = -2\pi(n\, d/\lambda)(\lambda/\lambda_0) = -2\pi(n\, d/\lambda)g$$

The dimensionless quantity $\lambda/\lambda_0$ is denoted "g." If the layer thickness is one quarterwave, then $\lambda=\lambda_0$ and g=1. If the layer thickness is one halfwave (i.e., two quarterwaves), then $\lambda=2\lambda_0$ and g=2. In this way, the phase thickness, δ, may be expressed in units of quarterwaves, g. For example, a layer of titania, with an index of refraction of 2.28 at 550 nm, and a physical thickness of 150 nm, has an optical thickness of 342 nm, which is about 2.48 quarterwaves at 550 nm and 1.52 quarterwaves at 900 nm.

For quarterwave layers, calculating the reflectance, R, and the transmittance, T, is greatly simplified. A single quarterwave layer with a characteristic optical admittance, $y_1$, transforms the admittance of the substrate surface from $y_{sub}$ to $y_1^2/y_{sub}$. That is, the coated substrate acts as a single interface between the incident medium and an emergent medium of characteristic optical admittance $y_f=y_1^2/y_{sub}$. The reflectance, R, of the coated substrate is then given by the equation:

$$R = |\rho|^2$$
$$= |(y_o - y_f)/(y_o + y_f)|^2$$
$$= |(y_o - y_1^2/y_{sub})/(y_o + y_1^2/y_{sub})|^2$$

For radiation of wavelength shorter than microwaves (e.g., shorter than about 1000 microns), the characteristic optical admittance, y, may be approximated by the index of refraction, n, and the equation becomes:

$$R=|(n_0-n_1^2/n_{sub})/(n_0+n_1^2/n_{sub})|^2$$

To reduce reflectance (as in an anti-reflection coating) using a single quarterwave layer, it is desirable to choose $n_1$ such that the term $n_0-n_1^2/n_{sub}$ is as small as possible. For zero reflectance, $n_1$ must be equal to the square root of $n_0 n_{sub}$. For air ($n_0=1.00$) and crown glass ($n_{sub}=1.52$, 20° C. and at 589 nm), $n_1$ is preferably about 1.23. However, of the practical coating materials, magnesium fluoride (i.e., $MgF_2$) has the lowest index of refraction, at about 1.38 (20° C. and 589 nm). Thus, for a wave at 589 nm, travelling in air and incident on a crown glass substrate which has been coated with a quarterwave layer of magnesium fluoride, the resulting reflectance is 0.0125 or 1.25%. Compared to the uncoated glass (e.g., use $n_1=1.52$), which has a reflectance of about 4.25%, the quarterwave substantially reduces the reflectance and acts as an efficient anti-reflection coating.

Conversely, to maximize reflectance using a single quarterwave layer (as in a mirror coating), it is desirable to choose $n_1$ to be as large as possible. However, for practical coating materials, the highest index of refraction is about 2.6 (20° C. and 589 nm), and the resulting reflectance is about 40%. To improve upon these values, it is necessary to use additional quarterwave layers of other materials.

The transformation of a surface by quarterwaves can be extended to any number of quarterwaves. For two quarterwave layers of admittance $y_1$ and $y_2$, respectively, in the configuration $y_0$ (incident medium)/$y_1$/$y_2$/$y_{sub}$ (substrate), the coated substrate acts as a single interface between the incident medium and an emergent medium of characteristic optical admittance $y_f=(y_1^2/y_2^2)y_{sub}$. For three quarterwave layers, $y_f=(y_1^2 y_3^2/y_2^2)/y_{sub}$. For four quarterwave layers, $y_f=(y_1^2 y_3^2/y_2^2 y_4^2) y_{sub}$. In general, $y_f$ is given by the equation $$y_f=(y_1^2 y_3^2 y_5^2 \ldots /y_2^2 y_4^2 y_6^2 \ldots )y_{sub} \text{ for an even number of layers}$$

$$y_f=(y_1^2 y_3^2 y_5^2 \ldots /y_2^2 y_4^2 y_6^2 \ldots )/y_{sub} \text{ for an odd number of layers}$$

where the odd numbered quarterwave layers appear in the numerator, and the even numbered quarterwave layers appear in the denominator. If there are an odd total number of quarterwave layers, then $y_{sub}$ appears in the denominator, whereas if there are an even total number of quarterwave layers, then $y_{sub}$ appears in the numerator.

For a surface coated with two quarterwave layers of the same material (i.e., $y_1=y_2$), the resulting reflectance is $y_f=(y_1^2/y_2^2)y_{sub}=y_{sub}$. Thus, a "halfwave layer" acts as an absentee layer (at $\lambda=\lambda_0$), and does not alter the reflectance of the surface. Similarly, for three quarterwave layers of the same material (i.e., $y_1=y_2=y_3$), the resulting reflectance is $y_f=(y_1^2 y_3^2/y_2^2)y_{sub}=y_1^2 y_{sub}$, and the coating acts as a single quarterwave layer (or as a single quarterwave layer and an absentee halfwave layer). Similarly, a fullwave layer acts as two absentee halfwave layers (at $\lambda=\lambda_0$), and again does not alter the reflectance of the surface.

To maximize reflectance, it is desirable to maximize the term $(y_1^2 y_3^2 y_5^2 \ldots /y_2^2 y_4^2 y_6^2 \ldots )$. More specifically, the layers appearing in the numerator should be of high characteristic admittance while the layers appearing in the denominator should be of low characteristic admittance. This leads to a stack of quarterwave layers of alternately high and low characteristic admittance which is commonly referred to as a "quarterwave stack." Typically, the outermost layer has high characteristic admittance, but this is not necessary. In practice, it is often desirable to diverge from this simple rule in order to optimize other optical properties, such as reducing ripple, improving color balance, and the like.

Generally, the greater the number of layers in the stack, the greater is the resulting reflectance. For an alternating stack of x layers with high characteristic admittance, $y_H$, and x-1 layers of low characteristic admittance, $y_L$, where the outermost layer has high characteristic admittance, the reflectance is given by:

$$R=\{(y_0-y_H^{2x}/y_L^{2x-2}y_{sub})/(y_0+y_H^{2x}/y_L^{2x-2}y_{sub})\}^2$$

In this way, the reflectance can be made as high as desired by choosing an appropriate value for x. Calculated reflectances for films of the structure Air |(HL)$_x$H | Substrate, where $y_0=1.00$, $y_{sub}=1.52$, $y_H=1.38$ and $y_L=2.4$ are shown in Table 1 below.

TABLE 1

Calculated Reflectances for Air | (HL)$_x$H | Substrate (= 3 layers)

| No. of Layers | x | R |
| --- | --- | --- |
| 3 | 1 | 0.3392 |
| 5 | 2 | 0.7048 |
| 7 | 3 | 0.8910 |
| 9 | 4 | 0.9626 |
| 11 | 5 | 0.9875 |
| 13 | 6 | 0.9958 |
| 15 | 7 | 0.9986 |
| 17 | 8 | 0.9995 |
| 19 | 9 | 0.9998 |
| 21 | 10 | 0.9999 |

Of course, this simple quarterwave stack is a quarterwave stack only for the reference wavelength, that is, $\lambda=\lambda_0$, or a g value of 1. The reflectance may be accurately calculated as a function of g using a complete mathematical analysis. See, for example, Macleod, 1995. For g=1, 3, 5, . . . , a high reflectance is observed, which is associated with quarterwave layers. For g=0, 2, 4, 6, . . . , a low reflectance close to that of the uncoated substrate is observed, which is associated with absentee halfwave layers. For intermediate values of g (e.g., between 0 and 1), the reflectance curve is more complicated, and has many fringes or ripples. Nonetheless, there are well defined regions of high reflectance (centered on g=1, 3, 5, . . . ) with regions of low reflectance in between. The width of the high reflectance zone, $2\Delta g$, is determined by the admittances of the high and low admittance layers, $y_H$ and $y_L$, respectively, and is given by the equation:

$$2\Delta g=(4/\pi) \arcsin \{(y_H-y_L)/(y_H+y_L)\}$$

In the example above, where $y_L$ and $Y_H$ are 2.4 and 1.38, respectively, the width of the high reflectance zone is about 0.348 units of g. Thus, for $\lambda_0$ of 600 nm, the high reflectance zone is about 209 nm wide and spans the range of about 496 nm to 705 nm.

By convention, the structure of coatings may be denoted using capital letters to denote quarterwave layers. For example, L and H may be used to denote quarterwaves of low and high admittance (and thus high and low index of refraction), respectively. Quarterwave layers of other admittances may be denoted by other letters, such as A, B, and so on. A halfwave layer of high admittance material may be denoted as 2H or HH. An eighth-wave layer of low admittance material may be denoted as L/2 or 0.5L. An sixteenth-wave layer of low admittance material may be denoted as L/4 or 0.25L. For example, a simple 15 layer quarterwave stack may be denoted by any of the following:

Air | HLHLHLHLHLHLHLH| Glass

Air | (HL)₇H| Glass

Air | H(LH)₇| Glass

Air | (HL)₂H(LH)₅| Glass

As already discussed, simple quarterwave stacks often result in fringes or ripples in the reflectance or transmission curves for non-integer values of g. The observed ripple can often be reduced by including outermost layers of fractional thickness, for example, the outermost H quarterwave layers may be replaced by eighthwave (H/2) layers, as in:

Air | H/2 LHLHLHLHLHL H/2| Glass

In addition to simple quarterwave stacks, more complex stacks which include one or more simple quarterwave stacks, may be prepared which have desirable reflectance and transmittance curves. For example, the presence of an "absentee layer" or "spacer layer" in the structure below yields transmittance properties of a narrow band pass filter (also referred to as a single-cavity filter).

Air | HLHLHL HH LHLHLH | Glass

Also, a "coupling layer" may be included, for example, an L layer between two of the above structures, to yield a transmittance curve which is more rectangular in shape.

Air | HLHLHL HH LHLHLH L HLHLHL HH LHLHLH | Glass

Also, a "matching layer" (e.g., "boundary layer") may be included, for example, an outermost H layer as in the structure below, which again yields a transmittance curve which is more rectangular in shape.

Air | H HLHLHL HH LHLHLH | Glass

In order to further broaden the reflectance zone, it is usually necessary to include one or more additional stacks with a reference wavelength, $\lambda_0^2$ (or more simply, $\lambda_2$), which is displaced from the first reference wavelength, $\lambda_0^1$ (or more simply, $\lambda_1$). For example, if the H and L layers of a first stack (of reference wavelength $\lambda_1$) are denoted $H^1$ and $L^1$, and the H and L layers of a second stack (of reference wavelength $\lambda_2$) are denoted $H^2$ and $L^2$, a simple "double" stack may be denoted as shown below.

Air | $H^1L^1H^1L^1H^1L^1H^1L^1$ $H^2L^2$ $H^2L^2H^2L^2H^2$| Glass

Often, an "suppression layer," denoted $L^s$, having a reference wavelength appropriate to suppress the sharp dip observed in the reflectance curve of the above structure (and which arises from the central $H^1H^2$ layer) is included, as in the structure shown below.

Air | $H^1L^1H^1L^1H^1L^1H^1$ $L^s$ $H^2L^2H^2L^2H^2L^2H^2$| Glass

In still other variations, the thicknesses of the layers of the stack may be varied in a regular progression, for example linearly or geometrically, to yield a reflectance curve with a desired shape or profile. As discussed below, computer modeling may be used to predict the reflectance curve for a particular structure.

Thermal Control Films

Again, the present invention pertains to coated polymer sheets which comprise a thin flexible polymeric sheet (which serves as the substrate), and at least one multilayer coating coated thereon, said coating comprising at least two contiguous alternating layers of high and low index of refraction inorganic dielectric material. The coated polymer sheets are characterized by a high transmission of visible radiation (i.e., visibly transparent) and a high reflectance at one or more near infrared radiation center wavelengths (i.e., heat reflective), and rely primarily on the interference effects of the dielectric layers to achieve these results.

Dielectric stacks offer a substantial advantage over metal films when considering "greenhouse" effects in an enclosed space, for example, in an automobile. While a metal film may reflect incident near infrared radiation (e.g., 750 to 2000 nm), and thus prevent it from entering the enclosed space, it also reflects longer wavelength radiation (e.g., about 7 to 20 microns), and thus traps re-radiated infrared radiation (emitted by hot objects in the interior of the enclosed space) inside and prevents it from escaping transmissively. In contrast, a dielectric reflecting stack which is designed to reflect near infrared wavelengths (e.g., 750 to 2000 nm) will not substantially impede the transmission of much longer infrared wavelengths (e.g., about 7 to 20 microns). Thus, whereas metal films contribute to the greenhouse effect in the automobile, dielectric reflecting stacks do not.

Thus, in one embodiment, the present invention pertains to a thermal control film comprising (a) a thin flexible polymeric sheet having a first face and an opposite second face; and (b) a multilayer coating adhered to said first face, said coating comprising two or more contiguous alternating layers of high and low index of refraction inorganic dielectric material of optical thickness approximately equal to one quarter of an infrared center wavelength, $\lambda_0$, said thermal control film characterized by an average transmittance of visible radiation of wavelength 380 to 750 nm at 0° incidence of at least 50%; said thermal control film further characterized an average reflectance in an infrared radiation band which is at least 100 nm wide and falls within the wavelength band 750 to 2000 nm, at 0° incidence, of at least 50%.

It may be convenient to denote such a thermal control film as F or PX,.wherein P denotes the thin flexible polymeric sheet and X denotes the multilayer coating comprising two or more contiguous alternating layers of high and low index of refraction inorganic dielectric material. When discussing the orientation of two or more thermal control films (e.g., "face to face"), it may be convenient to refer to the side with the coating as the "face" and the uncoated side as the "back." Embodiments wherein a multilayer coating is adhered to only one of the two opposite faces of the polymeric sheet may be conveniently referred to as "single-sided" thermal control films. It may be convenient to denote such thermal control films as PX. Embodiments wherein a first multilayer coating is adhered to one face, and a second multilayer coating is adhered to the opposite face (see below) may be conveniently referred to as "double-sided" thermal control films. It may be convenient to denote such thermal control films as XPX or $X_1PX_2$.

As used herein, the terms "ultraviolet," "ultraviolet region," "ultraviolet radiation," and "ultraviolet electromagnetic radiation" pertain to electromagnetic radiation of wavelength from about 150 nm to about 380 nm. As used herein, the terms "visible," "visible region," "visible radiation," and "visible electromagnetic radiation" pertain to electromagnetic radiation of wavelength from about 380 nm to about 750 nm. As used herein, the terms "infrared," "infrared region," "infrared radiation," and "infrared electromagnetic radiation" pertain to electromagnetic radiation of wavelength from about 750 nm to about 50,000 nm. As used herein, the terms "near infrared," "near infrared region," "near infrared radiation," and "near infrared electromagnetic radiation" pertain to electromagnetic radiation of wavelength from about 750 nm to about 2000 nm.

The term "thin sheet," as used herein, pertains to flexible polymeric sheets which have a thickness of from about 0.1 mil (~2.5 microns) to about 100 mil (~2500 microns). (Note that "1 mil" equals 0.001 inch or about 25 microns.) In one embodiment, the polymeric sheet has a thickness of from about 0.1 mil (~2.5 microns) to about 50 mil (~1250 microns). In one embodiment, the polymeric sheet has a thickness of from about 0.1 mil (~2.5 microns) to about 30 mil (~750 microns). In one embodiment, the polymeric sheet has a thickness of from about 0.1 mil (~2.5 microns) to about 20 mil (~500 microns). In one embodiment, the polymeric sheet has a thickness of from about 0.1 mil (~2.5 microns) to about 10 mil (~250 microns). In one embodiment, the polymeric sheet has a thickness of from about 0.3 mil (~7.5 microns) to about 5 mil (~125 microns). In another embodiment, the polymeric sheet has a thickness of from about 0.1 mil (~2.5 microns) to about 2 mil (~50 microns). In one embodiment, the polymeric sheet has a thickness of from about 0.5 mil (~12.5 microns) to about 2 mil (~50 microns). In another embodiment, the polymeric sheet has a thickness of from about 0.5 mil (~12.5 microns) to about 5 mil (~125 microns).

In one embodiment, the thin flexible polymeric sheet is substantially visibly transparent, that is, it has an average transmittance of visible radiation of wavelength 380 to 750 nm at 0° incidence of at least 50%.

In one embodiment, the first and second face of the thin flexible polymeric sheet are parallel or substantially parallel.

The term "polymeric," as used herein, pertains to a thin flexible sheet which comprises an organic polymeric material. In one embodiment, the thin flexible sheet is primarily composed of an organic polymeric material. In one embodiment, the thin flexible sheet consists essentially of an organic polymeric material. Examples of organic polymeric materials include, but are not limited to, poly(acetals) such as poiy(vinyl butryal); poly(vinyl halides) such as poly(vinyl chloride), poly(vinyl fluoride), poly(vinylidene chloride), and poly(vinylidene fluoride); poly(dienes) such as polybutadiene; poly(alkenes) such as poly(ethylene) and poly(propylene); fluorinated poly(alkylenes), such as polytetrafluoroethylene; poly(acrylates) such as poly(methyl acrylate); poly(methacrylates) such as poly(methyl methacrylate); poly(carbonates) such as poly(oxycarbonyl oxyhexamethylene); poly(esters) such as poly(ethylene terephthalate); poly(amides), such as nylon 6, nylon 66, nylon 12; poly(sulfones); poly(ether sulfones); poly(urethanes); poly(siloxanes); poly(vinyl nitriles); poly(vinyl alcohols); poly(acrylonitriles); poly(styrenes); poly(phenylenes); poly(phenylene oxides); poly(phenylene sulfides); poly(imides); poly(amidoimides); and poly(ethylene sulfones). Additional polymers are described in Brandrup et al, 1989.

Poly(terephthalate esters), such as the DuPont Mylars® are often preferred because of the combined advantages of strength, flexibility, clarity, and moderate cost. Poly(ethylene terephthalate), also referred to as "PET," is a common and often preferred polymer. Molecularly oriented (e.g., uniaxially, biaxially) PET films are also commercially available. Biaxially oriented PET may be particularly preferred.

Examples of other polymer sheets which are commercially available include, but are not limited to, the polyester films sold under the tradename Melinex(® (manufactured by ICI Americas Inc. and available from Tekra, Orange, Calif., U.S.A), the biaxially oriented poly(ethylene terephthalate) (PET) films sold under the tradename TRANSPET® (from Transilwrap Company, Inc., Dallas, Tex., U.S.A), the poly(ethylene naphthalate) (PEN) films sold under the tradename Kaladex® (manufactured by ICI Americas Inc. and available from Tekra, Orange, California, USA), and the poly(fluorinated ethylene) (PTFE; Teflon) films sold under the tradename Teflon FEP®, Teflon PFA®, Tefzel ETFE®, and Tedlar® (from DuPont, Circleville, Ohio, U.S.A).

In order to minimize the deteriorative effect of ultraviolet radiation on the polymeric sheet, it is often highly desirable to include a layer or coating of, or a layer or coating containing, an ultraviolet absorber. Alternatively, an ultraviolet absorber may be incorporated into the polymer layer itself. Examples of UV absorbers include, but are not limited to, benzophenones, benzotriazoles, and salicylates. See, for example, Fujimori et al, 1983. Also, the polymeric sheet may advantageously further comprise additives, including but not limited to, infrared absorbers (e.g., metals), antioxidants, coloring agents, plasticizers, stabilizers, and antistatic agents.

The term "flexible sheet," as used herein, pertains to thin polymeric sheets which may be bent or rolled without breaking. A polymer sheet is flexible if it meets the flexibility requirements of any embodiment as described below.

In one embodiment, a sheet may be said to be flexible if it can be rolled, without breaking, as a cylindrical roll of diameter less than 30 cm, more preferably less than 20 cm, more preferably less than 10 cm, more preferably less than 5 cm, more preferably less than 2 cm.

Flexural strength is a measure of a polymer's resistance to breaking, or snapping, when bent (i.e., "flexed"). Flexural strength is determined by bending a strip of polymer of uniform dimensions, until failure. Typically, a bar shaped test specimen is placed across two supports, a load is applied at a specific rate midway between the two supports; the loading at failure is called the flexural strength. Flexural modulus, F, is the ratio of flexural stress, $\sigma$, to flexural strain, $\in$ (that is, $F=\sigma/\in$). In one embodiment, the flexible sheet has a flexural modulus of about 4,000 psi (~270 bar) to about 20,000 psi (~1300 bar). In one embodiment, the flexible sheet has a flexural modulus of below about 15,000 psi (~1000 bar). In one embodiment, the flexible sheet has a flexural modulus of below about 10,000 psi (~670 bar). Since many materials do not break even after being greatly deflected, the actual flexural strength cannot be calculated; instead, by convention, the flexural modulus at a specified flexural strain (e.g., 5%) is used as a measure of flexural strength for these materials.

Tensile strength is a measure of a polymer's ability to withstand pulling stresses before breaking, and is typically determined by stretching a strip of polymer of uniform dimensions, until failure. Tensile modulus, E, is the ratio of tensile stress, $\sigma$, to tensile strain, $\in$ (that is, $E=\sigma/\in$), where the tensile stress, $\sigma$, is the ratio of the force applied, F, to the cross sectional area, A (that is, $\sigma=F/A$), and the tensile strain, $\in$, is the ratio of the change in sample length, $\Delta L$, to the original length, L (that is, $\in=\Delta L/L$). In one embodiment, the flexible sheet has a tensile modulus of about 20,000 psi (~1300 bar) to about 1,000,000 psi (~67,000 bar). In one embodiment, the tensile modulus is less than about 800,000 psi (~53,000 bar). In one embodiment, the tensile modulus is less than about 600,000 psi (~40,000 bar). In one embodiment, the tensile modulus is less than about 400,000 psi (~27,000 bar). In one embodiment, the tensile modulus is less than about more preferably below about 300,000 psi (~20,000 bar).

The multilayer coating is laminar in nature, and comprises two or more continuous and discrete alternating layers of high and low index of refraction inorganic dielectric material, wherein said two or more layers are contiguous (i.e., in contact sequence).

To maximize the optical properties (e.g., visible transmittance, infrared reflectance) of the coating, one usually increases the number of layers of inorganic dielectric material. However, to maximize the strength and durability of the multilayer coating on the thin flexible polymeric sheet, one usually decreases the number of layers of inorganic dielectric material, thereby reducing the physical thickness of the brittle dielectric. Additionally, to minimize cost, one usually decreases the number of layers of inorganic dielectric material. In many cases, the number of layers of inorganic dielectric material is chosen to balance several opposing interests, such as those discussed above.

In one embodiment, the multilayer coating comprises from 2 to about 100 contiguous alternating layers of high and low index of refraction inorganic dielectric materials. In one embodiment, the multilayer coating comprises from 2 to about 50 such layers. In one embodiment, the multilayer coating comprises from 2 to about 30 such layers. In one embodiment, the multilayer coating comprises from 2 to about 20 such layers. In one embodiment, the multilayer coating comprises from 2 to about 12 such layers. In one embodiment, the multilayer coating comprises from 2 to about 10 such layers. In one embodiment, the multilayer coating comprises from 2 to about 8 such layers. In one embodiment, the multilayer coating comprises from 2 to about 6 such layers.

In one embodiment, the multilayer coating comprises three or more contiguous alternating layers of high and low index of refraction inorganic dielectric materials. In one embodiment the multilayer coating comprises from 3 to about 100 such layers. In one embodiment, the multilayer coating comprises from 3 to about 50 such layers. In one embodiment, the multilayer coating comprises from 3 to about 30 such layers. In one embodiment, the multilayer coating comprises from 3 to about 20 such layers. In one embodiment, the multilayer coating comprises from 3 to about 12 such layers. In one embodiment, the multilayer coating comprises from 3 to about 10 such layers. In one embodiment, the multilayer coating comprises from 3 to about 8 such layers. In one embodiment, the multilayer coating comprises from 3 to about 6 such layers.

In one embodiment, the multilayer coating comprises four or more contiguous alternating layers of high and low index of refraction inorganic dielectric materials. In one embodiment, the multilayer coating comprises from 4 to about 100 such layers. In one embodiment, the multilayer coating comprises from 4 to about 50 such layers. In one embodiment, the multilayer coating comprises from 4 to about 30 such layers. In one embodiment, the multilayer coating comprises from 4 to about 20 such layers. In one embodiment, the multilayer coating comprises from 4 to about 12 such layers. In one embodiment, the multilayer coating comprises from 4 to about 10 such layers. In one embodiment, the multilayer coating comprises from 4 to about 8 such layers. In one embodiment, the multilayer coating comprises from 4 to about 6 such layers.

In one embodiment, the multilayer coating comprises an odd number of contiguous alternating layers of high and low index of refraction inorganic dielectric materials. In one embodiment, the multilayer coating comprises an even number of such layers. In one embodiment, the multilayer coating comprises 4 such layers. In one embodiment, the multilayer coating comprises 5 such layers. In one embodiment, the multilayer coating comprises 6 such layers. In one embodiment, the multilayer coating comprises 7 such layers. In one embodiment, the multilayer coating comprises 8 such layers. In one embodiment, the multilayer coating comprises 9 such layers. In one embodiment, the multilayer coating comprises 10 such layers. In one embodiment, the multilayer coating comprises 11 such layers. In one embodiment, the multilayer coating comprises 12 such layers.

In addition to the two or more contiguous alternating layers of high and low index of refraction inorganic dielectric material, the multilayer coating may further comprise one or more additional layers. It may be convenient to denote such an additional layer as "A". Such an additional layer may be positioned atop two or more contiguous alternating layers of high and low index of refraction inorganic dielectric material (far from the substrate), as in, for example, PXA. Alternatively, such an additional layer may be included beneath two or more contiguous alternating layers of high and low index of refraction inorganic dielectric material, between the multilayer coating and the polymeric sheet (close to the substrate), as in, for example, PAX. Alternatively, such an additional layer may be included on the thin flexible polymeric sheet, but opposite the multilayer coating as in, for example, APX. Alternatively, such an additional layer may be included between groups or stacks of two or more contiguous alternating layers of high and low index of refraction inorganic dielectric material (interstitially), as in, for example, $PX_1AX_2$. Combinations of these geometries are possible with two or more additional layers, as in, for example, APAX, APXA, PAXA, and APAXA.

Such additional layers may be included, for example, for their optical properties, their physical/stress properties, and/or for their other desirable properties. Examples of layers with desirable optical properties include, but not limited to, coupling layers, matching layers, suppression layers, such as sixteenthwave layers, eighthwave layers, quarterwave layers, and halfwave layers of the same or different material. Examples of layers with desirable physical/stress properties include those with an intrinsic tensile stress or intrinsic compressive stress, and which may be used, for example, to balance compressive and/or tensile stress within the multilayer coating. For example, a multilayer coating of titania and silica is often compressively stressed; the introduction of an interstitial tensile stressed layer of alumina of appropriate thickness may yield a reduced overall stress. Other examples of additional layers include, but are not limited to, adhesive layers, bonding layers, anti-reflection coatings, low emission coatings, ultraviolet absorption coatings, infrared absorption coatings (e.g., one or more metal layers), colored coatings, antistatic coatings, and protective coatings.

The multilayer coating is adhered to one face of the thin flexible polymeric sheet. By the term "adhered," it is meant that the multilayer coating is firmly attached or bound to the polymeric sheet. In one embodiment, the multilayer coating is directly adjacent to, and in contact with, the polymeric sheet; such embodiments may be conveniently referred to as "direct" coatings. In one embodiment, one or more additional layers may be present between the multilayer coating and the polymeric sheet; such embodiments may be conveniently referred to as "indirect" coatings. For example, for a single additional layer, the multilayer coating is directly adjacent to, and in contact with, the additional layer, which additional layer is directly adjacent to, and in contact with, the polymeric sheet.

The term "dielectric material" is used herein in the conventional sense and refers to a material which is a non-conductor of electric charge in which an applied electric field causes a displacement of charge but not a flow of charge. Dielectric materials are characterized by a dielectric constant, $\in_r$ (also called relative permittivity) which is defined as the ratio of the absolute permittivity of the material, $\in$, to the absolute permittivity of free space, $\in_0$. For example, the dielectric constants of air, water, ruby mica, fused quartz, Pyrex® glass, polystyrene, Teflon®, neoprene, and titanium dioxide are 1.00054, 78, 5.4, 3.8, 4.5, 2.6, 2.1, 6.9, and 100, respectively. Owing to their electronic and electrical properties, dielectric materials have low absorptivity of both visible and infrared radiation, typically below about 10%, and often below 5%, 2%, or even 1%, and thus are desirable materials for use in optical coatings in thermal control films.

One class of dielectric materials which are particularly suitable for optical coatings are "inorganic" dielectric materials, that is, dielectric materials that do not comprise carbon. Examples of inorganic dielectric materials include, but not limited to, dielectric metal chalcogenides (i.e., metal oxides, metal sulfides, metal selenides, and metal tellurides), dielectric metal pnictides (e.g., metal nitrides, metal phosphides, metal arsenides), and dielectric metal halides (e.g., metal fluorides). A list of materials (including suitable inorganic dielectric materials), along with details regarding methods for their deposition as thin films, is provided in the "Thin Film Evaporation Source Reference" (R.D. Mathis Company, Long Beach, Calif., USA). A preferred class of dielectric materials are dielectric metal oxides, including, but not limited to those shown in Table 2 below. An example of a preferred metal pnictide is silicon nitride (e.g., $Si_3N_4$, $SiN_x$). Examples of a metal sulfide and a metal selenide are zinc sulfide and zinc selenide, respectively.

TABLE 2

| Material | Approximate Index of Refraction | Material | Approximate Index of Refraction |
|---|---|---|---|
| $Al_2O_3$ | ~1.66 | $TiO_2$ | ~2.4 |
| $HfO_2$ | ~2.0 | $Ti_2O_3$ | ~2.4 |
| $In_2O_2$ | ~2.0 | $Y_2O_3$ | ~1.79 |
| $SiO_2$ | ~1.47 | $ZrO_2$ | ~2.05 |
| SiO | ~1.6 | $Bi_2O_3$ | ~2.55 |
| $CeO_2$ | ~2.3 | $CeF_2$ | ~1.63 |
| $Ta_2O_5$ | ~2.0 | $MgF_2$ | ~1.38 |
| $SnO_2$ | ~2.0 | $Si_3N_4$ | ~2.1 |

A preferred dielectric material with a high index of refraction is titania (i.e., $TiO_2$). A preferred dielectric material with a low index of refraction is silica (i.e., $SiO_2$). Values for the index of refraction of these two materials, for different wavelengths, are shown in Table 3 below. Since the index of refraction of most materials varies isotonically with wavelength, values for the index of refraction for intermediate wavelengths may be estimated from the values for adjacent wavelengths.

TABLE 3

| Titania ($TiO_2$) | | Silica ($SiO_2$) | |
|---|---|---|---|
| Wavelength (nm) | Index of Refraction, n | Wavelength (nm) | Index of Refraction, n |
| 300 | 2.800 | 300 | 1.478 |
| 367 | 2.718 | 350 | 1.472 |
| 388 | 2.577 | 400 | 1.467 |
| 431 | 2.425 | 500 | 1.459 |
| 504 | 2.317 | 550 | 1.455 |
| 600 | 2.244 | 600 | 1.452 |
| 782 | 2.196 | 650 | 1.450 |
| 1069 | 2.143 | 700 | 1.446 |
| 1250 | 2.135 | 900 | 1.437 |
| 1500 | 2.135 | 1000 | 1.434 |
| 2050 | 2.096 | 2000 | 1.430 |

The multilayer coating comprises at least one "quarterwave stack," which quarterwave stack comprises two or more contiguous alternating layers of high and low index of refraction inorganic dielectric materials of optical thickness approximately equal to one quarter of an infrared center wavelength, $\lambda_0$, between 750 and 2000 nm. In one embodiment, the multilayer coating comprises exactly one quarterwave stack. In one embodiment, the multilayer coating comprises two or more quarterwave stacks. In one embodiment, the multilayer coating comprises exactly two quarterwave stacks. In embodiments where the multilayer coating comprises two or more quarterwave stacks, the respective infrared center wavelengths, $\lambda_1$, $\lambda_2$, $\lambda_3$, etc., may independently be the same or different.

The term "alternating," appearing in the phrase "two or more contiguous alternating layers of high and low index of refraction inorganic dielectric materials," as used herein, relates to the relationship between the indices of refraction of each of the layers. Specifically, the index of refraction of any layer is either (a) less than that of the adjacent layer or layers, or (b) more than that of the adjacent layer or layers.

In this context, the terms "high" and "low," in the context of indices of refraction, are relative. Generally, in any pair of different layers, one will have a higher index of refraction than the other, and so will be denoted the high index of refraction layer. Conversely, the other layer will be denoted the low index of refraction layer. In most cases, a large difference in index of refraction between pairs of layers is desired. For example, for alternating layers of silica (n=1.452 at 600 nm) and titania (n=2.244 at 600 nm), the difference in index of refraction is about 0.8. Thus, typically, high and low index of refraction layers have indices of refraction which differ by at least 0.2, more preferably at least 0.4, still more preferably at least 0.6.

For example, a two layer quarterwave stack of alternating layers of high and low index of refraction inorganic dielectric materials, denoted L and H respectively, may have the structure HL or LH. A three layer quarterwave stack of alternating layers may have the structure HLH or LHL. A four layer quarterwave stack of alternating layers may have the structure HLHL or LHLH. A five layer quarterwave stack of alternating layers may have the structure HLHLH or LHLHL. In these structures, H and L denote quarterwave layers with an optical thickness approximately equal to one-quarter an infrared center wavelength, $\lambda_0$.

In one embodiment, all of the high index of refraction layers, denoted L above, are the same inorganic dielectric material and all of the low index of refraction layers, denoted H above, are the same inorganic dielectric material. In one embodiment, the quarterwave stack of alternating layers of high and low index of refraction comprises three or more different inorganic dielectric materials. In one embodiment, the quarterwave stack of alternating layers of high and low index of refraction comprises four or more different inorganic dielectric materials.

In general, a simple quarterwave stack of alternating layers of high and low index of refraction inorganic dielectric material comprises q layers, denoted $A_1$ through $A_q$, of an inorganic dielectric material, in contact sequence, wherein q is an integer greater than or equal to 2. The first layer, $A_1$, which is closest to the substrate, and the last layer, $A_q$, which is outermost layer and is furthest from the substrate film, each have a single adjacent layer, $A_2$ and $A_{q-1}$, respectively. The interior layers, $A_2$ through $A_{q-1}$ (if present), each have two adjacent layers, that is, $A_1$ and $A_3$, and $A_{q-2}$ and $A_q$, respectively. The generalized interior layer, $A_j$, has two adjacent layers, $A_{j-1}$ and $A_{j+1}$. The quarterwave stack is constructed so that the index of refraction of any layer, denoted $n_1$ through $n_q$, is either higher than its adjacent layers or lower than its adjacent layers. In this way, the generalized interior layer, $A_j$, has an index of refraction, $n_j$, which is either higher than the index of refraction of both of the two adjacent layers, $A_{j-i}$ with $n_{j-1}$ and $A_{j+1}$ with $n_{j+1}$, or lower than the index of refraction of both of the two adjacent layers, $A_{j-1}$ with $n_{j-1}$ land $A_{j+1}$ with $n_{j+1}$.

It may be desirable to "match" the outermost layers (i.e., first and last) of the quarterwave stack with the adjacent layers (e.g., substrate, adhesive, bonding layer, glass, air). For applications where an outermost layer of the quarterwave stack will be in contact with a gas (e.g., air), this outermost layer is typically a low index of refraction layer. For applications where an outermost layer of the quarterwave stack will not be in contact with a gas (e.g., instead, in contact with, for example, substrate, adhesive, bonding layer, glass), this outermost layer is typically a high index of refraction layer.

The preferred thicknesses of the layers of high and low index of refraction dielectric material in a quarterwave stack are primarily determined using quarterwave theory, from the choice of dielectric materials (and their indices of refraction) and the desired center wavelength, $\lambda_0$, according to the equation $d=\lambda_0/4\,n$, wherein n is the index of refraction of the material for the reference wavelength. Thus, the layers have optical thicknesses which are approximately equal to one-quarter of the center wavelength. In the context of layer thicknesses, "approximately equal to" means within about 50%, often within about 40%, often within about 30%, often within about 20%, often within about 15%, often within about 10%, often within about 7%, often within about 5%. For example, a layer with an optical thickness of 0.95 quarterwaves differs from the simple quarterwave calculation by (1.00−0.95)/1.00 or 5%.

In embodiments which have a single multilayer coating (e.g., single-sided thermal control films), the dielectric layer thicknesses tend to be within 15% of the simple quarterwave calculation. In embodiments which have two multilayer coatings (e.g., double-sided thermal control films, composite thermal control films formed by laminating two single-sided thermal control films), the dielectric layer thicknesses in one or both of the two coatings may tend to diverge from the simple quarterwave calculation, but typically are within 20%. In embodiments which have three or more multilayer coatings (e.g., composite thermal control films formed by laminating a double-sided thermal control film with a single-sided thermal control film), the dielectric layer thicknesses in one or more of the three coatings may tend to diverge even more from the simple quarterwave calculation, but typically are within 40%.

For example, for a center wavelength of $\lambda_0=900$ nm, and a low index of refraction material silica, with n=1.437 (at 900 nm), the preferred quarterwave thickness is given by $d=\lambda_0/4\,n$, or about 157 nm. For a center wavelength of $\lambda_0=900$ nm, and a high index of refraction material titania, with n~2.23 (at 900 nm), the preferred quarterwave thickness is given by $d=\lambda_0/4\,n$, or about 101 nm. Thus, for dielectric materials with indices of refraction from 1.3 to 2.8 and center wavelengths of from 750 to 2000 nm, the preferred thicknesses are from about 67 nm (~0.07 microns) to about 385 nm (~0.4 microns).

Examples of center infrared wavelengths, $\lambda_0$, include wavelengths from about 750 to about 2000 nm, more preferably from about 800 to about 1500 nm. In one embodiment, the center infrared wavelength is 1000±200 nm. In one embodiment, the center infrared wavelength is 1100±200 nm. In one embodiment, the center infrared wavelength is 1200±200 nm. In one embodiment, the center infrared wavelength is 1300±200 nm.

In one embodiment, the center infrared wavelength is 850±100 nm. In one embodiment, the center infrared wavelength is 950±100 nm. In one embodiment, the center infrared wavelength is 1050±100 nm. In one embodiment, the center infrared wavelength is 1150±100 nm. In one embodiment, the center infrared wavelength is 1250±100 nm. In one embodiment, the center infrared wavelength is 1350±100 nm.

In one embodiment, the center infrared wavelength is 850±50 nm. In one embodiment, the center infrared wavelength is 900±50 nm. In one embodiment, the center infrared wavelength is 950±50 nm. In one embodiment, the center infrared wavelength is 1000±50 nm. In one embodiment, the center infrared wavelength is 1050±50 nm. In one embodiment, the center infrared wavelength is 1100±50 nm. In one embodiment, the center infrared wavelength is 1150±50 nm. In one embodiment, the center infrared wavelength is 1200±50 nm. In one embodiment, the center infrared wavelength is 1250±50 nm. In one embodiment, the center infrared wavelength is 1300±50 nm. In one embodiment, the center infrared wavelength is 1350±50 nm. In one embodiment, the center infrared wavelength is 1400±50nm.

A center wavelength is usually selected to provide a desired near infrared reflectance band. In addition, it is often preferable to select a center wavelength which has a higher order (e.g., third order) reflectance band which falls in the ultraviolet region and which preferably includes some or all of the band at 180 to about 250 nm, where solar ultraviolet radiation is most intense.

Preferred thicknesses of the alternating layers of high and low index of refraction in the quarterwave stack may also be calculated using computer modeling based on formal optical and interference theory. A commercially available software package which is suitable for such modeling is FTG Film-Star® (FTG Software Associates, Princeton, N.J., USA). In addition, the effects of one or more additional layers, such as coupling layers, matching layers, and suppression layers, such as sixteenthwave layers, eighthwave layers, quarterwave layers, and halfwave layers of the same or different material, as well as the effects of including other quarterwave stacks, may be examined. In this way, preferred thicknesses for the various layers may be accurately calculated, and the values ultimately selected may differ (as discussed above) from the simple quarterwave calculation.

By employing computer modeling, it is possible to select layer thicknesses which yield an overall reflectance or transmittance curve or profile which is desirable. For example, fringes and ripple may be reduced or eliminated, color balance and/or color neutrality may be adjusted, and edge sharpness between high transmission and high reflectance bands may be increased, all by adjusting the layer thicknesses, adding one or more layers, or adding one or more different quarterwave stacks, as facilitated by computer modeling. For example, ripple which appears in the pass band (i.e., in the visible region) may often be reduced or removed by adding an outermost matching layer and/or by adjusting the thicknesses of the one or more (often 2 or 3) of the outermost layers. A common algorithm systematically varies the thicknesses of several outer layers, calculates the resulting transmission, assesses the resulting transmission properties using a least squares analysis, and compares the result with some preselected transmission threshold. In this way, the layer thicknesses may be iteratively varied to yield a desirably flat transmission over a certain wavelength band (e.g., visible), while maintaining a certain average transmission (e.g., tolerance) within that band (e.g., 80%) and optionally a certain average reflectance within another (e.g., infrared) band.

Interference films often have visible colors (e.g., the colors seen on a soap bubble or oil film), which are often strongly dependent on the view angle (e.g., angle of incidence, angle of reflection). In most cases, it is desirable to have thermal control films which do not exhibit these effects, that is, which have transmittance and reflectance profiles which are substantially color neutral at all, or nearly all, viewing angles.

The level of color neutrality may be defined such that the ratio of the maximum transmission at any wavelength between 380 and 750 nm (or some subrange thereof, e.g., 400 to 700 nm) to the minimum transmission at any wavelength in the same range, is less than a preselected threshold (e.g., 1.5, 1.7, 2.0, 2.5). Similarly, the ratio of the maximum reflectance at any wavelength between 380 and 750 nm (or some subrange thereof, e.g., 400 to 700 nm) to the minimum reflectance at any wavelength in the same range, is less than a preselected threshold (e.g., 1.5, 1.7, 2.0, 2.5).

The color neutrality may also be described using industry standard (CIE accepted) "color space coordinates," L, a*, and b*, or the "color coordinate" L*a*B*. Color space is characterized by a right-handed coordinate system in which increasing red is along the positive a* axis, increasing green is along the negative a* axis, increasing yellow is along the positive b* axis, increasing blue is along the negative b* axis, increasing white (or lightness) is along the positive L* axis, and increasing black (or darkness) is along the negative L* axis. The transmission color may be denoted by coordinates TL*, Ta*, and Tb*, while the reflectance color may be denoted by coordinates RL*, Ra*, and Rb*. Color neutrality may then be defined by Ta*, Tb*, Ra*, and Rb* all below a maximum absolute value, for example, all below 10, all below 8, all below 6, or all below 4.

The color balance or color neutrality of an interference film, such as the multilayer coatings of the present invention, may be adjusted to minimize these usually undesirable effects, usually by adjusting layer thicknesses, adding more dielectric layers, and/or adding one or more different quarterwave stacks. Methods and algorithms for adjusting color balance are shown, for example, in Perilloux et al., 1990; Ando et al., 1991. Again, commercially available software, such as FTG FilmStar®, can be used to model and evaluate coatings during design to adjust (e.g., minimize) these effects. In this way, preferred thicknesses for the various layers may be accurately calculated, and the values ultimately selected may differ (as discussed above) from the simple quarterwave calculation.

The optical properties of a thermal control film may be determined using a suitable spectrophotometer, typically one which is capable of measurement from the ultraviolet region to the infrared region. Transmittance and reflectance measurements may be recorded using standard methods. Refractive index, n, and extinction coefficients, k, over the wavelength range 190 to 3000 nm may be calculated from transmittance and reflectance measurements. See, for example, Fulton, 1994. Many such spectrophotometers are commercially available, and a suitable one is a Shimadzu UV-3101PC UV-Vis-NIR Spectrophotometer (Shimadzu Scientific Instruments, Columbia, Md., USA). The recorded transmittance and/or reflectance data may be transferred to a suitable computer program, such as FTG FilmStar®, for further analysis or manipulation.

The thermal control film is characterized by an average transmittance of visible radiation of wavelength 380 to 750 nm at 0° incidence of at least 50%. The average transmittance may be easily calculated by integrating transmittance over this wavelength range and dividing by the width of the range, 370 nm. Preferably, the average transmittance is at least 60%, more preferably at least 70%, still more preferably at least 80%, yet more preferably at least 90%. In one embodiment, the average transmittance of visible radiation is similarly determined for the wavelength 380 to 780 nm, which is of particular interest in the automotive glazing industry.

In one embodiment, the thermal control film is characterized by an average transmittance of solar visible radiation of wavelength 380 to 750 nm at 0° incidence of at least 50%. The average solar transmittance may be easily calculated by first multiplying the transmittance at each wavelength by the solar radiance or intensity at an air mass of one at that wavelength to yield a solar weighted transmittance curve, subsequently integrating the solar weighted transmittance curve over this wavelength range, and finally dividing by the width of the range, 370 nm. Solar radiance or intensity data, such as those shown in FIG. 1, are suitable for use in the calculation. Preferably, the average solar transmittance is at least 60%. Preferably, the average solar transmittance is at least 60%, more preferably at least 70%, still more preferably at least 80%, yet more preferably at least 90%. Again, in one embodiment, the average transmittance of solar visible radiation is similarly determined for the wavelength 380 to 780 nm.

The thermal control film is characterized by an average reflectance in an infrared radiation band at least 100 nm wide and which falls within the wavelength band 750 to 2000 nm, at 0° incidence, of at least 50%. Again, the average reflectance may be easily calculated by integrating reflectance over the selected wavelength range and dividing by the width of the selected range. Preferably, the average reflectance is at least 60%, more preferably at least 70%, still more preferably at least 80%, yet more preferably at least 90%.

In one embodiment, the thermal control film is characterized by an average reflectance of a solar infrared radiation band which is at least 100 nm wide and falls within the wavelength band 750 to 2000 nm, at 0° incidence, of at least 50%. The average solar reflectance may be easily calculated by first multiplying the reflectance at each wavelength by the solar radiance or intensity at an air mass of one at that wavelength to yield a solar weighted reflectance curve, subsequently integrating the solar weighted reflectance curve over this wavelength range, and finally dividing by the width of the selected range. Again, solar radiance or intensity data, such as those shown in FIG. 1, are suitable for use in the calculation. Preferably, the average solar reflectance is at least 60%, more preferably at least 70%, still more preferably at least 80%, yet more preferably at least 90%.

Preferred infrared radiation bands, which fall within the wavelength band 750 to 2000 nm, are those which span at least 150 nm, still more preferably at least 175 nm, still more preferably at least 200 nm, still more preferably at least 225 nm, still more preferably at least 250 nm, still more preferably at least 300 nm, still more preferably at least 400 nm, still more preferably at least 500 nm.

Examples of infrared radiation bands which are at least 100 nm wide and fall within the wavelength band 750 to 2000 nm include all suitably wide ranges and sub-ranges between 750 and 2000 nm, inclusive, including but not limited to the following ranges:

750 to 1800 nm; 750 to 1600 nm; 750 to 1500 nm; 750 to 1400 nm; 750 to 1300 nm; 750 to 1250 nm; 750 to 1200 nm; 750 to 1150 nm; 750 to 1100 nm; 750 to 1050 nm; 750 to 1000 nm; 750 to 950 nm;

800 to 1800 nm; 800 to 1600 nm; 800 to 1500 nm; 800 to 1400 nm; 800 to 1300 nm; 800 to 1250 nm; 800 to 1200 nm; 800 to 1150 nm; 800 to 1100 nm; 800 to 1050 nm; 800 to 1000 nm; 800 to 950 nm;

850 to 1800 nm; 850 to 1600 nm; 850 to 1500 nm; 850 to 1400 nm; 850 to 1300 nm; 850 to 1250 nm; 850 to 1200 nm; 850 to 1150 nm; 850 to 1100 nm; 850 to 1050 nm; 800 to 1000 nm; 800 to 950 nm.

In one embodiment, the thermal control film is further characterized by an average transmittance in an infrared radiation band at least 1 micron wide and which falls within the wavelength band 2 to 15 microns, at 0° incidence, of at least 50%. Again, the average transmittance may be easily calculated by integrating reflectance over the selected wavelength range and dividing by the width of the selected range. Preferably, the average transmittance is at least 60%, more preferably at least 70%, still more preferably at least 80%, yet more preferably at least 90%.

Preferred infrared radiation bands, which fall within the wavelength band 2 to 15 microns, are those which span at least 2 microns, still more preferably at least 3 microns, still more preferably at least 5 microns, still more preferably at least 10 microns.

Examples of infrared radiation bands which are at least 1 micron wide and fall within the wavelength band 2 to 15 microns include all suitably wide ranges and sub-ranges between 2 and 15 microns, inclusive, including but not limited to the following ranges:

2 to 15 microns; 2 to 12 microns; 2 to 10 microns; 2 to 8 microns;

3 to 15 microns; 3 to 12 microns; 3 to 10 microns; 3 to 8 microns;

4 to 15 microns; 4 to 12 microns; 4 to 10 microns; 4 to 8 microns;

6 to 15 microns; 6 to 12 microns; 6 to 10 microns; 6 to 8 microns.

Thermal control films may be prepared using any suitable thin film coating method known in the art, including physical vapor deposition (PVD) and chemical vapor deposition (CVD) methods, including but not limited to ion-assisted physical vapor deposition (IAD), plasma assisted deposition, plasma enhanced chemical vapor deposition, evaporation (e.g., resistance heated, laser heated or vaporized, electron beam heated or vaporized), sputtering (e.g., DC, diode, RF, magnetron, planar magnetron, cylindrical magnetron, co-sputtering, dreactive sputtering) under normal, high pressure, low pressure, and/or reactive conditions. Methods for depositing dielectrics are described, for example, in Wolfe et al., 1991.

In one embodiment, the thermal control film is prepared using Ion-Assisted-Deposition (IAD), also referred to as Ion-Assisted Physical Vapor Deposition, which is known to those of skill in art of thin film deposition. In this method, a film forming material is deposited on a substrate surface while the surface is simultaneously bombarded with energetic (and often reactive) ions. For example, in one configuration for the deposition of silica, a boat or crucible containing high purity silica is heated to evaporation temperature using a conventional electron beam heated evaporation source. The evaporation source is operated in an ambient pressure of about $10^{-4}$ Torr (~$1.3 \times 10^{-5}$ millibar) of oxygen. An aperture of the source, which faces the substrate, may be shuttered or exposed to permit the controlled deposition of the silica. During deposition, energetic ions may be generated using an ion source (for example, an End-Hall ion source) which is operated in the presence of an ambient atmosphere of a gas (often a reactive gas) and under voltage and current conditions to generate a population of gas phase ions. These ions are then directed toward the substrate surface where the film is being grown. Recent discussions of the use of IAD are provided, for example, in Buchel et al., 1993, and Fulton et al., 1994, 1996, which were co-authored by a co-inventor of the present invention.

IAD operating parameters, including but not limited to the choice of gas, the operating pressure, and the deposition rate may be adjusted according to need, and to improve the quality (e.g., stoichiometry, porosity, stacking density, refractive index, and physical stability) of the resulting film. Deposition rates, film thicknesses, and indices of refraction of the growing films can be monitored by vibrating crystal measurements and in situ optical measurements. Deposition rates of about 0.1 to about 2.0 nm/sec are typical.

An additional advantage of IAD arises from the fact that the substrate temperature remains relatively low during deposition, a feature particularly valuable for organic polymeric substrates such as poly(ethylene terephthalate) (PET). For example, in the deposition described in the Examples below, the substrate temperature, as measured using a thermocouple, rose from 25° C. to about 60° C. during deposition.

In another embodiment, a continuous process for fabricating multilayer coatings may be employed, as in, for example, "roll-to-roll" or "web" methods. In one such method, a polymer sheet is scrolled from a source roll to a final roll via a number of intermediate rollers, all within a continuously operating vacuum chamber. During the scrolling process, a thin metal coating is first deposited on the polymer sheet (e.g., in a deposition zone), and this thin metal coating is subsequently reacted (e.g., oxidized) to form a thin coating of metal compound (e.g., metal oxide) (e.g., in a reaction zone). The polymer sheet may be repeatedly scrolled from source to final roll in order to deposit successive layers. An example of a web-coating apparatus and method is described in Misiano et al., 1996.

Thermal control films, as described herein, may be further modified to facilitate their use in the manufacture of glazing products, or in the retrofitting of glazing products. In such applications, it is often desirable to further modify the thermal control film to include, for example, an optically acceptable (e.g., visibly transparent) adhesive layer.

For example, a thermal control film may be further coated with an adhesive layer or activatable adhesive layer, which may then be covered with a release liner or liner or protective sheet or sheets, if desired or necessary. In this way, the flexible thermal control film may be easily and safely handled (e.g., during shipping, storage, and use in manufacture). Shortly before the thermal control film is to be adhered to a glazing substrate, the release liner or liners or protective sheet or sheets, if present, is removed, exposing the adhesive layer. If necessary, the adhesive layer may then be activated. The thermal control film is then adhered to the glazing substrate according to the nature of the adhesive layer, for example, with the application of pressure, heat, radiation, water, steam, and the like.

Preferred adhesives are optically clear or approximately optically clear. Adhesives may be non-carrier adhesives or carrier-adhesives (as in, for example, a thin sheet of PET with an adhesive coating on each face). The adhesive may be, for example, pressure activated, chemically activated (e.g., water activated), heat activated (e.g., by autoclaving) or radiation activated (e.g., UV activated). A preferred class of adhesives include, but are not limited to, acrylic adhesives, such as water soluble acrylic adhesives. Other adhesives, such as epoxies (e.g., liquid epoxies), resins, and the like may also be suitable.

In one embodiment, the multilayer coating is metal-free. In one embodiment, the thermal control film is metal-free. The term "metal-free," as used herein, pertains to a laminar structure (e.g., thermal control film, composite thermal control film, glazing assembly) which does not comprise a layer of metal. For example, many commercially available thermal control films rely on a thin (often about 5 to 20 nm) layer of metal (e.g., aluminum, silver, gold) to reduce transmission (either by increasing reflection or absorption) of certain wavelength bands. Metal-free multilayer coatings and thermal control films of the present invention do not comprise such a metal layer.

A schematic diagram (not to scale) illustrating the cross-section of a single-sided thermal control film is presented in FIG. 2A. In this figure, L denotes a layer of low index of refraction inorganic dielectric material, H denotes a layer of high index of refraction inorganic dielectric material, and S denotes the thin flexible polymeric substrate.

Double-Sided Thermal Control Films

In one embodiment, the present invention pertains to a thermal control film comprising (a) a thin flexible polymeric sheet having a first face and an opposite second face; (b) a first multilayer coating on said first face, said coating comprising two or more contiguous alternating layers of high and low index of refraction inorganic dielectric material of optical thickness approximately equal to one quarter of a first infrared center wavelength, $\lambda_1$; and (c) a second multilayer coating adhered to said second face, said coating comprising two or more contiguous alternating layers of high and low index of refraction inorganic dielectric material of optical thickness approximately equal to one quarter of a different second infrared center wavelength, $\lambda_2$; said thermal control film characterized by an average transmittance of visible radiation of wavelength 380 to 750 nm at 0° incidence of at least 50%; said thermal control film further characterized an average reflectance in an infrared radiation band which is at least 100 nm wide and falls within wavelength band 750 to 2000 nm, at 0° incidence, of at least 50%.

It may be convenient to denote such a thermal control film as F or $X_1PX_2$, wherein P denotes the thin flexible polymeric sheet and $X_1$ and $X_2$ denote the first and second multilayer coatings (each of which comprise two or more contiguous alternating layers of high and low index of refraction inorganic dielectric material), respectively. Embodiments of this nature may be conveniently referred to as "double-sided" thermal control films. (In contrast, embodiments wherein a multilayer coating is adhered to only one of the two opposite faces may be conveniently referred to as "single-sided" thermal control films.)

Double-sided thermal control films often also have the advantage of being physically more resilient than single-sided thermal control films. The intrinsic stress (e.g., compressive, tensile) of the coating materials can often deform the substrate and lead to a loss of adhesion. The presence of multilayer coatings (comprising layers of dielectric material) on opposite sides of the thin flexible polymeric sheet can balance the intrinsic stresses, and therefore reduce or prevent deformation (e.g., curling), and the resultant loss of adhesion (e.g., flaking, crazing, separation). Such properties of double-sided thermal control films permit the use of desirable thicker multilayer coatings (comprising layers of dielectric material) which would not be possible with single-sided thermal control films. In addition, the use of two or more multilayer coatings in double-sided thermal control films may permit the broadening of the reflection band, the reduction of ripple and color imbalance in the transmission band, and the introduction of a higher order ultraviolet reflection band, as discussed below.

In such an embodiment, the first and second multilayer coatings may be the same or different, but preferably are different. The first and second multilayer coatings may comprise the same inorganic dielectric materials, some of the same inorganic dielectric materials, or none of the same inorganic dielectric materials. In one embodiment, both the first and second multilayer coatings comprise the same inorganic dielectric materials. In one embodiment, both the first and second multilayer coatings comprise layers of silica and titania.

The first and second multilayer coatings each comprise two or more contiguous alternating layers of high and low index of refraction inorganic dielectric material of optical thickness approximately equal to one quarter of a first or second infrared center wavelength, $\lambda_1$ or $\lambda_2$, respectively. Examples of center infrared wavelengths include those described above for single-sided thermal control films. The first and second multilayer coatings may have the same center wavelength, $\lambda_1=\lambda_2=\lambda_0$, or different center wavelengths, $\lambda_1 \neq \lambda_2$.

In one embodiment, the first and second multilayer coatings each comprise two or more contiguous alternating layers of high and low index of refraction inorganic dielectric material of optical thickness approximately equal to one quarter of the same center wavelength, $\lambda_0$. In this way, it is possible to further improve the reflectance in the selected infrared reflectance band.

In a preferred embodiment, each of the first and second multilayer coatings comprise two or more contiguous alternating layers of high and low index of refraction inorganic dielectric material of optical thickness approximately equal to one quarter of different center wavelengths, $\lambda_1 \neq \lambda_2$. By choosing different center wavelengths, it is possible to widen or enlarge the infrared reflectance band. For example, a double-sided thermal control film with a first dielectric stack centered on about 900 nm and a second dielectric stack centered on about 1000 nm will have a combined infrared reflectance band from about 800 to about 1100 nm.

In addition, when different center wavelengths are chosen, a smoothing or harmonizing effect is usually observed (which can be further optimized by small adjustments to the layer thicknesses, as described above), whereby ripples and fringes in the visible transmittance band may be reduced or removed. Similarly, variations in the transmittance band as a function of viewing angle may also be reduced or removed.

Furthermore, when different center wavelengths are chosen, it may be preferable to select, as one of center wavelengths, a wavelength which has a higher order (e.g., third order) reflectance band which falls in the ultraviolet region and which preferably includes some or all of the band at 180 to about 250 nm, where solar ultraviolet radiation is most intense.

In one embodiment, the center wavelengths of the first and second multilayer coatings differ by more than 50 nm (that is, from about 50 nM to about 1000 nm). In one embodiment, the center wavelengths of the first and second multilayer coatings differ by more than 100 nm (that is, from about 100 nm to about 1000 nm). In one embodiment, the center wavelengths of the first and second multilayer coatings differ by more than 200 nm (that is, from about 200 nm to about 1000 nm). In one embodiment, the center wavelengths of the first and second multilayer coatings differ by more than 300 nm (that is, from about 300 nm to about 1000 nm). In one embodiment, the center wavelengths of the first and second multilayer coatings differ by more than 500 nm (that is, from about 500 nm to about 1000 nm).

In one embodiment, the center wavelengths of the first and second multilayer coatings differ by about 50 nm. In one embodiment, the center wavelengths of the first and second multilayer coatings differ by about 100 nm. In one embodiment, the center wavelengths of the first and second multilayer coatings differ by about 150 nm. In one embodiment, the center wavelengths of the first and second multilayer coatings differ by about 200 nm. In one embodiment, the center wavelengths of the first and second multilayer coatings differ by about 250 nm. In one embodiment, the center wavelengths of the first and second multilayer coatings differ by about 300 nm. In one embodiment, the center wavelengths of the first and second multilayer coatings differ by about 400 nm. In one embodiment, the center wavelengths of the first and second multilayer coatings differ by about 500 nm.

In addition to the two or more contiguous alternating layers of high and low index of refraction inorganic dielectric material, each of the first and second multilayer coatings may further comprise one or more additional layers, as discussed above. Again, it may be convenient to denote such an additional layer as "A". For example, an additional layer may be included atop one or both of the dielectric stacks (far from the substrate), as in, for example, $X_1PX_2A$ and $AX_1PX_2$. Alternatively, an additional layer may be included beneath the first dielectric stack, between the first dielectric stack and the thin flexible polymeric sheet and/or an additional layer may be included beneath the second dielectric stack, between the second dielectric stack and the polymeric sheet (close to the substrate), as in, for example, $X_1PAX_2$ and $XIAPX_2$. Alternatively, such an additional layer may be included between stacks (interstitially), as in, for example, $X_1PX_2AX_3$. Combinations of these geometries are possible with two or more optional layers, as in, for example, $AX_1PAX_2$, $X_1PAX_2A$, and $AX_1PAX_2A$. Examples of additional layers include, but are not limited to, those discussed above.

The first and second multilayer coatings are adhered to the first and second (opposite) faces of the thin flexible polymeric sheet, respectively, as discussed above. Each of the first and second multilayer coatings may be a "direct" coating or an "indirect" coating, according to the presence of one or more additional layers, as discussed above.

The double-sided thermal control films are characterized by an average transmittance, average reflectance, average solar transmittance, and average solar reflectance as discussed above for single-sided thermal control films.

In most cases, double-sided thermal control films may be prepared using the same methods employed for the preparation of single-sided thermal control films, discussed above. In one embodiment, where Ion-Assisted-Deposition (IAD) is employed, a substrate may be mounted in the deposition chamber and a first multilayer coating deposited. After completion of the first coating, the substrate is demounted, flipped over, and remounted so that the uncoated substrate surface is presented. A second multilayer coating is then deposited.

Like single-sided thermal control films, double-sided thermal control films may be further modified to facilitate their use in the manufacture of glazing products, or in the retrofitting of glazing products. In such applications, it is often desirable to further modify the thermal control film to include, for example, an adhesive layer.

In one embodiment, a double-sided thermal control film is further modified to include, on one side, a protective "hardcoat" and on the opposite site, an adhesive layer. In this way, the configuration is: hardcoat | coating 1| substrate | coating 2| adhesive. In one embodiment, one or both of the multilayer coatings is metal-free. In one embodiment, the double-sided thermal control film is metal-free.

Figure 2B:
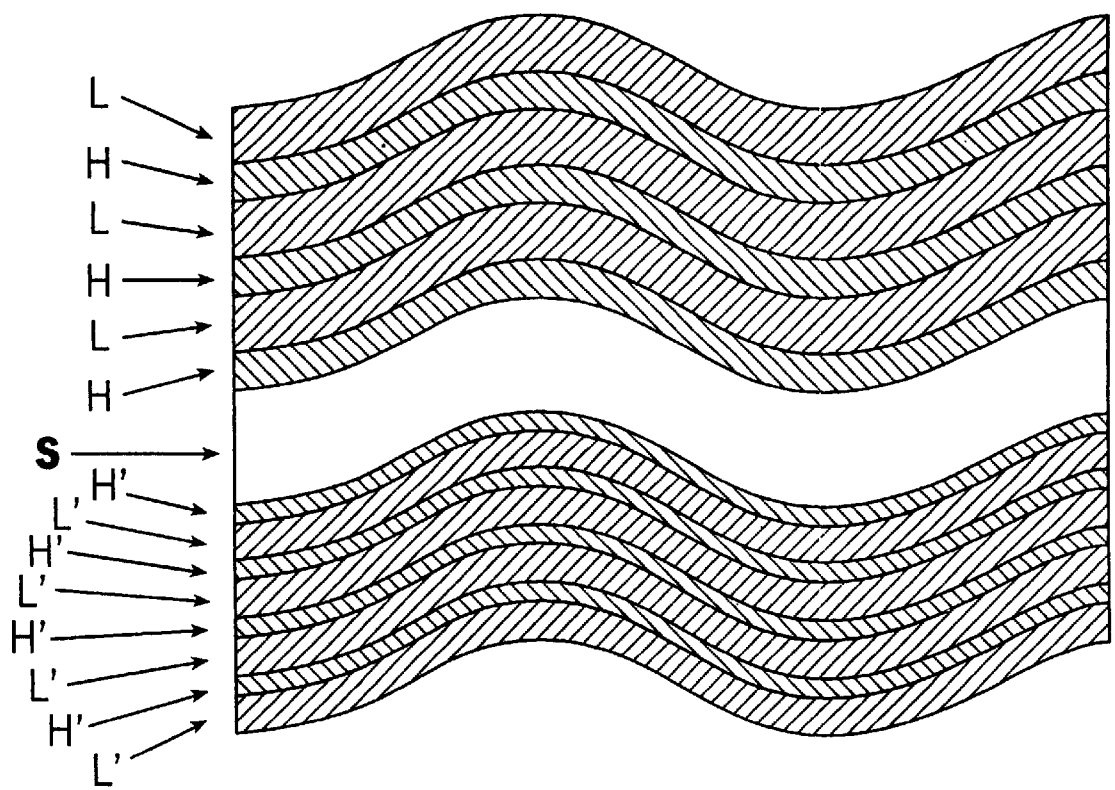
FIG. 2B is a schematic diagram (not to scale) illustrating the cross-section of a double-sided thermal control film.
Figure 2C:
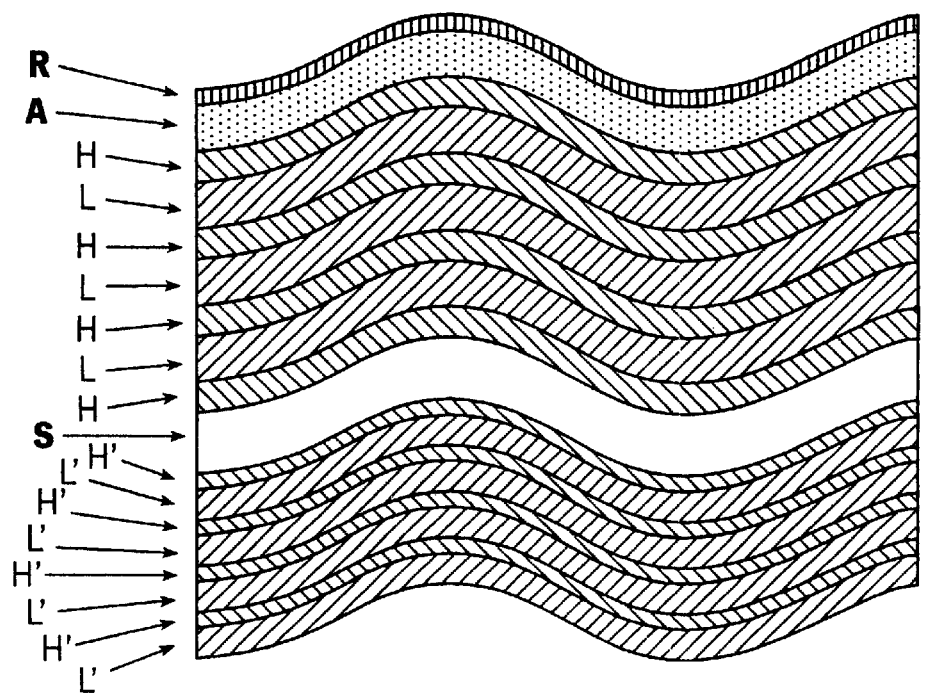
FIG. 2C is a schematic diagram (not to scale) illustrating the cross-section of a double-sided thermal control film further comprising an adhesive layer with a release liner.
Figure 2D:
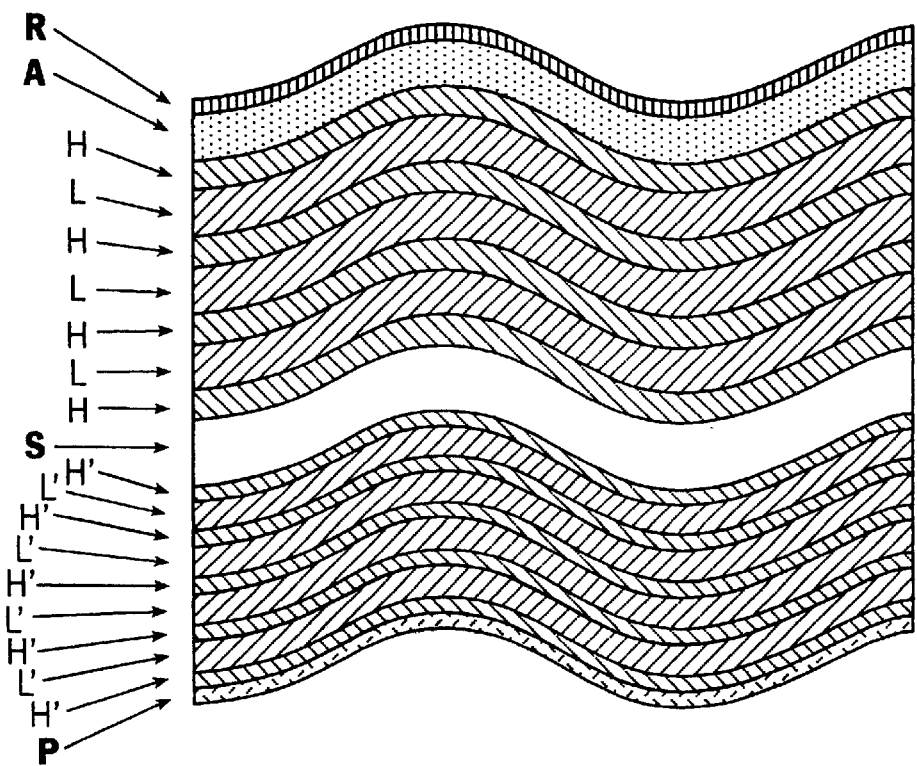
FIG. 2D is a schematic diagram (not to scale) illustrating the cross-section of a double-sided thermal control film further comprising, on one side, an adhesive layer with a release liner, and on the other side, a protective coating.

A schematic diagram (not to scale) illustrating the cross-section of a double-sided thermal control film is presented in FIG. 2B. A schematic diagram (not to scale) illustrating the cross-section of a double-sided thermal control film further comprising an adhesive layer with a release liner is presented in FIG. 2C. A schematic diagram (not to scale) illustrating the cross-section of a double-sided thermal control film further comprising, on one side, an adhesive layer with a release liner, and on the other side, a protective coating is presented in FIG. 2D. In these figures, L and L' denote layers of low index of refraction dielectric material, H and H' denote layers of high index of refraction dielectric material, S denotes the thin flexible polymeric substrate, A denotes an adhesive layer, R denotes a release liner layer, and P denotes a protective layer.

Composite Thermal Control Films

In one embodiment, the present invention pertains to a composite thermal control film comprising (a) a first thermal control film, as described herein, and (b) a second thermal control film, as described herein, adhered to said first thermal control film. It may be convenient to denote such a composite thermal control film as $F_c$ or $F_1F_2$, wherein $F_1$ and $F_2$ denote the first and second thermal control films, respectively.

Each of the first and second thermal control films may be independently single-sided (e.g., $PX_1$) or double-sided (e.g., $X_2PX_3$). If one or both of the first and second thermal control films is single-sided, then the two thermal control films may be oriented to have, or not to have, adjacent multilayer coatings, as in, for example, $PX_1$-$X_2PX_3$ (face to face) or $X_1P$-$X_2PX_3$ (face to back). Similarly, two single-sided thermal control films may be oriented face to face ($PX_1$-$X_2P$), face to back ($PX_1$-$PX_2$), or back to back ($X_1P$-$PX_2$) in a composite thermal control film.

In one embodiment, the composite thermal control film comprises exactly two thermal control films. In one embodiment, the composite thermal control film comprises exactly two single-sided thermal control films, as in, for example, $X_1P$-$PX_2$, $X_1P$-$X_2P$, and $PX_1$-$X_2P$. In one embodiment, the composite thermal control film comprises exactly two double-sided thermal control films, as in, for example, $X_1PX_2$-$X_3PX_4$. In one embodiment, the composite thermal control film comprises exactly one single-sided thermal control film and exactly one double-sided thermal control film, as in, for example, $X_1P-X_2PX_3$ and $PX_1-X_2PX_3$. In one embodiment, the composite thermal control film comprises three or more thermal control films, each of which may independently be a single-sided or double-sided thermal control film. In each case, $X_1$, $X_2$, and $X_3$ denote multilayer coatings (each of which comprise two or more contiguous alternating layers of high and low index of refraction inorganic dielectric material) which may be the same or different, but which are preferably different, and which may have the same or different center infrared wavelength, $\lambda$, but which preferably have different center infrared wavelengths, $\lambda_1 \neq \lambda_2 \neq \lambda_3$.

Again, by the term "adhered," it is meant that the first thermal control film is firmly attached or bound to the second thermal control film. In one embodiment, the first thermal control film is directly adjacent to, and in contact with, the second thermal control film. In one embodiment, one or more additional layers may be present between the first thermal control film and the second thermal control film. For example, for a single additional layer, the first thermal control film is directly adjacent to, and in contact with, the additional layer, which additional layer is directly adjacent to, and in contact with, the second thermal control film.

The composite thermal control film may further comprise one or more additional layers. Again, it may be convenient to denote such an additional layer as "A". One or more optional layers may be included in the composite thermal control film, as in, for example, $AF_1F_2$, $F_1AF_2$, $F_1F_2A$, $AF_1AF_2$, $AF_1F_2A$, $F_1AF_2A$, and $AF_1AF_2A$. Examples of additional layers include, but are not limited to, those discussed above.

The composite thermal control films are characterized by an average transmittance, average reflectance, average solar transmittance, and average solar reflectance as discussed above for single-sided thermal control films.

It may be convenient to refer to the composite thermal control film as a "laminate" of two or more thermal control films, wherein two or more thermal control films are laminated together. For example, two thermal control films are laminated together to form a single composite thermal control film which retains most, if not all, of the optical properties of each of the initial thermal control films. Furthermore, the individual initial thermal control films may act synergistically together to yield a composite thermal control film with desirable optical properties (e.g., color balance, edge sharpness) not present in the individual isolated thermal control films.

Composite thermal control films may be prepared by laminating or otherwise bonding two more thermal control films together, either alone or with one or more intervening bonding layers. Thus, in one embodiment, an optically acceptable (e.g., visibly transparent) "bonding" layer is employed to form the composite thermal control film. This bonding layer acts to adhere one thermal control film to another. For example, first and second single-sided thermal control films may be laminated together (e.g., face to face, face to back, back to back) using a suitable bonding layer. The bonding layer may be an adhesive material and may, for example, be pressure activated, chemically activated (e.g., water activated), heat activated (e.g. by autoclaving) or radiation activated (e.g., UV activated).

Bonding layers for laminating thermal control films together to form a composite thermal control film are preferably optically clear. Examples of suitable bonding layers include, but are not limited to, optically clear acrylic adhesives, such as optically clear pressure-sensitive acrylic adhesives. An example of a preferred bonding layer is sold under the tradename 3M® 8142 (from 3M Identification & Converter Systems Division, St. Paul, Minn., USA), which is an optically clear pressure-sensitive laminating acrylic adhesive which may or may not be provided with a release liner or liners. Another example of a preferred bonding layer is sold under the tradename PermaTrans® IP-2100 (from MACtac U.S.A., Stow, Ohio, USA), which is a thin clear polyester film, coated on each side with an optically clear pressure-sensitive acrylic adhesive, and may or may not be provided with a release liner or liners. Bonding layers may advantageously also comprise an ultraviolet absorber, as described herein.

The composite thermal control films are characterized by an average transmittance, average reflectance, average solar transmittance, and average solar reflectance as discussed above for single-sided thermal control films.

Like thermal control films, composite thermal control films may be further modified to facilitate their use in the manufacture of glazing products, or in the retrofitting of glazing products. In such applications, it is often desirable to further modify the composite thermal control film to include, for example, an adhesive layer (e.g., a retrofitting adhesive). In one embodiment, one or more of the multilayer coatings is metal-free. In one embodiment, the composite thermal control film is metal-free.

Figure 3B:
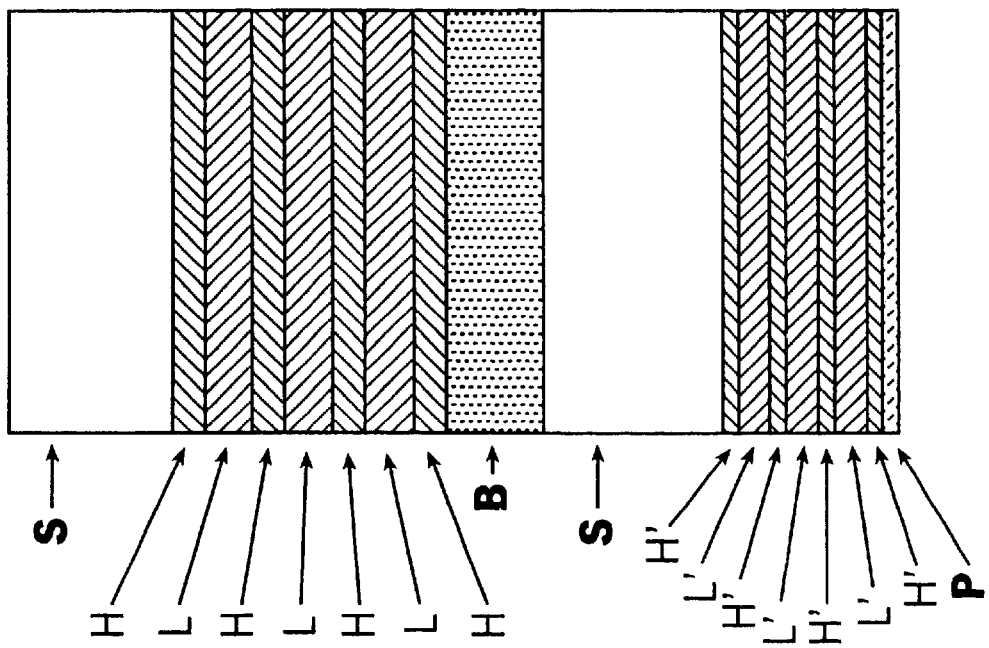
FIG. 3B is a schematic diagram (not to scale) illustrating the cross-section of a composite thermal control film comprising two single-sided thermal control films adhered face-to-back via a bonding layer.
Figure 3A:
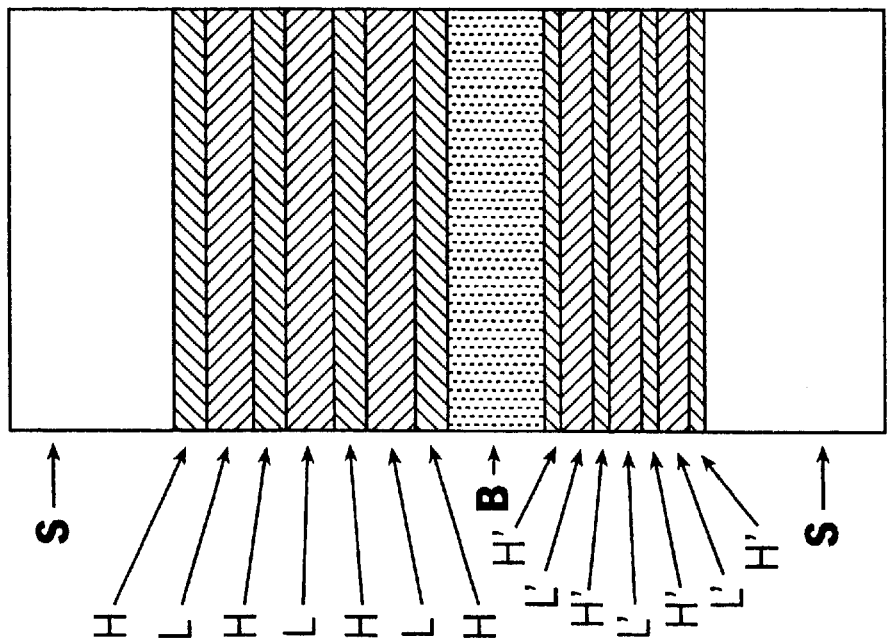
FIG. 3A is a schematic diagram (not to scale) illustrating the cross-section of a composite thermal control film comprising two single-sided thermal control films adhered face-to-face via a bonding layer.
Figure 3D:
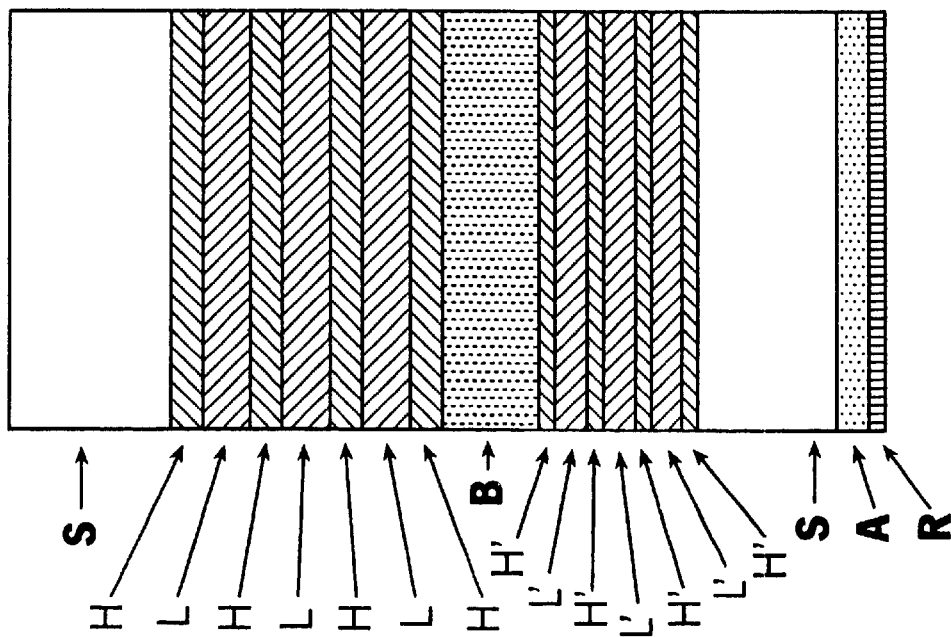
FIG. 3D is a schematic diagram (not to scale) illustrating the cross-section of a composite thermal control film comprising two single-sided thermal control films adhered face-to-face via a bonding layer further comprising an adhesive layer with a release liner.
Figure 3C:
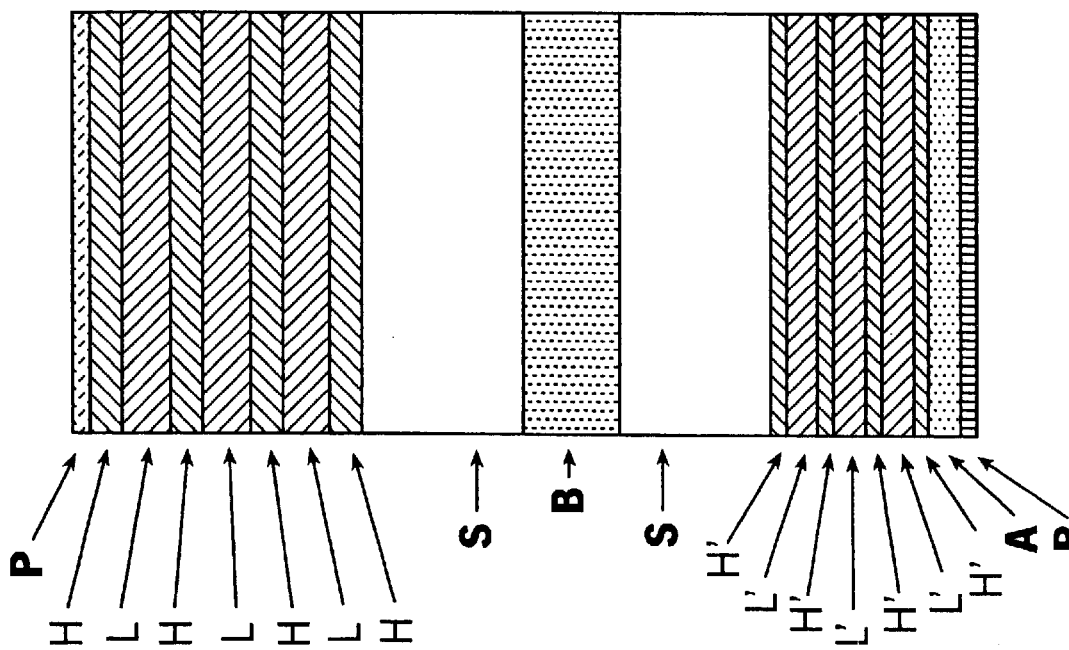
FIG. 3C is a schematic diagram (not to scale) illustrating the cross-section of a composite thermal control film comprising two single-sided thermal control films adhered back-to-back via a bonding layer.
Figure 3E:
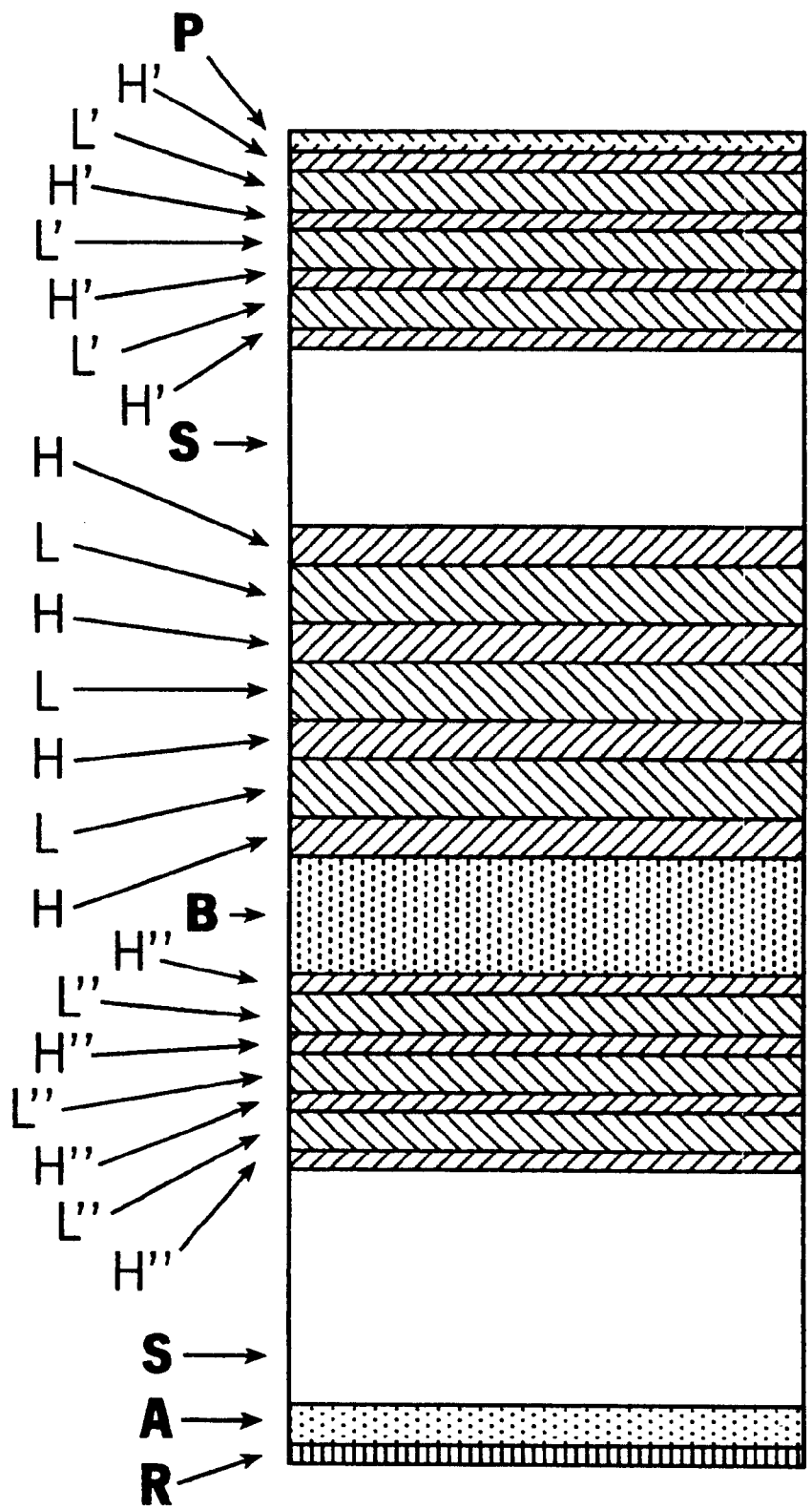
FIG. 3E is a schematic diagram (not to scale) illustrating the cross-section of a composite thermal control film comprising one single-sided thermal control film and one double-sided thermal control film adhered face-to-face via a bonding layer.

A schematic diagram (not to scale) illustrating the cross-section of a composite thermal control film comprising two single-sided thermal control films adhered face-to-face via a bonding layer is shown in FIG. 3A. A schematic diagram (not to scale) illustrating the cross-section of a composite thermal control film comprising two single-sided thermal control films adhered face-to-back via a bonding layer, and further comprising a protective layer, is shown in FIG. 3B. A schematic diagram (not to scale) illustrating the cross-section of a composite thermal control film comprising two single-sided thermal control films adhered back-to-back via a bonding layer, and further comprising, on one side, an adhesive layer with a release liner, and on the other side, a protective coating, is shown in FIG. 3C. A schematic diagram (not to scale) illustrating the cross-section of a composite thermal control film comprising two single-sided thermal control films adhered face-to-face via a bonding layer, and further comprising an adhesive layer with a release liner is shown in FIG. 3D. A schematic diagram (not to scale) illustrating the cross-section of a composite thermal control film comprising one single-sided thermal control film and one double-sided thermal control film adhered face-to-face via a bonding layer, and further comprising, on one side, an adhesive layer with a release liner, and on the other side, a protective coating, is shown in FIG. 3E. In these figures, L, L', and L" denote layers of low index of refraction dielectric material, H, H', and H" denote layers of high index of refraction dielectric material, S denotes a thin flexible polymeric substrate, B denotes a bonding layer, A denotes an adhesive layer, R denote a release liner, and P denotes a protective layer.

Glazing Products and Glazing Assemblies

The thermal control films and composite thermal control films, as described herein, are particularly useful as improvements to glazing products. For example, the thermal control films and composite thermal control films may be incorporated into a glazing product during manufacture for subsequent use in a vehicle (e.g., automobile windscreen) or in a dwelling (e.g., windows). Alternatively, the thermal control films and composite thermal control films may be added to a glazing product after installation, as in retrofitting, in many of the same applications.

In one embodiment, the present invention pertains to a glazing assembly which comprises (a) a glazing substrate having at least one face, and (b) a thermal control film or a composite thermal control film, as described herein, adhered to said face. It may be convenient to denote such glazing assemblies as GF or $GF_c$, wherein "G" denotes the glazing substrate, F denotes a thermal control film, and $F_c$ denotes a composite thermal control film.

In one embodiment, the present invention pertains to a method of making a glazing assembly comprising the steps of: (i) providing a glazing substrate having at least one face; and, (ii) adhering to said face a thermal control film or a composite thermal control film, as described herein.

The term "glazing substrate," as used herein, pertains to glazing materials used in glazing applications, and through which some or all of incident visible light is transmitted. In most cases, the glazing substrate is rigid. The glazing substrate may be, for example, a window, viewport, or the like. The glazing substrate may be, for example, a vehicular glazing substrate such as a window, windshield, windscreen, canopy, pane, or like, as used in vehicles such as automobiles, trains, boats, aircrafc, and spacecraft. Also, the glazing substrate may be, for example, an architectural glazing substrate such as a window, viewport, skylight, pane, or the like, as used in buildings, such as domestic buildings and commercial buildings.

The glazing substrate is comprised of a glazing material. One class of glazing materials are glasses, including but not limited to, uncoated glass, coated glass, tinted glass, reflective glass, low-emissivity glass, metal-impregnated glass, iron-added glass, insulating glass, safety glass, heat-strengthened glass, annealed glass, laminated glass, annealed laminated glass, heat- strengthened laminated glass, fully-tempered laminated glass, monolithic glass, annealed monolithic glass, annealed monolithic glass with film, fully tempered monolithic glass, float glass (e.g., low iron float glass), and plate glass. Common glasses which are suitable as a glazing material include borosilicate glass, Pyrex®, and BK-7 glass. Another class of glazing substrates are rigid plastics, including but not limited to rigid poly(carbonate)s and poly(acrylate)s.

The face of the glazing substrate may be planar or non-planar. Examples of non-planar faces include regular curved faces (e.g., cylindrically concave, cylindrically convex, spherically concave, spherically convex, parabolic, hyperbolic, and the like, and combinations of these) and irregular curved faces. The utility of the flexible thermal control films and composite thermal control films is particularly apparent in such non-planar glazing applications.

By the term "adhered," it is meant that the thermal control film or the composite thermal control film is firmly attached or bound to the glazing substrate. In one embodiment, the thermal control film or the composite thermal control film is directly adjacent to, and in contact with, the glazing substrate. In one embodiment, one or more additional layers may be present between the thermal control film or the composite thermal control film and the glazing substrate. For example, for a single additional layer, the thermal control film or the composite thermal control film is directly adjacent to, and in contact with, the additional layer, which additional layer is directly adjacent to, and in contact with, the glazing substrate.

The glazing assembly may further comprise one or more additional layers. Again, it may be convenient to denote such an additional layer as "A". One or more additional layers may be included in the glazing assembly as in, for example, AGF, GAF, GFA, AGAF, GAFA, AGFA, and AGAFA as well as $AGF_c$, $GAF_c$, $GF_cA$ $AGAF_c$, $GAF_cA$, $AGF_cA$, and $AGAF_cA$. Examples of additional layers include, but are not limited to, those discussed above. In one embodiment, one or more of the multilayer coatings is metal-free. In one embodiment, one or more of the thermal control films or composite thermal control films is metal-free. In one embodiment, the glazing assembly is metal-free.

In one embodiment, the glazing assembly further comprises one or more protective layers, such as antilacerative and/or antishatter coatings (typically plastic coatings), for improved safety properties. Examples of similar safety coatings are shown in Kavanagh et al, 1991.

In one embodiment, the glazing assembly further comprises a protective coating, such as a "hardcoat" or a hard scratch resistant overcoating, often with a thickness of a few to a few hundred microns. Typical hardcoats are the cured products resulting from heat or plasma treatment of (a) a hydrolysis and condensation product of methyltriethoxysilane; or (b) mixtures of poly(silicic acid) and copolymers of fluorinated monomers with compounds containing primary and secondary alcohol groups. Examples of protective coatings are shown in Wolfe et al., 1990; Hood et al., 1991; Meyer et al., 1989; Yatabe et al., 1987.

In one embodiment, an optically acceptable "bonding" layer is employed to form the glazing assembly. This bonding layer acts to adhere the thermal control film or composite thermal control film to the glazing substrate. The bonding layer may be an adhesive material and may, for example, be pressure activated, chemically activated (e.g., water activated), heat activated (e.g., by autoclaving) or radiation activated (e.g., UV activated). Examples of bonding layers for use in glazing are shown in Antonson et al., 1966; Theissen, 1972; Murphy, 1979; Burger, 1978. Bonding layers may advantageously also comprise an ultraviolet absorber, as described herein.

Examples of suitable materials for bonding layers include, but are not limited to, optically acceptable adhesives such as poly(vinyl acetals), ionomer resins, poly(urethane) resins, and poly(vinyl chloride) resins. Poly(vinyl acetals) are vinyl resins resulting from the condensation of a poly(vinyl alcohol) (e.g., $(-CH_2CHOH-)_x$) with an aldehyde (such as formaldehyde, HCHO, acetaldehyde, $CH_3CHO$, propionaldehyde, $CH_3CH_2CHO$, or butyraldehyde, $CH_3CH_2CH_2CHO$).

A commonly preferred adhesive is poly(vinyl butyral), often referred to as PVB. Thin sheets (typically from about 0.1 to about ~1 mm tick) of polyvinyl butyral (PVB) are commercially available as Saflex Interlayer®, from Solutia Inc., formerly Monsanto, St. Louis, Mo., USA.

For example, a simple glazing assembly may be prepared by arranging in a climate controlled clean room an assembly in which a thin sheet of polyvinyl butyral (PVB), such as Saflex Interlayer® (Solutia Inc., formerly Monsanto, St. Louis, Mo., USA), which will act as the bonding layer, is positioned between a thermal control film or composite thermal control film and a plate of clear glass. The resulting assembly is then autoclaved at a temperature (~130° C.; ~270° F.), pressure (~150 psi; 10 bar), and duration (~1.5 hours) for proper homogeneous curing of the PVB layer.

In one embodiment, the present invention pertains to a glazing assembly which comprises (a) a first glazing substrate, (b) a second glazing substrate, and (c) a thermal control film or a composite thermal control film, as described herein, positioned between said first and second glazing substrates, and adhered to said first and second glazing substrates. In this way, a thermal control film or a composite thermal control film is "sandwiched" between the two glazing substrates. It may be convenient to denote such glazing assemblies as GFG or GF$_c$G wherein "G" denotes the glazing substrate, F denotes a thermal control film, and F$_c$ denotes a composite thermal control film.

In one embodiment, the present invention pertains to a method of making a glazing assembly comprising the steps of: (i) providing a first glazing substrate; (ii) providing a second glazing substrate; and, (iii) positioning between said first and second glazing substrates, and adhering to said first and second glazing substrates, a thermal control film or a composite thermal control film, as described herein.

For example, such a glazing assembly may be prepared by arranging in a climate controlled clean room an assembly in which a thermal control film or composite thermal control film is positioned between two thin sheets of polyvinyl butyral (PVB) such as Saflex Interlayer® (Solutia Inc., formerly Monsanto, St. Louis, Mo., USA), which will act as bonding layers. This triple-layer sheet is then placed between two plates of clear glass. The resulting assembly is then autoclaved at a temperature (~130° C.; ~270° F.), pressure (~150 psi; 10 bar), and duration (~1.5 hours) for proper homogeneous curing of the PVB layer.

Such a glazing assembly may further comprise one or more additional layers. Again, it may be convenient to denote such an additional layer as "A". One or more additional layers may be included in the glazing assembly as in, for example, AGFG, GAFG, AGFGA, and AGAFAGA, as well as AGF$_c$G, GAF$_c$, AGF$_c$GA, and AGAF$_c$AGA. Examples of additional layers include, but are not limited to, those discussed above. In one embodiment, the glazing assembly is metal-free.

In one embodiment, the present invention pertains to a glazing assembly which comprises (a) a first glazing substrate, (b) a second glazing substrate, and (c) a thermal control film or a composite thermal control film, as described herein, positioned between said first and second glazing substrates, but separated from said first and second glazing substrates by layer of a gas.

In one embodiment, the present invention pertains to a method of making a glazing assembly comprising the steps of: (i) providing a first glazing substrate; (ii) providing a second glazing substrate; and, (iii) positioning between said first and second glazing substrates a thermal control film or a composite thermal control film, as described herein, which is separated from said first and second glazing substrates by layer of a gas.

Such glazing assemblies may be conveniently referred to as "suspended film" glazing assemblies, or "multipane suspended film" glazing assemblies. Typically, the first glazing substrate, second glazing substrate, and thermal control film or composite thermal control film are all parallel or substantially parallel to one another. Typically, the layer of gas is from about 1 to about 50 mm thick, more preferably from about 1 mm to about 20 mm, still more preferably from about 1 mm to about 10 mm. Examples of gases include, but are not limited to, air, dry air, nitrogen, argon, and other, preferably unreactive, gases. Examples of similar multipane glazing assemblies in which a thin sheet is suspended between two glazing substrates are shown in, for example, Lizardo et al., 1982, Vincent et al., 1989.

Such a glazing assembly may further comprise one or more additional layers. Such additional layers may be adhered to one or more sides of one or more of the first glazing substrate, the second glazing substrate, and the thermal control film or composite thermal control film. Examples of additional layers include, but are not limited to, those discussed above. In one embodiment, the glazing assembly is metal-free.

Figure 4B:
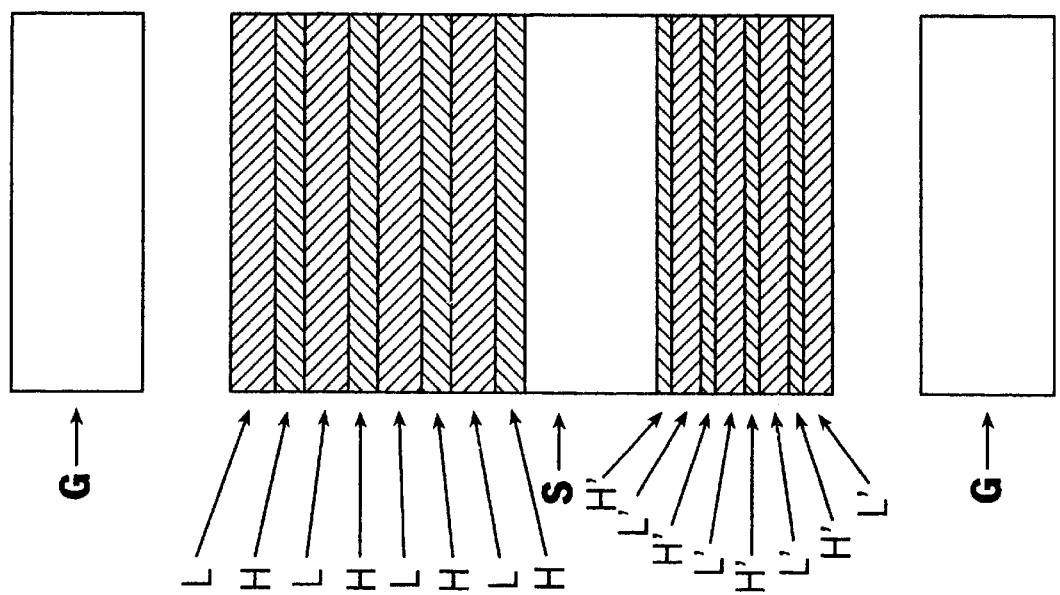
Figure 4A:
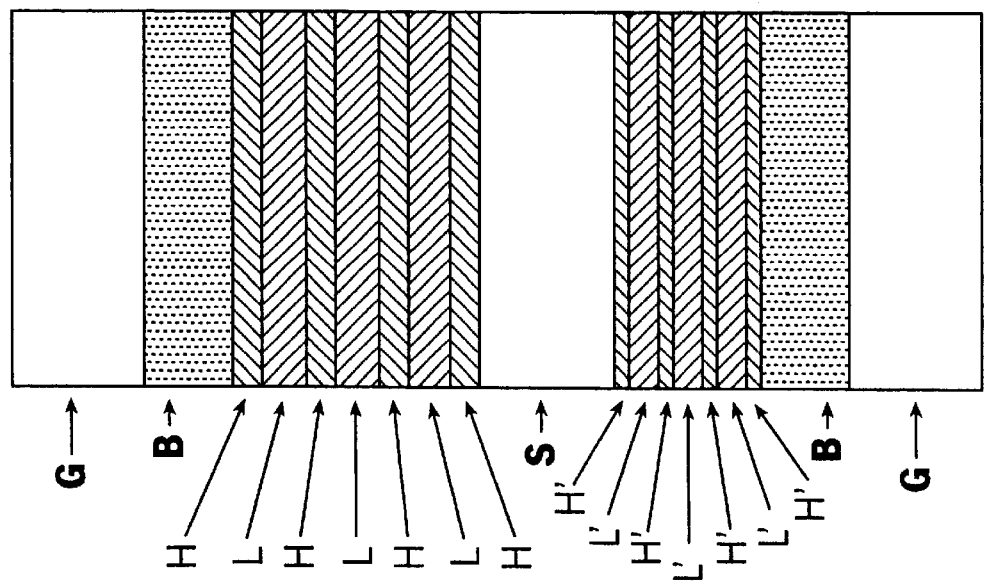
FIG. 4A is a schematic diagram (not to scale) illustrating the cross-section of a glazing assembly of the present invention comprising a double-sided thermal control film adhered between two glazing substrates via bonding layers.
Figure 4C:
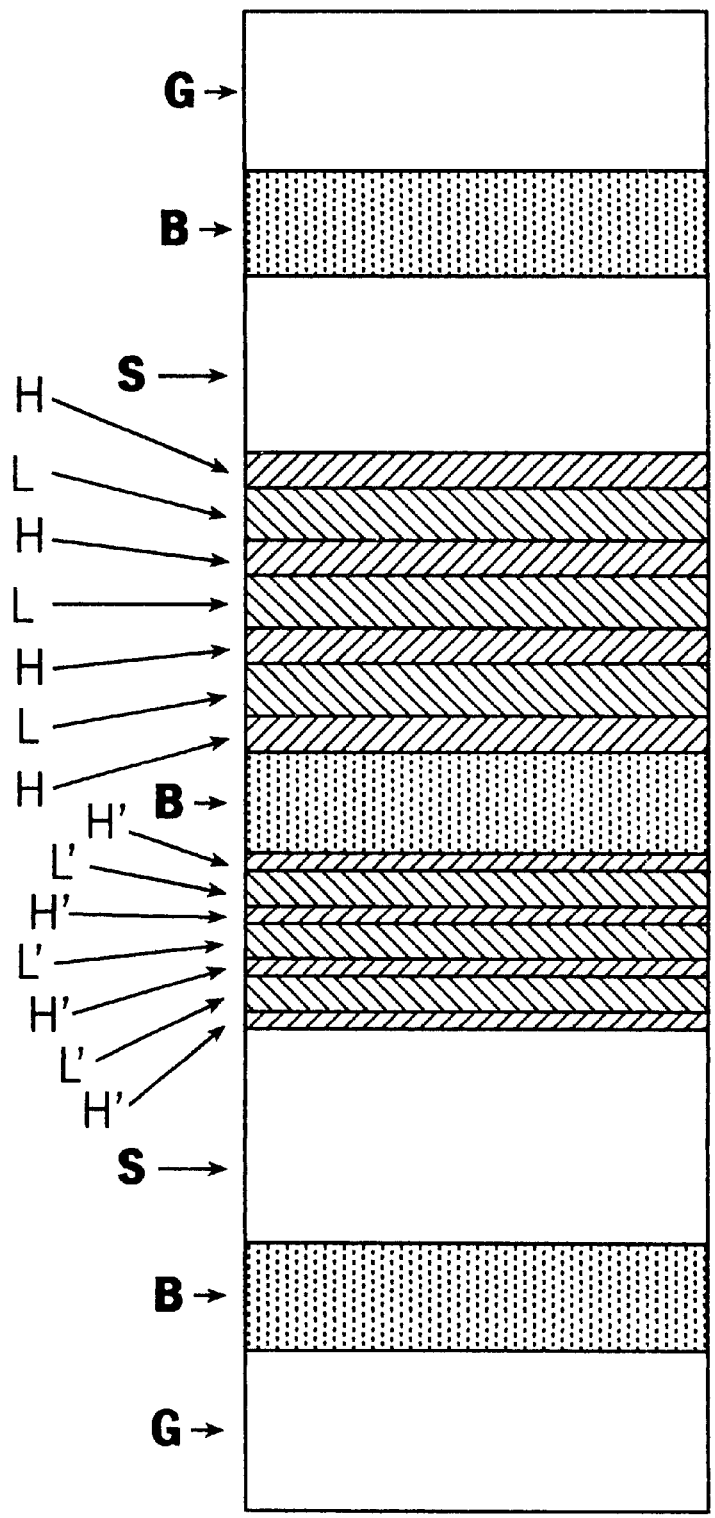
FIG. 4C is a schematic diagram (not to scale) illustrating the cross-section of a glazing assembly of the present invention comprising a composite thermal control film (comprising two single-sided thermal control films adhered face-to-face via a bonding layer) adhered between two glazing substrates via bonding layers.
Figure 4D:
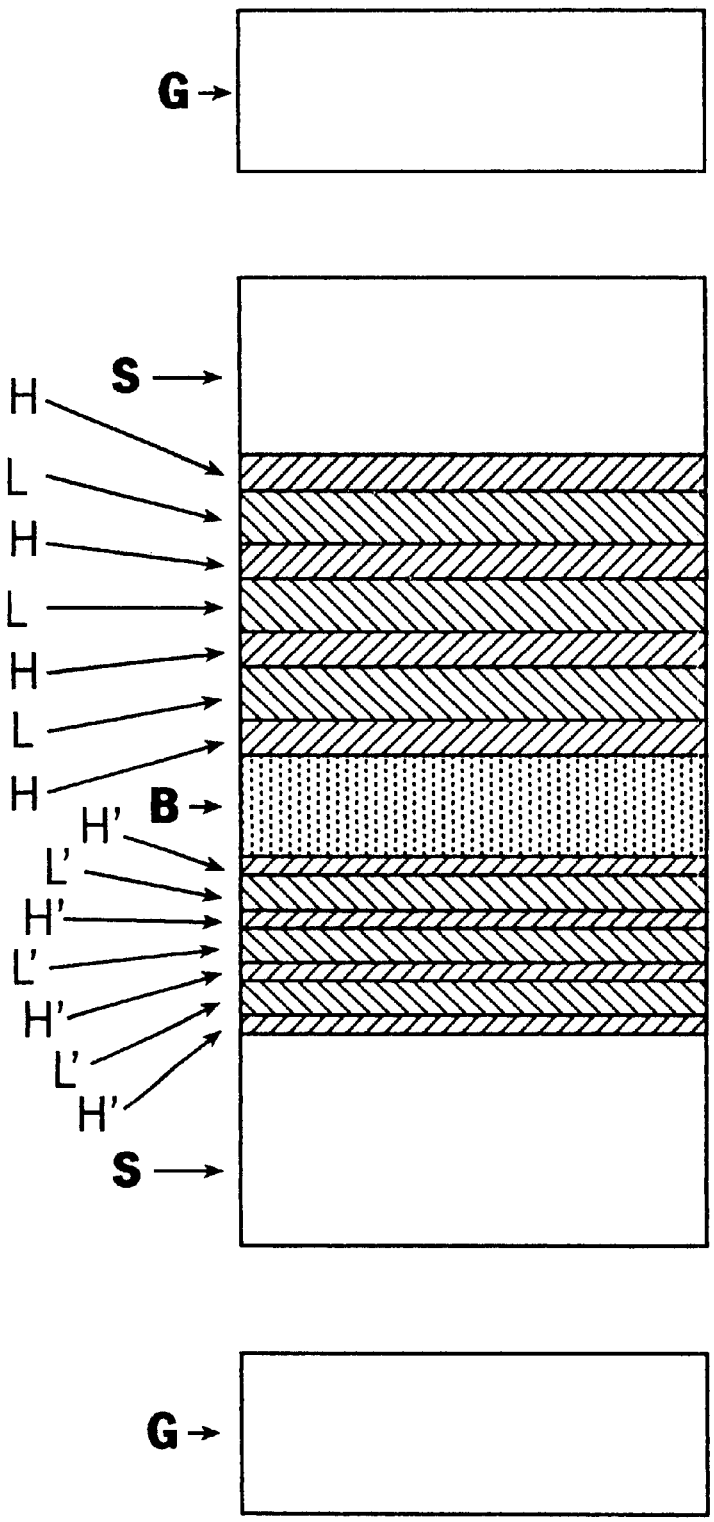
Figure 4E:
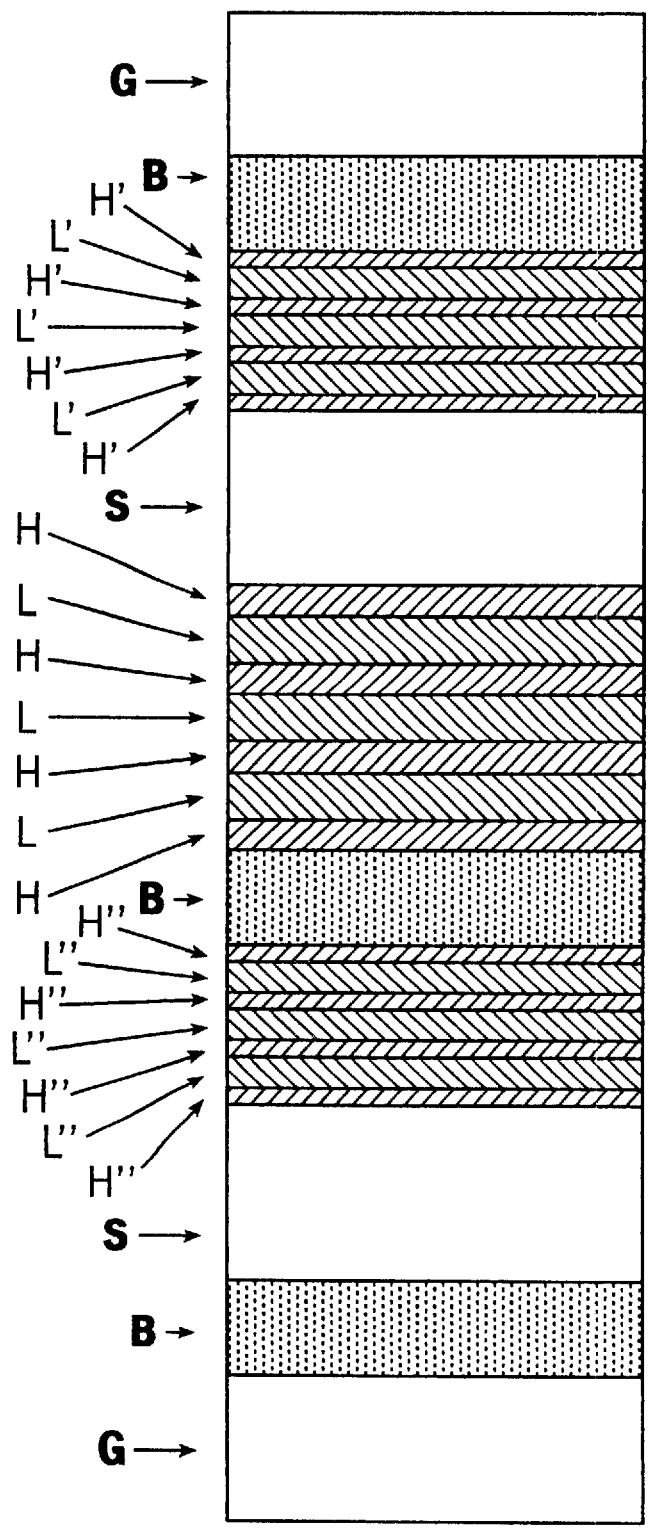
FIG. 4E is a schematic diagram (not to scale) illustrating the cross-section of a glazing assembly of the present invention comprising a composite thermal control film (comprising one single-sided thermal control film and one double-sided thermal control film adhered face-to-face via a bonding layer) adhered between two glazing substrates via bonding layers.
Figure 4F:
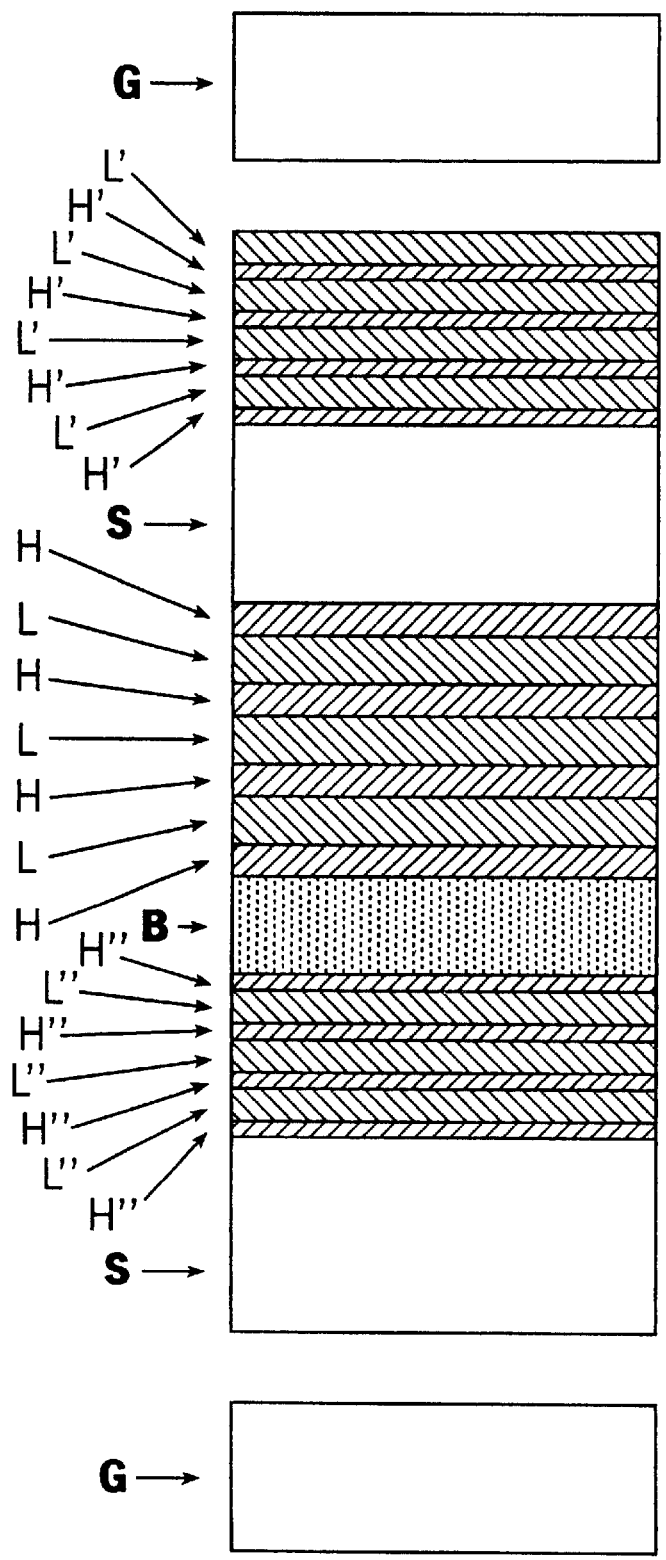

A schematic diagram (not to scale) illustrating the cross-section of a glazing assembly of the present invention comprising a double-sided thermal control film adhered between two glazing substrates via bonding layers is shown in FIG. 4A. A schematic diagram (not to scale) illustrating the cross-section of a glazing assembly of the present invention comprising a double-sided thermal control film positioned between two glazing substrates with air spaces between is shown in FIG. 4B. A schematic diagram (not to scale) illustrating the cross-section of a glazing assembly of the present invention comprising a composite thermal control film (comprising two single-sided thermal control films adhered face-to-face via a bonding layer) adhered between two glazing substrates via bonding layers is shown in FIG. 4C. A schematic diagram (not to scale) illustrating the cross-section of a glazing assembly of the present invention comprising a composite thermal control film (comprising two single-sided thermal control films adhered face-to-face via a bonding layer) positioned between two glazing substrates with air spaces between is shown in FIG. 4D. A schematic diagram (not to scale) illustrating the cross-section of a glazing assembly of the present invention comprising a composite thermal control film (comprising one single-sided thermal control film and one double-sided thermal control film adhered face-to-face via a bonding layer) adhered between two glazing substrates via bonding layers is shown in FIG. 4E. A schematic diagram (not to scale) illustrating the cross-section of a glazing assembly of the present invention comprising a composite thermal control film (comprising one single-sided thermal control film and one double-sided thermal control film adhered face-to-face via a bonding layer) positioned between two glazing substrates with air spaces between is shown in FIG. 4F. In these figures, L, L', and L" denote layers of low index of refraction dielectric material, H, H', and H" denote layers of high index of refraction dielectric material, S denotes a thin flexible polymeric substrate, B denotes a bonding layer, and G denotes a glazing substrate.

Methods of Reflecting Infrared Radiation While Transmitting Visible Radiation

One aspect of the present invention pertains to methods of reflecting infrared radiation while transmitting visible radiation, which methods employ the thermal control films, composite thermal control films, and glazing assemblies described herein.

Another aspect of the present invention pertains to methods of increasing the infrared reflectance of a glazing assembly while maintaining substantial visible transmittance of the glazing assembly, which methods employ the thermal control films, composite thermal control films, and glazing assemblies described herein.

EXAMPLES

Several embodiments of the present invention are illustrated in the Examples below, which are offered by way of illustration and not by way of limitation.

Example 1

Freestanding Single-Sided Thermal Control Film Designed with Center Wavelength at 900 nm In this example, an 8.5 inch×11 inch×3 mil thick (~21.6 cm×~27.5 cm×~0.075 mm) sheet of DuPont Mylar® Type D (biaxially oriented poly(ethylene terephthalate), PET) (Transilwrap Company, Inc., Dallas, Tex., USA) was selected as a thin flexible polymeric substrate. The substrate had an estimated index of refraction of 1.52 (it was later determined that the substrate actually had an index of refraction of about 1.66). Silica was chosen as a low index of refraction coating material and titania was chosen as a high index of refraction material. A center wavelength of 900 nm, in the near infrared, was chosen and the number of dielectric layers was chosen to be seven. In addition, the dielectric stack was to be optically matched to an adhesive of index of refraction 1.56. The configuration was therefore PET | SiO$_2$| TiO$_2$| SiO$_2$| TiO$_2$| SiO$_2$| TiO$_2$| adhesive.

The FTG FilmStar® computer program was instructed to maximize transmittance in the range of 425 to 675 nm, while simultaneously maximizing reflectance at 900 nm, the center wavelength. The program was instructed to use 30 evenly spaced wavelength values within the range of interest (i.e., 425 to 675 nm) to maximize transmittance and minimize ripple. A tolerance of 1% in these optimization values was selected. The program was also instructed to use 20 evenly spaced wavelength values in the near infrared reflectance band to anchor the design while optimal transmittance was calculated. A tolerance of 2% was selected for these values. The angle of incidence was selected to be 0°. Polarization was random. The program performed 50 iterations of damped least square calculations to optimize layer thicknesses. (Since this coating was initially intended to be used in combination with the coating of Example 2, the layer thicknesses were further refined using the above method for the configuration PET | Ex. 1 coating | bonding layer | Ex. 2 coating | PET.) Through this method, the FTG FilmStar® computer program output the following layer thicknesses, where layer 1 is the layer closest to the PET substrate, and layer 7 is the outermost layer.

TABLE 4

| Layer # | Material | Index of Refraction, n (at 550 nm) | Physical Thickness (nm) | Optical Thickness (in quarterwaves) At 900 nm | Optical Thickness (in quarterwaves) At 550 nm |
|---|---|---|---|---|---|
| 1 | TiO$_2$ | 2.28 | 112 | 1.083 | 1.860 |
| 2 | SiO$_2$ | 1.46 | 170 | 1.084 | 1.795 |
| 3 | TiO$_2$ | 2.28 | 95 | 0.917 | 1.575 |
| 4 | SiO$_2$ | 1.46 | 162 | 1.032 | 1.710 |
| 5 | TiO$_2$ | 2.28 | 95 | 0.917 | 1.575 |
| 6 | SiO$_2$ | 1.46 | 168 | 1.072 | 1.775 |
| 7 | TiO$_2$ | 2.28 | 112 | 1.077 | 1.850 |

Having determined a preferred configuration, the multilayer coating was then deposited on the thin flexible polymer substrate using Ion-Assisted-Deposition (IAD) using a commercially available ion source (5 Amp Mark II ion source, from Commonwealth Scientific Corporation, Alexandria, Va, USA) in a custom built 64 inch (~165 cm) vacuum deposition chamber equipped with two 16 inch (~40 cm) cryo-pumps. The base pressure was approximately $10^{-6}$ Torr (~1.3×10$^{-7}$ millibar), which rose to approximately $10^{-4}$ Torr (~1.3×10$^{-5}$ millibar, prim of oxygen) during deposition. The operating parameters for the 5 Amp CSC Mark II ion source included an anode current of 5 Amps, an anode voltage of 120 Volts, and an oxygen gas flow of 20–25 standard cubic centimeters per minute (Sccm). Substrates were mounted in a four planet, 25 inch (~64 cm) diameter double rotating planetary system. Standard commercially available electron beam sources (Temescal E-beam source from BOC Coating Technology, Fairfield, Calif., USA with a power supply from TFI Telemark, Fremont, Calif., USA) were used to deposit titania and silica films by evaporating the starting materials Ti$_2$O$_3$ (from Cerac Inc., Milwaukee, Wis., USA) and SiO$_2$ (from EM Industries, Inc., Hawthorne, N.Y., USA), respectively. Deposition rates, film thicknesses, and indices of refraction of the growing films was monitored both by vibrating crystal measurements and in situ optical measurements. Deposition rates of about 0.3 nm/sec and 1.0 nm/sec were used for the titania and silica layers, respectively. The substrate temperature, as measured using a thermocouple, rose from 25° C. to 60° C. during deposition. Refractive index, n, and extinction coefficients, k, over the wavelength range 190 to 3000 nm were calculated from transmittance and reflectance measurements made using a Shimadzu UV-3101C V -Vis-NIR Spectrophotometer (Shimadzu Scientific Instruments, Columbia, Md., USA). A more detailed description of the apparatus is provided in Buchel et al., 1993; Fulton et al., 1994, 1996.

The resulting thermal control film was highly visibly transparent to the naked eye, and possessed a very slight yellow tint. The thermal control film had a flexibility comparable to, if not indistinguishable from, the flexibility of the original PET sheet. The multilayer coating was strongly adhered to the substrate, and did not craze, flake, or peel off with flexing, rolling, or mild abrasion.

Figure 5:
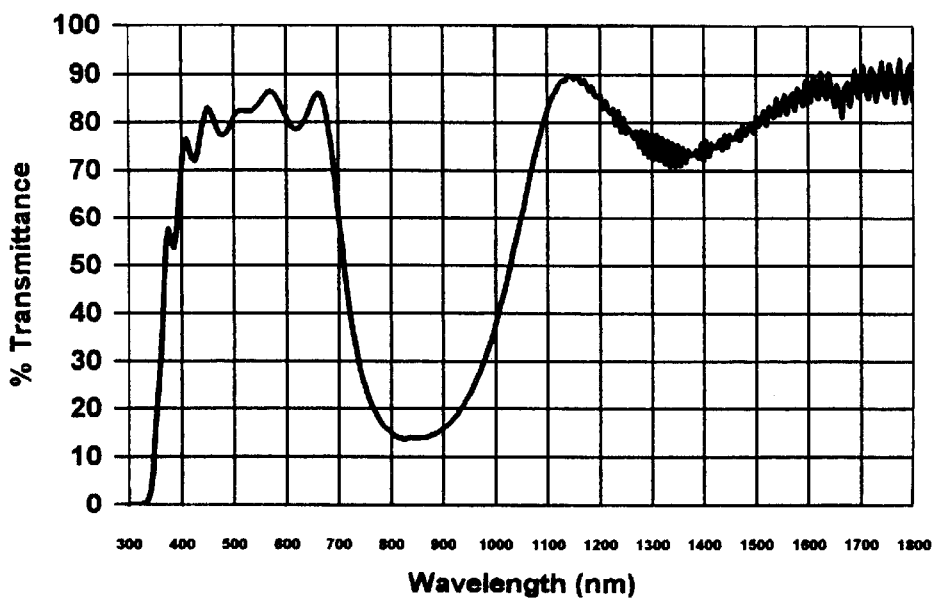
FIG. 5 is a graph of measured transmission at 0° incidence, as a function of wavelength, for the freestanding single-sided thermal control film structure as described in Example 1.

The transmittance of the freestanding single-sided thermal control film was measured as a function of wavelength using a Shimadzu UV-3101C UV-Vis-NIR Spectrophotometer at 0° incidence. The data for the wavelength range 300 to 1800 nm are presented in FIG. 5. The measured transmittance approximated the calculated transmittance, using the FTG FilmStar® computer program. Note that, during design, this thermal control film was matched to adhesive and not air. Also, an estimated index of refraction for the PET substrate of 1.52 was used; it was later determined that the PET substrate actually had an index of refraction of about 1.66. Thus, the transmittance and reflectance of the thermal control film have not been optimized. Nonetheless, the thermal control film had high transmittance of visible light and high reflectance for a band of near infrared radiation from about 750 to 960 nm and centered on about 839 nm. The average transmittance over the range 380 to 750 nm (visible) was about 73%. The average transmittance over the near infrared range of 750 to 960 nm was about 17% and thus the average reflectance over this range was about 83%. The average transmittance over the near infrared range of 750 to 1300 nm was about 50% and thus the average reflectance over this range was about 50%.

Example 2

Freestanding Single-Sided Thermal Control Film Designed with Center Wavelength at 1015 nm In this example, an 8.5 inch×11 inch×1 mil thick (~21.6 cm×~27.5 cm×~0.075 mm) sheet of poly(ethylene terephthalate) (PET) was selected as a thin flexible polymeric substrate. The substrate had an estimated index of refraction of 1.52 (it was later determined that the substrate actually had an index of refraction of about 1.66). Silica was chosen as a low index of refraction coating material and titania was chosen as a high index of refraction material. A center wavelength of 1015 nm, in the near infrared, was chosen not only to block near infrared transmittance but also to block ultraviolet transmittance by centering higher order reflections in the ultraviolet region. The number of dielectric layers was chosen to be seven. In addition, the dielectric stack was to be optically matched to an adhesive of index of refraction 1.56. The configuration was therefore PET | $TiO_2$| $SiO_2$| $TiO_2$| $SiO_2$ | $TiO_2$| $SiO_2$| $TiO_2$| adhesive.

As in Example 1, the FTG FilmStar® computer program was utilized to optimize layer thicknesses while maximizing reflectance at 1015 nm, the center wavelength. (Again, since this coating was initially intended to be used in combination with the coating of Example 1, the layer thicknesses were further refined using the above method for the configuration PET | Ex. 1 coating | bonding layer | Ex. 2 coating | PET.) Through this method, the FTG FilmStar® computer program output the following layer thicknesses, where layer 1 is the layer closest to the PET strate, and layer 7 is the outermost layer.

TABLE 5

| Layer # | Material | Index of Refraction, n (at 550 nm) | Physical Thickness (nm) | Optical Thickness (in quarterwaves) | |
|---|---|---|---|---|---|
| | | | | At 1015 nm | At 550 nm |
| 1 | $TiO_2$ | 2.28 | 111 | 0.942 | 1.842 |
| 2 | $SiO_2$ | 1.46 | 173 | 0.978 | 1.831 |
| 3 | $TiO_2$ | 2.28 | 106 | 0.899 | 1.759 |
| 4 | $SiO_2$ | 1.46 | 185 | 1.045 | 1.958 |
| 5 | $TiO_2$ | 2.28 | 125 | 1.061 | 2.075 |
| 6 | $SiO_2$ | 1.46 | 195 | 1.102 | 2.063 |
| 7 | $TiO_2$ | 2.28 | 119 | 1.010 | 1.975 |

Having determined a preferred configuration, the multilayer coating was then deposited on the thin flexible polymer substrate using Ion-Assisted-Deposition (IAD) as described in Example 1.

The resulting thermal control film was highly visibly transparent to the naked eye, and possessed a very slight yellow tint. The thermal control film had a flexibility comparable to, if not indistinguishable from, the flexibility of the original PET sheet. The multilayer coating was strongly adhered to the substrate, and did not craze, flake, or peel off with flexing, rolling, or mild abrasion.

Figure 6:
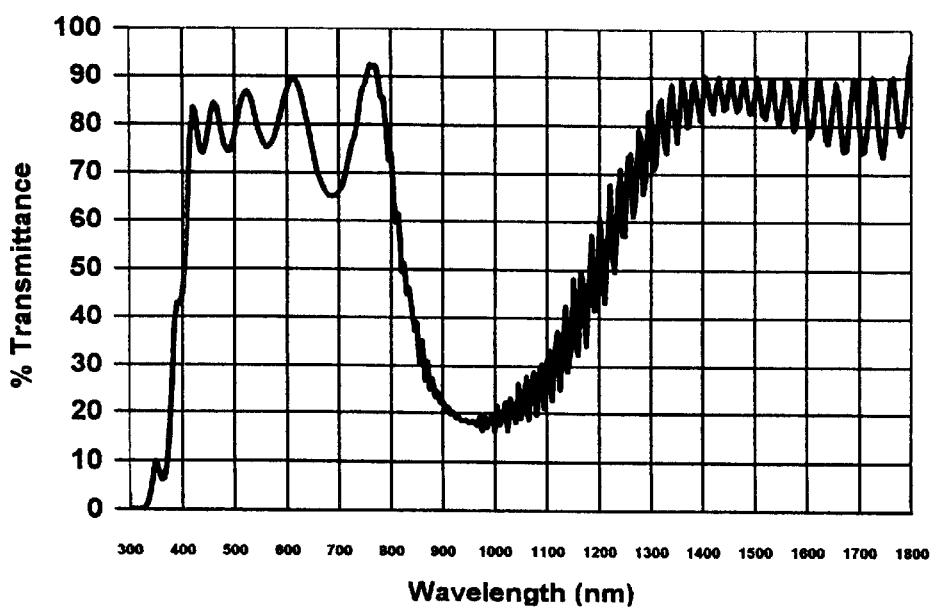
FIG. 6 is a graph of measured transmission at 0° incidence, as a function of wavelength, for the freestanding single-sided thermal control film structure as described in Example 2.

The transmittance of the freestanding single-sided thermal control film was measured as a function of wavelength using a Shimadzu UV-3101 C UV-Vis-NIR Spectrophotometer at 0° incidence. The data for the wavelength range 300 to 1800 nm are presented in FIG. 6. The measured transmittance approximated the calculated transmittance, using the FTG FilmStar® computer program. Note that, during design, this thermal control film was matched to adhesive and not air. Also, an estimated index of refraction for the PET substrate of 1.52 was used; it was later determined that the PET substrate actually had an index of refraction of about 1.66. Thus, the transmittance and reflectance of the thermal control film have not been optimized. Nonetheless, the thermal control film had high transmittance of visible light and high reflectance for a band of near infrared radiation from about 850 to 11 50 nm and centered on about 974 nm.

The average transmittance over the range 380 to 750 nm (visible) was about 75%. The average transmittance over the near infrared range of 850 to 1150 nm was about 24%, and thus the average reflectance over this range was about 76%. The average transmittance over the near infrared range of 750 to 1300 nm was about 41% and thus the average reflectance over this range was about 59%.

Example 3

Freestanding Double-Sided Thermal Control Film Designed with Center Wavelengths at 900 and 1015 nm In this example, a double-sided thermal control film was prepared. An 8.5 inch×11 inch×3 mil thick (~21.6 cm×~27.5 cm×~0.075 mm) sheet of DuPont Mylar® Type D (biaxially oriented poly(ethylene terephthalate), PET) was selected as a thin flexible polymeric substrate. The substrate had an estimated index of refraction of 1.52 (it was later determined that the substrate actually had an index of refraction of about 1.66). The multilayer coating on one side was the same as that described in Example 1, and it was deposited using Ion-Assisted-Deposition (IAD) as described in Example 1. After depositing the first multilayer coating, the sheet was demounted, flipped over, and remounted so that the uncoated PET surface was presented. A second multilayer coating, which was the same as that described in Example 2, was then deposited using Ion-Assisted-Deposition (IAD) as described in Example 2.

The resulting double-sided thermal control film was highly visibly transparent to the naked eye, and possessed a very slight yellow tint. The thermal control film had a flexibility comparable to, if not indistinguishable from, the flexibility of the original PET sheet. Both multilayer coatings were strongly adhered to the substrate, and did not craze, flake, or peel off with flexing, rolling, or mild abrasion.

Figure 7:
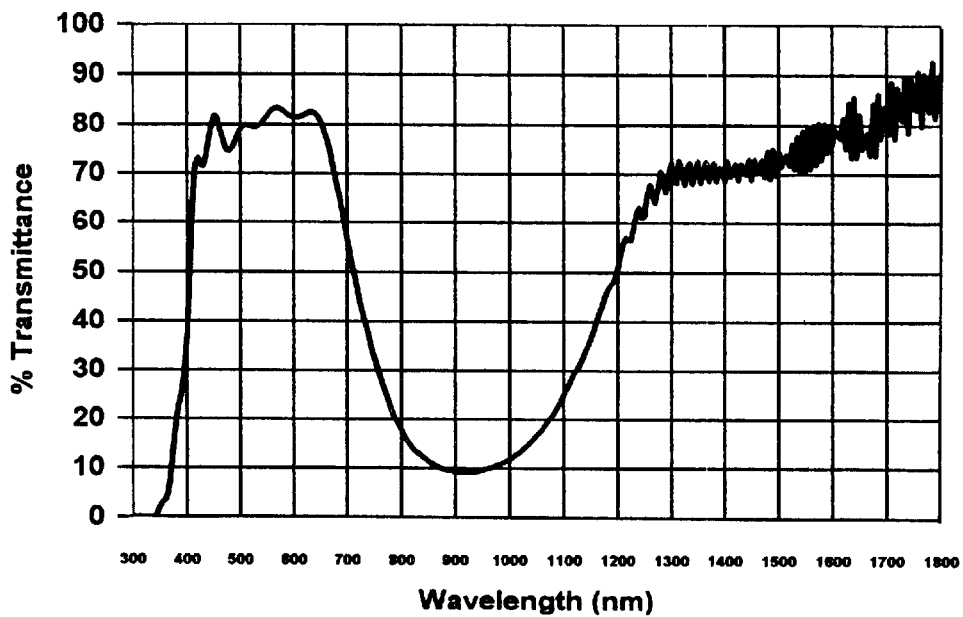
FIG. 7 is a graph of measured transmission at 0° incidence, as a function of wavelength, for the freestanding double-sided thermal control film structure as described in Example 3.

The transmittance of the freestanding double-side thermal control film was measured as a function of wavelength using a Shimadzu UV-3101C UV-Vis-NIR Spectrophotometer at 0° incidence. The data for the wavelength range 300 to 1800 nm are presented in FIG. 7. The measured transmittance approximated the calculated transmittance, using the FTG FilmStar® computer program. Note that, during design, this thermal control film was matched to bonding cement and not air, and so the transmittance and reflectance of the freestanding film are not optimized. Nonetheless, the thermal control film had high transmittance of visible light and high reflectance for a band of near infrared radiation from about 750 to 1125 nm and centered on about 896 nm. The average transmittance over the range 380 to 750 nm (visible) was about 70%. The average transmittance over the near infrared range of 750 to 1125 nm was about 16%, and thus the average reflectance over this range was about 84%. The average transmittance over the near infrared range of 750 to 1300 nm was about 28% and thus the average reflectance over this range was about 72%.

Example 4

Single-Sided Thermal Control Film Designed with Center Wavelength at 900 nm Adhered Between Glass In this example, a glazing assembly was prepared using the single-sided thermal control film described in Example 1. The single-sided thermal control film was adhered between two glass substrates using a polyvinyl butyral (PVB) bonding layer. In a climate controlled clean room, an assembly was prepared in which a 2 inch×2 inch (~5 cm×~5 cm) sample of the single-sided thermal control film was positioned between two 2 inch×2 inch×0.015 inch thick (~5 cm×~5 cm×~0.4 mm) sheets of polyvinyl butyral (PVB) Saflex Interlayer® (Solutia Inc., formerly Monsanto, St. Louis, Mo., USA). This triple-layer sheet was then placed between two plates of clear float glass (PPG Industries, Pittsburgh, Pa., USA), about 2 inch×2 inch×0.10 inch thick (~5 cm×~5 cm×2.5 mm). The resulting assembly was then vacuum bagged and autoclaved at a temperature (~130° C.; ~270° F.), pressure (~150 psi; ~10 bar), and duration (~1.5 hours) for proper homogeneous curing of the PVB layer.

The resulting glazing assembly was highly visibly transparent to the naked eye, and possessed a very slight yellow tint.

Figure 8:
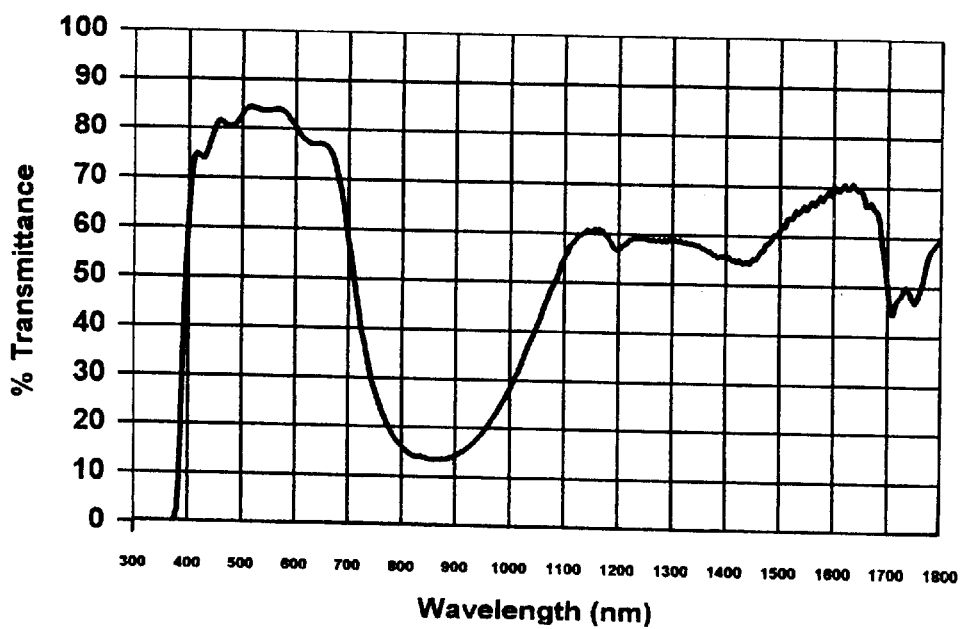
FIG. 8 is a graph of measured transmission at 0° incidence, as a function of wavelength, for the single-sided thermal control film structure adhered between glass as described in Example 4.

The transmittance of the glazing assembly was measured as a function of wavelength using a Shimadzu UV-3101C UV-Vis-NIR Spectrophotometer at 0° incidence. The data for the wavelength range 300 to 1800 nm are presented in FIG. 8. The measured transmittance approximated the calculated transmittance, using the FTG FilmStar® computer program. The glazing assembly has high transmittance of visible light and high reflectance for a band of near infrared radiation from about 750 to 1010 nm and centered on about 856 nm. The average transmittance over the range 380 to 750 nm (visible) was about 70%. The average transmittance over the near infrared range of 750 to 1010 nm was about 18%, and thus the average reflectance over this range was about 82%. The average transmittance over the near infrared range of 750 to 1300 nm was about 37% and thus the average reflectance over this range was about 63%.

Example 5

Single-Sided Thermal Control Film Designed with Center Wavelength at 1015 nm Adhered Between Glass In this example, a glazing assembly was prepared using the single-sided thermal control film described in Example 2 in a manner similar to that described in Example 4.

The resulting glazing assembly was highly visibly transparent to the naked eye, and possessed a very slight yellow tint.

Figure 9:
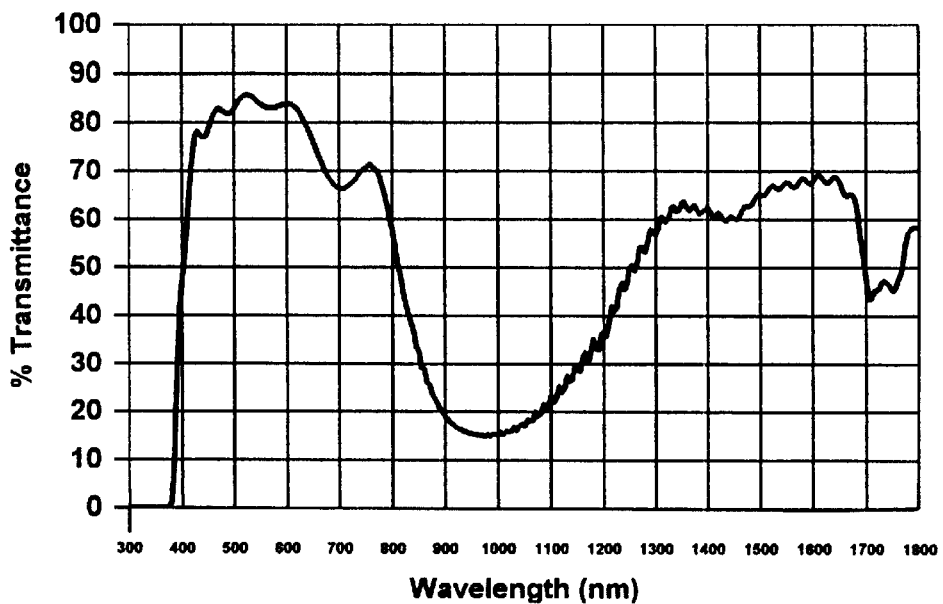
FIG. 9 is a graph of measured transmission at 0° incidence, as a function of wavelength, for the single-sided thermal control film structure adhered between glass as described in Example 5.

The transmittance of the glazing assembly was measured as a function of wavelength using a Shimadzu UV-3101C UV-Vis-NIR Spectrophotometer at 0° incidence. The data for the wavelength range 300 to 1800 nm are presented in FIG. 9. The measured transmittance approximated the calculated transmittance, using the FTG FilmStar® computer program. The glazing assembly has high transmittance of visible light and high reflectance for a band of near infrared radiation from about 850 to 1200 nm and centered on about 986 nm. The average transmittance over the range 380 to 750 nm (visible) was about 74%. The average transmittance over the near infrared range of 850 to 1200 nm was about 22%, and thus the average reflectance over this range was about 78%. The average transmittance over the near infrared range of 750 to 1300 nm was about 33% and thus the average reflectance over this range was about 67%.

Example 6

Double-Sided Thermal Control Film Designed with Center Wavelengths at 900 nm and 1015 nm Adhered Between Glass In this example, a glazing assembly was prepared using the double-sided thermal control film described in Example 3 in a manner similar to that described in Example 4.

The resulting glazing assembly was highly visibly transparent to the naked eye, and possessed a very slight yellow tint.

Figure 10:
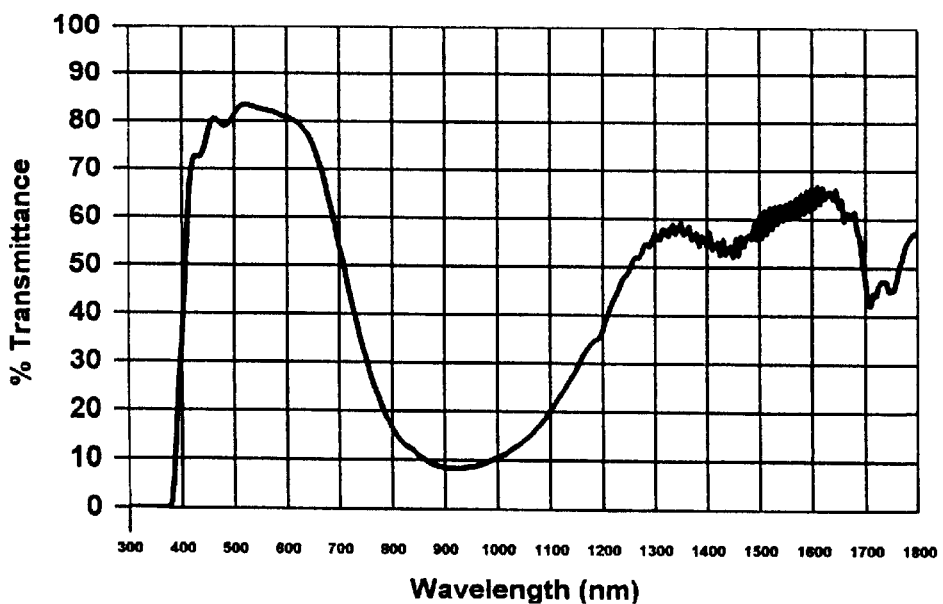
FIG. 10 is a graph of measured transmission at 0° incidence, as a function of wavelength, for the double-sided thermal control film structure adhered between glass as described in Example 6.

The transmittance of the glazing assembly was measured as a function of wavelength using a Shimadzu UV-3101C UV-Vis-NIR Spectrophotometer at 0° incidence. The data for the wavelength range 300 to 1800 nm are presented in FIG. 10. The measured transmittance approximated the calculated transmittance, using the FTG FilmStar® computer program. The glazing assembly has high transmittance of visible light and high reflectance for a band of near infrared radiation from about 750 to 1150 nm and centered on about 908 nm. The average transmittance over the range 380 to 750 nm (visible) was about 68%. The average transmittance over the near infrared range of 750 to 1150 nm was about 15%. The average transmittance over the near infrared range of 750 to 1300 nm was about 23% and thus the average reflectance over this range was about 77%.

Example 7

Double-Sided Thermal Control Film Designed with Center Wavelengths at 883 nm and 1073 nm Adhered Between Glass and Suitable for Use in Vehicular Glazing In this example, an 8.5 inch×11 inch×3 mil thick (~21.6 cm×~27.5 cm×~0.075 mm) sheet of DuPont Mylar® Type D (biaxially oriented poly(ethylene terephthalate), PET) is selected as a thin flexible polymeric substrate. The substrate has an estimated index of refraction of about 1.66. Silica is chosen as a low index of refraction coating material and titania is chosen as a high index of refraction material.

For one side of the thermal control film, a dielectric stack with a center wavelength of 883 nm, in the near infrared, is chosen and the number of dielectric layers is chosen to be nine. In addition, the dielectric stack is to be optically matched to a polyvinyl butryal (PBV) bonding layer of index of refraction about 1.48. The configuration for this side of the thermal control film is therefore PET | $TiO_2$| $SiO_2$| $TiO_2$| $SiO_2$| $TiO_2$| $SiO_2$| $TiO_2$| $SiO_2$| $TiO_2$| PVB.

As in Example 1, the FTG FilmStar® computer program is utilized to optimize layer thicknesses while maximizing reflectance at 883 nm, the center wavelength. (Since this first coating was ultimately intended to be used in combination with the second coating described below, the layer thicknesses were further refined for the configuration of the final double-sided thermal control film adhered between glass, as described below). Through this method, the FTG FilmStar® computer program output the following layer thicknesses, where layer 1 is the layer closest to the PET substrate, and layer 9 is the outermost layer.

TABLE 6

| Layer # | Material | Index of Refraction, n (at 550 nm) | Physical Thickness (nm) | Optical Thickness (in quarterwaves) | |
|---|---|---|---|---|---|
| | | | | At 883 nm | At 550 nm |
| 1 | $TiO_2$ | 2.28 | 104.3 | 1.029 | 1.731 |
| 2 | $SiO_2$ | 1.46 | 168.4 | 1.097 | 1.782 |
| 3 | $TiO_2$ | 2.28 | 98.8 | 0.975 | 1.640 |
| 4 | $SiO_2$ | 1.46 | 154.3 | 1.005 | 1.632 |
| 5 | $TiO_2$ | 2.28 | 96.8 | 0.955 | 1.607 |
| 6 | $SiO_2$ | 1.46 | 156.4 | 1.019 | 1.655 |
| 7 | $TiO_2$ | 2.28 | 95.8 | 0.945 | 1.591 |
| 8 | $SiO_2$ | 1.46 | 167.1 | 1.089 | 1.769 |
| 9 | $TiO_2$ | 2.28 | 104.8 | 1.034 | 1.739 |

For the opposite side of the thermal control film, a dielectric stack with a center wavelength of 1073 nm, in the near infrared, is chosen and the number of dielectric layers is chosen to be nine. In addition, the dielectric stack is to be optically matched to a polyvinyl butryal (PBV) bonding layer of index of refraction about 1.48. The configuration for this side of the thermal control film is therefore PET | $TiO_2$| $SiO_2$| $TiO_2$| $SiO_2$| $TiO_2$| $SiO_2$| $TiO_2$| PVB.

As in Example 1, the FTG FilmStar® computer program is utilized to optimize layer thicknesses while maximizing reflectance at 1073 nm, the center wavelength. (Again, since this second coating was ultimately intended to be used in combination with the first coating described above, the layer thicknesses were further refined for the configuration of the final double-sided thermal control film adhered between glass, as described below). Through this method, the FTG FilmStar® computer program output the following layer thicknesses, where layer 1 is the layer closest to the PET substrate, and layer 9 is the outermost layer.

TABLE 7

| Layer # | Material | Index of Refraction, n (at 550 nm) | Physical Thickness (nm) | Optical Thickness (in quarterwaves) | |
|---|---|---|---|---|---|
| | | | | At 1073 nm | At 550 nm |
| 1 | $TiO_2$ | 2.28 | 114.8 | 0.917 | 1.905 |
| 2 | $SiO_2$ | 1.46 | 191.8 | 1.025 | 2.030 |
| 3 | $TiO_2$ | 2.28 | 121.5 | 0.970 | 2.016 |
| 4 | $SiO_2$ | 1.46 | 194.6 | 1.040 | 2.059 |
| 5 | $TiO_2$ | 2.28 | 124.0 | 0.991 | 2.058 |
| 6 | $SiO_2$ | 1.46 | 194.6 | 1.040 | 2.060 |
| 7 | $TiO_2$ | 2.28 | 122.5 | 0.978 | 2.033 |
| 8 | $SiO_2$ | 1.46 | 188.7 | 1.009 | 1.997 |
| 9 | $TiO_2$ | 2.28 | 117.8 | 0.941 | 1.956 |

Having determined a preferred configuration, the multilayer coatings are then deposited on opposite faces of the thin flexible polymer substrate using Ion-Assisted-Deposition (IAD) as described in Example 3. The first multilayer coating is deposited using Ion-Assisted-Deposition (IAD) as described in Example 1. After depositing the first multilayer coating, the sheet is demounted, flipped over, and remounted so that the uncoated PET surface is presented. The second multilayer coating is then deposited using Ion-Assisted-Deposition (IAD) as described in Example 2.

A glazing assembly is then prepared using the resulting double-sided thermal control film. The double-sided thermal control film is adhered between two glass substrates using polyvinyl butyral (PVB) bonding layers, as described in Example 4.

Figure 11:
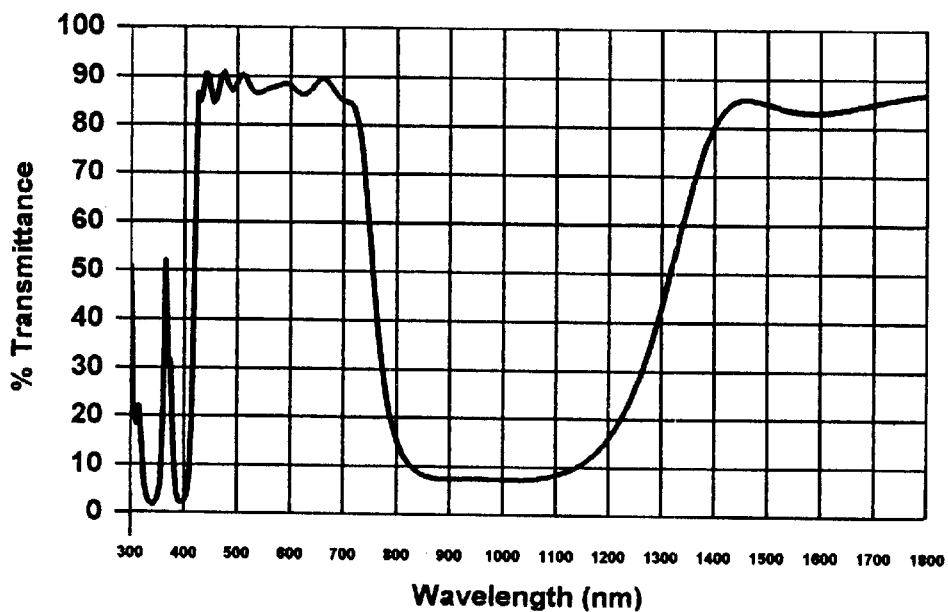
FIG. 11 is a graph of calculated transmission at 0° incidence, as a functions of wavelength, for the double-sided thermal control film adhered between glass as described in Example 7.
Figure 12:
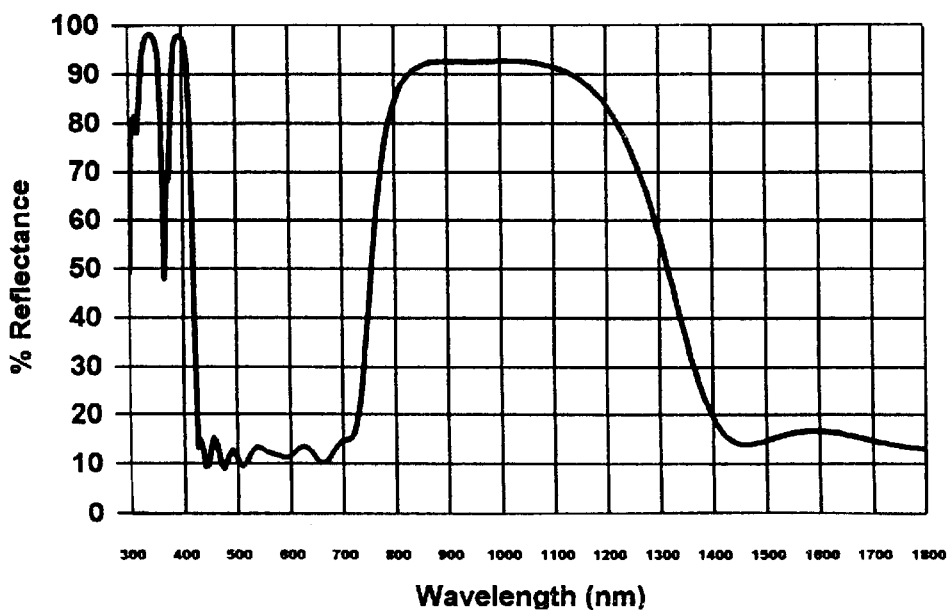
FIG. 12 is a graph of calculated reflectance at 0° incidence, as a function of wavelength, for the double-sided thermal control film adhered between glass as described in Example 7.

The expected transmittance and reflectance at 0° incidence of the glazing assembly was calculated using the FTG FilmStar® computer program. The calculated data for the wavelength range 300 to 1800 nm are presented in FIGS. 11 and 12, respectively. The calculated values are expecteted to approximate the measured values. The glazing assembly is calculated to have high transmittance of visible light and high reflectance for a band of near infrared radiation from about 780 to 1220 nm and centered on about 957 nm. The average transmittance over the range 380 to 780 nm (visible) is calculated to be about 71%. The average transmittance over the near infrared range of 750 to 1300 nm was about 13% and thus the average reflectance over this range was about 87%.

Example 8

Freestanding Double-Sided Thermal Control Film Designed with Center Wavelengths at 857 nm and 1048 nm and Suitable for Use in Suspended Film Triple Pane Window Units In this example, an 8.5 inch×11 inch×3 mil thick (~21.6 cm×~27.5 cm×~0.075 mm) sheet of DuPont Mylar® Type D (biaxially oriented poly(ethylene terephthalate), PET) is selected as a thin flexible polymeric substrate. The substrate has an estimated index of refraction of about 1.66. Silica is chosen as a low index of refraction coating material and titania is chosen as a high index of refraction material.

For one side of the thermal control film, a dielectric stack with a center wavelength of 857 nm, in the near infrared, is chosen and the number of dielectric layers is chosen to be eight. In addition, the dielectric stack is to be optically matched to air of index of refraction 1.00. The configuration for this side of the thermal control film is therefore PET | $TiO_2$| $SiO_2$| $TiO_2$| $SiO_2$| $TiO_2$| $SiO_2$| $TiO_2$| $SiO_2$| air.

As in Example 1, the FTG FilmStar® computer program is utilized to optimize layer thicknesses while maximizing reflectance at 857 nm, the center wavelength. (Since this first coating was ultimately intended to be used in combination with the second coating described below, the layer thicknesses were further refined for the configuration of the freestanding double-sided thermal control film). Through this method, the FTG FilmStar® computer program output the following layer thicknesses, where layer 1 is the layer closest to the PET substrate, and layer 8 is the outermost layer. Note that in this configuration, layer 8 is an "eighth-wave layer."

TABLE 8

| Layer # | Material | Index of Refraction, n (at 550 nm) | Physical Thickness (nm) | Optical Thickness (in quarterwaves) | |
|---|---|---|---|---|---|
| | | | | At 857 nm | At 550 nm |
| 1 | $TiO_2$ | 2.28 | 103.5 | 1.054 | 1.718 |
| 2 | $SiO_2$ | 1.46 | 158.9 | 1.067 | 1.681 |
| 3 | $TiO_2$ | 2.28 | 90.5 | 0.922 | 1.502 |
| 4 | $SiO_2$ | 1.46 | 150.8 | 1.013 | 1.596 |
| 5 | $TiO_2$ | 2.28 | 90.7 | 0.924 | 1.505 |
| 6 | $SiO_2$ | 1.46 | 153.6 | 1.031 | 1.625 |
| 7 | $TiO_2$ | 2.28 | 90.2 | 0.919 | 1.497 |
| 8 | $SiO_2$ | 1.46 | 73.4 | 0.493 | 0.777 |

For the opposite side of the thermal control film, a dielectric stack with a center wavelength of 1048 nm, in the near infrared, is chosen and the number of dielectric layers is chosen to be eight. In addition, the dielectric stack is to be optically matched to air of index of refraction 1.00. The configuration for this side of the thermal control film is therefore PET | $TiO_2$| $SiO_2$| $TiO_2$| $SiO_2$| $TiO_2$| $SiO_2$| $TiO_2$| $SiO_2$| air.

As in Example 1, the FTG FilmStar® computer program is utilized to optimize layer thicknesses while maximizing reflectance at 1048 nm, the center wavelength. (Since this second coating was ultimately intended to be used in combination with the first coating described above, the layer thicknesses were further refined for the configuration of the freestanding double-sided thermal control film). Through this method, the FTG FilmStar® computer program output the following layer thicknesses, where layer 1 is the layer closest to the PET substrate, and layer 8 is the outermost layer. Note that in this configuration, layer 8 is an "eighth-wave layer."

TABLE 9

| Layer # | Material | Index of Refraction, n (at 550 nm) | Physical Thickness (nm) | Optical Thickness (in quarterwaves) | |
|---|---|---|---|---|---|
| | | | | At 1048 nm | At 550 nm |
| 1 | $TiO_2$ | 2.28 | 114.0 | 0.934 | 1.891 |
| 2 | $SiO_2$ | 1.46 | 186.2 | 1.019 | 1.970 |
| 3 | $TiO_2$ | 2.28 | 120.8 | 0.990 | 2.004 |
| 4 | $SiO_2$ | 1.46 | 190.7 | 1.044 | 2.018 |
| 5 | $TiO_2$ | 2.28 | 118.1 | 0.968 | 1.960 |
| 6 | $SiO_2$ | 1.46 | 178.1 | 0.974 | 1.884 |
| 7 | $TiO_2$ | 2.28 | 104.9 | 0.860 | 1.742 |
| 8 | $SiO_2$ | 1.46 | 81.9 | 0.448 | 0.867 |

Having determined a preferred configuration, the multilayer coatings are then deposited on opposite faces of the thin flexible polymer substrate using Ion-Assisted-Deposition (IAD) as described in Example 3. The first multilayer coating is deposited using Ion-Assisted-Deposition (IAD) as described in Example 1. After depositing the first multilayer coating, the sheet is demounted, flipped over, and remounted so that the uncoated PET surface is presented. The second multilayer coating is then deposited using Ion-Assisted-Deposition (IAD) as described in Example 2.

Figure 13:
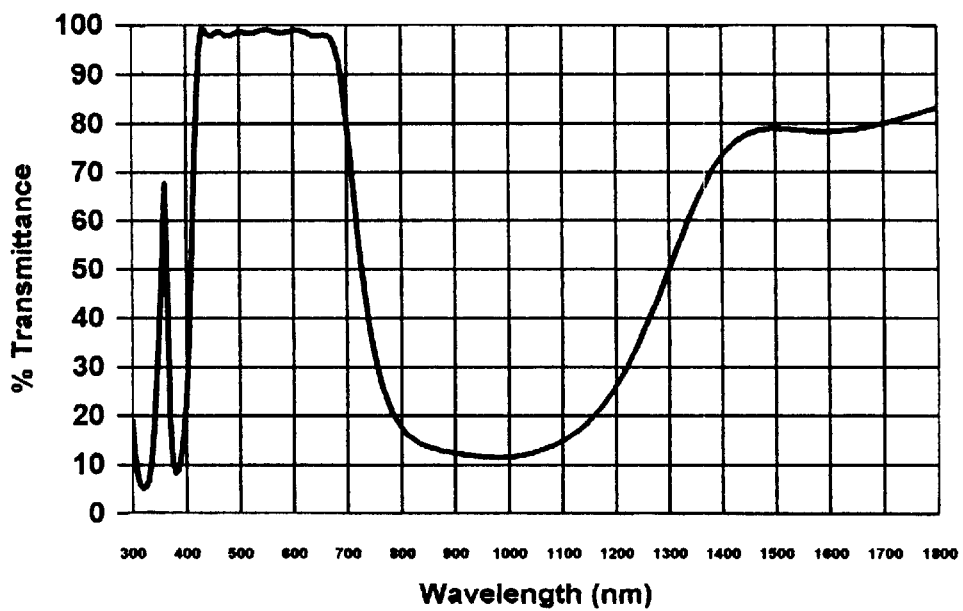
FIG. 13 is a graph of calculated transmission at 0° incidence, as a function of wavelength, for the freestanding double-sided thermal control film as described in Example 8.
Figure 14:
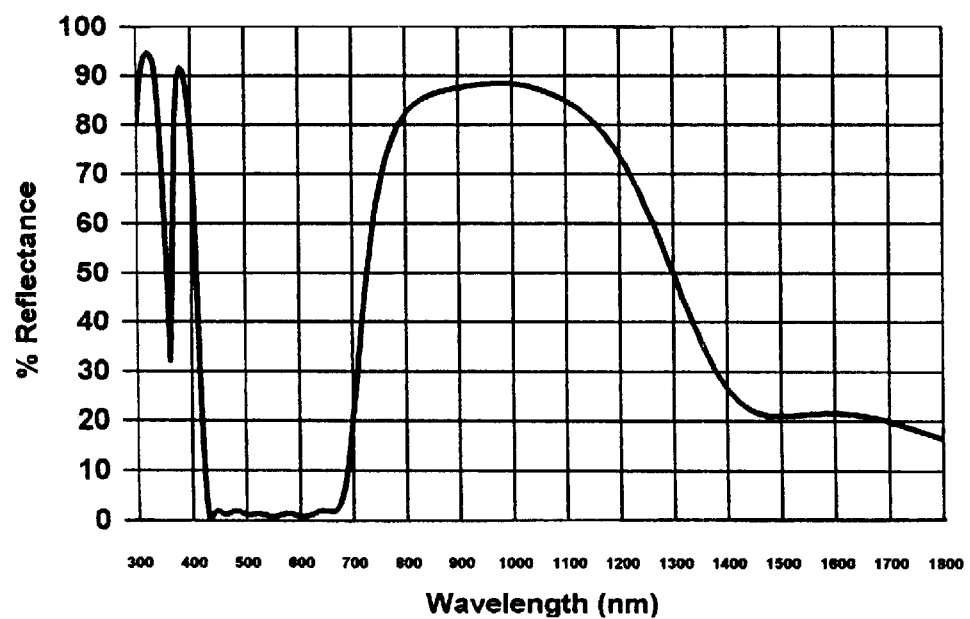
FIG. 14 is a graph of calculated reflectance at 0° incidence, as a function of wavelength, for the freestanding double-sided thermal control film as described in Example 8.

The expected transmittance and reflectance at 0° incidence of the freestanding double-sided thermal control film was calculated using the FTG FilmStar® computer program. The calculated data for the wavelength range 300 to 1800 nm are presented in FIGS. 13 and 14, respectively. The calculated values are expected to approximate the measured values. The thermal control film is calculated to have high transmittance of visible light and high reflectance for a band of near infrared radiation from about 755 to 1220 nm and centered on about 933 nm. The average transmittance over the range 380 to 750 nm (visible) is calculated to be about 83%. The average transmittance over the near infrared range of 755 to 1220 nm is calculated to be about 16%, and thus the average reflectance over this range is calculated to be about 84%. The average transmittance over the near infrared range of 750 to 1300 nm was about 20% and thus the average reflectance over this range was about 80%.

Example 9

Composite Thermal Control Film Comprising Two Single-Sided Thermal Control Films Designed with Center Wavelengths at 908 nm and 1030 nm Laminated Together and Further Including An Adhesive Layer and Suitable for Use in Retrofitting In this example, two 8.5 inch×11 inch×4 mil thick (~21.6 cm×~27.5 cm×~0.1 mm) sheets of DuPont Mylar® Type D (biaxially oriented poly(ethylene terephthalate), PET) are selected as thin flexible polymeric substrates, one for the first single-sided thermal control film and one for the second single-sided thermal control film. The substrates have an estimated index of refraction of about 1.66. Silica is chosen as a low index of refraction coating material and titania is chosen as a high index of refraction material.

For the first single-sided thermal control film, a dielectric stack with a center wavelength of 908 nm, in the near infrared, is chosen and the number of dielectric layers is chosen to be seven. In addition, the dielectric stack is to be optically matched to an adhesive of index of refraction about 1.48. The configuration for this side of the thermal control film is therefore PET | TiO$_2$| SiO$_2$| TiO$_2$| SiO$_2$| TiO$_2$| SiO$_2$| TiO$_2$| adhesive.

As in Example 1, the FTG FilmStar® computer program is utilized to optimize layer thicknesses while maximizing reflectance at 908 nm, the center wavelength. (Since this first coating was ultimately intended to be used in combination with the second coating described below, the layer thicknesses were further refined for the configuration of the composite thermal control film). Through this method, the FTG FilmStar® computer program output the following layer thicknesses, where layer 1 is the layer closest to the PET substrate, and layer 7 is the outermost layer.

TABLE 10

| Layer # | Material | Index of refraction, n at 550 nm | Physical Thickness (nm) | Optical Thickness (in quarterwaves) At 908 nm | At 550 nm |
|---|---|---|---|---|---|
| 1 | TiO$_2$ | 2.28 | 112.1 | 1.073 | 1.860 |
| 2 | SiO$_2$ | 1.46 | 169.7 | 1.074 | 1.795 |
| 3 | TiO$_2$ | 2.28 | 94.9 | 0.908 | 1.575 |
| 4 | SiO$_2$ | 1.46 | 161.6 | 1.023 | 1.710 |
| 5 | TiO$_2$ | 2.28 | 94.9 | 0.908 | 1.575 |

TABLE 10-continued

| Layer # | Material | Index of refraction, n at 550 nm | Physical Thickness (nm) | Optical Thickness (in quarterwaves) At 908 nm | At 550 nm |
|---|---|---|---|---|---|
| 6 | SiO$_2$ | 1.46 | 167.8 | 1.062 | 1.775 |
| 7 | TiO$_2$ | 2.28 | 111.5 | 1.067 | 1.850 |

Having determined a preferred configuration, the first multilayer coating is deposited using Ion-Assisted-Deposition (LAD) as described in Example 1, to yield the first thermal control film.

For the second single-sided thermal control film, a dielectric stack with a center wavelength of 1030 nm, in the near infrared, is chosen and the number of dielectric layers is chosen to be seven. In addition, the dielectric stack is to be optically matched to adhesive of index of refraction about 1.48. The configuration for this side of the thermal control film is therefore PET | TiO$_2$| SiO$_2$| TiO$_2$| SiO$_2$| TiO$_2$| SiO$_2$| TiO$_2$| adhesive.

As in Example 1, the FTG FilmStar® computer program is utilized to optimize layer thicknesses while maximizing reflectance at 1030 nm, the center wavelength. (Again, since this second coating was ultimately intended to be used in combination with the first coating described above, the layer thicknesses were further refined for the configuration of the composite thermal control film). Through this method, the FTG FilmStar® computer program output the following layer thicknesses, where layer 1 is the layer closest to the PET substrate, and layer 7 is the most layer.

TABLE 11

| Layer # | Material | Index of refraction, n at 550 nm | Physical Thickness (nm) | Optical Thickness (in quarterwaves) At 1030 nm | At 550 nm |
|---|---|---|---|---|---|
| 1 | TiO$_2$ | 2.28 | 111.0 | 0.927 | 1.842 |
| 2 | SiO$_2$ | 1.46 | 173.0 | 0.963 | 1.831 |
| 3 | TiO$_2$ | 2.28 | 106.0 | 0.885 | 1.759 |
| 4 | SiO$_2$ | 1.46 | 185.0 | 1.030 | 1.958 |
| 5 | TiO$_2$ | 2.28 | 125.0 | 1.044 | 2.075 |
| 6 | SiO$_2$ | 1.46 | 195.0 | 1.086 | 2.053 |
| 7 | TiO$_2$ | 2.28 | 119.0 | 0.994 | 1.975 |

Having determined a preferred configuration, the second multilayer coating is deposited using Ion-Assisted-Deposition (IAD) as described in Example 1, to yield the second thermal control film.

The first (i.e., PX$_1$) and second (i.e., PX$_2$) single-sided thermal control films are then aminated together, face to face (i.e., PX$_1$-X$_2$P), using, for example, a PermaTrans® IP-2100 laminating adhesive layer (from MACtac U.S.A., Stow, Ohio, USA), which is a thin clear polyester film, coated on each side with an optically clear pressure-sensitive, acrylic adhesive (which may or may not be further provided with a release liner or liners) or a 3M® 8142 (from 3M Identification & Converter Systems Division, St. Paul, Minn., USA), which is an optically clear pressure-sensitive laminating acrylic adhesive (which may or may not be further provided with a release liner or liners).

The composite thermal control film is then further modified to include, on one face, a layer of adhesive, such as a pressure sensitive adhesive and optionally a release liner or liners. In this way the composite thermal control film may be used for retrofitting of glazing, for example, by removing the release liner or liners, contacting the adhesive layer with the glazing surface at a sufficient pressure and temperature, and for a sufficient time, to firmly adhere the composite thermal control film to the glazing surface. In this way, the configuration is PET | coating 1| laminating adhesive | coating 2| PET | retrofitting adhesive.

Figure 15:
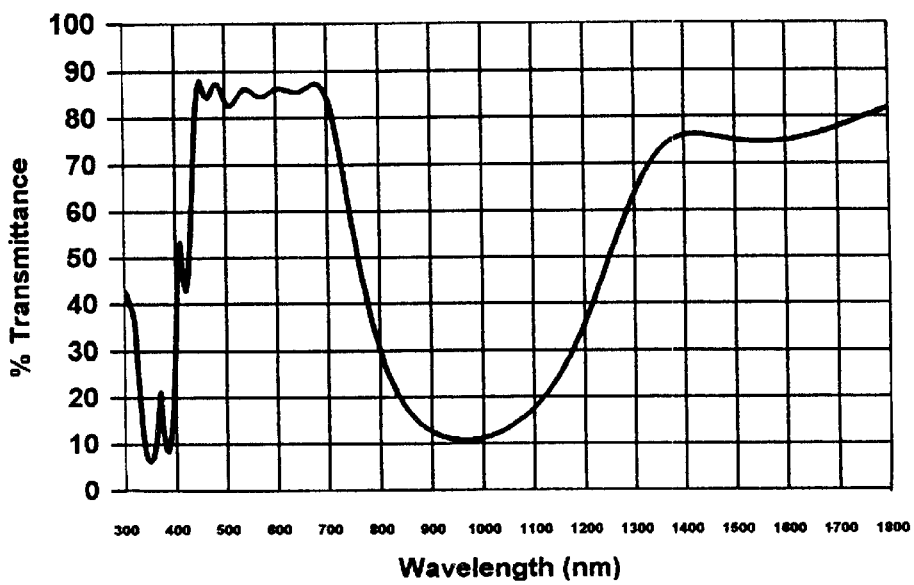
FIG. 15 is a graph of calculated transmission at 0° incidence, as a function of wavelength, for the composite thermal control film structure (comprising two single-sided thermal control films laminated together face to face and further comprising a retrofitting adhesive) as described in Example 9.
Figure 16:
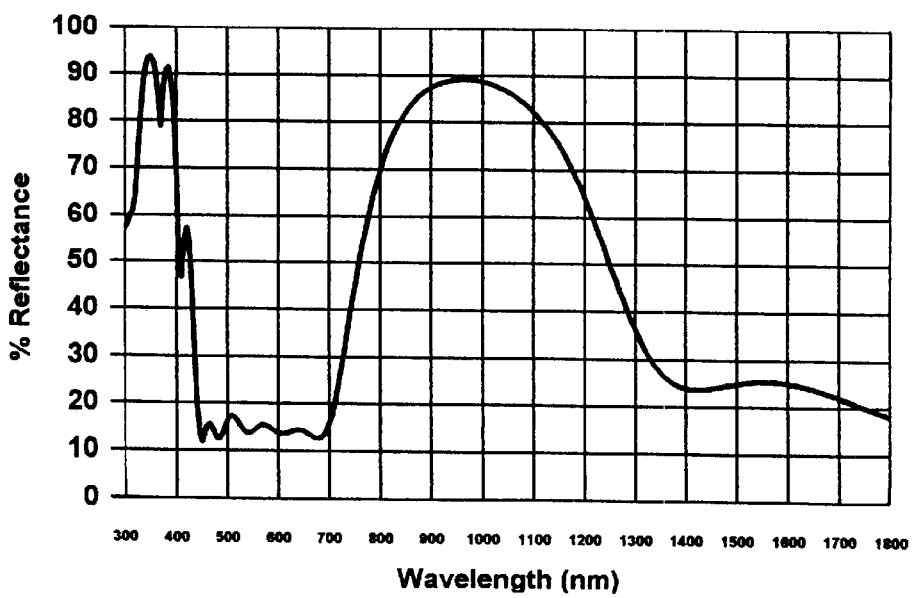
FIG. 16 is a graph of calculated reflectance at 0° incidence, as a function of wavelength, for the composite thermal control film structure (comprising two single-sided thermal control films laminated together face to face and further comprising a retrofitting adhesive) as described in Example 9.

The expected transmittance and reflectance at 0° incidence of the composite thermal control film adhered to a glass substrate of index of refraction 1.52 was calculated using the FTG FilmStar® computer program. The calculated data for the wavelength range 300 to 1800 nm are presented in FIGS. 15 and 16, respectively. The calculated values are expected to approximate the measured values. The composite thermal control film is calculated to have high transmittance of visible light and high reflectance for a band of near infrared radiation from about 800 to 1170 nm and centered on about 950 nm. The average transmittance over the range 380 to 750 nm (visible) is calculated to be about 76%. The average transmittance over the near infrared range of 800 to 1170 nm is calculated to be about 16%, and thus the average reflectance over this range is calculated to be about 84%. The average transmittance over the near infrared range of 750 to 1300 nm was about 26% and thus the average reflectance over this range was about 74%.

Example 10

Composite Thermal Control Film Comprising One Single-Sided Thermal Control Film Designed with Center Wavelength at 856 nm and One Double-Sided Thermal Control Film Designed with Center Wavelengths at 1080 nm and 1403 nm Laminated Together and Adhered Between Glass In this example, two 8.5 inch×11 inch×4 mil thick (~21.6 cm×~27.5 cm×~0.1 mm) sheets of DuPont Mylar® Type D (biaxially oriented poly(ethylene terephthalate), PET) are selected as thin flexible polymeric substrates, one for a single-sided thermal control film and one for a double-sided thermal control film. The substrates have an estimated index of refraction of about 1.66. Silica is chosen as a low index of refraction coating material and titania is chosen as a high index of refraction material.

For the single-sided thermal control film, a dielectric stack with a center wavelength of 856 nm, in the near infrared, is chosen and the number of dielectric layers is chosen to be nine. In addition, the dielectric stack is to be optically matched to a PVB bonding layer of index of refraction about 1.48. The configuration for the single-sided thermal control film is therefore PET | $TiO_2$| $SiO_2$| $TiO_2$| $SiO_2$| $TiO_2$| $SiO_2$| $TiO_2$| $SiO_2$| $TiO_2$| PVB.

As in Example 1, the FTG FilmStar® computer program is utilized to optimize layer thicknesses while maximizing reflectance at 856 nm, the center wavelength. (Since this first coating was ultimately intended to be used in combination with the second and third coatings described below, the layer thicknesses were further refined for the configuration of the final glazing assembly). Through this method, the FTG FilmStar® computer program output the following layer thicknesses, where layer 1 is the layer closest to the PET substrate, and layer 9 is the outermost layer.

TABLE 12

| Layer # | Material | Index of refraction, n at 550 nm | Physical Thickness (nm) | Optical Thickness (in quarterwaves) | |
|---|---|---|---|---|---|
| | | | | At 856 nm | At 550 nm |
| 1 | $TiO_2$ | 2.28 | 105.1 | 1.071 | 1.744 |
| 2 | $SiO_2$ | 1.46 | 162.0 | 1.089 | 1.714 |
| 3 | $TiO_2$ | 2.28 | 94.6 | 0.965 | 1.570 |
| 4 | $SiO_2$ | 1.46 | 153.4 | 1.032 | 1.623 |
| 5 | $TiO_2$ | 2.28 | 92.3 | 0.941 | 1.532 |
| 6 | $SiO_2$ | 1.46 | 154.0 | 1.035 | 1.629 |
| 7 | $TiO_2$ | 2.28 | 92.5 | 0.944 | 1.536 |
| 8 | $SiO_2$ | 1.46 | 160.9 | 1.082 | 1.703 |
| 9 | $TiO_2$ | 2.28 | 104.8 | 1.069 | 1.740 |

Having determined a preferred configuration, the multi-layer coating is deposited using Ion-Assisted-Deposition (IAD) as described in Example 1, to yield the single-sided thermal control film.

For one side of the double-sided thermal control film, a dielectric stack with a center wavelength of 1080 nm, in the near infrared, is chosen and the number of dielectric layers is chosen to be nine. In addition, the dielectric stack is to be optically matched to a PVB bonding layer of index of refraction about 1.48. The configuration for this side of the thermal control film is therefore PET | $TiO_2$$SiO_2$| $TiO_2$| $SiO_2$| $TiO_2$| $SiO_2$| $TiO_2$| $SiO_2$| $TiO_2$| PVB.

As in Example 1, the FTG FilmStar® computer program is utilized to optimize layer thicknesses while maximizing reflectance at 1080 nm, the center wavelength. (Again, since this second coating was ultimately intended to be used in combination with the first and third coatings described above and below, the layer thicknesses were further refined for the configuration of the final glazing assembly). Through this method, the FTG FilmStar® computer program output the following layer thicknesses, where layer 1 is the layer closest to the PET substrate, and layer 9 is the outermost layer.

TABLE 13

| Layer # | Material | Index of refraction, n at 550 nm | Physical Thickness (nm) | Optical Thickness (in quarterwaves) | |
|---|---|---|---|---|---|
| | | | | At 1080 nm | At 550 nm |
| 1 | $TiO_2$ | 2.28 | 116.4 | 0.924 | 1.932 |
| 2 | $SiO_2$ | 1.46 | 189.1 | 1.004 | 2.001 |
| 3 | $TiO_2$ | 2.28 | 122.3 | 0.971 | 2.032 |
| 4 | $SiO_2$ | 1.46 | 195.1 | 1.038 | 2.069 |
| 5 | $TiO_2$ | 2.28 | 123.4 | 0.979 | 2.048 |
| 6 | $SiO_2$ | 1.46 | 195.1 | 1.036 | 2.064 |
| 7 | $TiO_2$ | 2.28 | 123.8 | 0.982 | 2.054 |
| 8 | $SiO_2$ | 1.46 | 188.9 | 1.003 | 1.999 |
| 9 | $TiO_2$ | 2.28 | 116.5 | 0.924 | 1.933 |

For the opposite side of the double-sided thermal control film, a dielectric stack with a center wavelength of 1403 nm, in the near infrared, is chosen and the number of dielectric layers is chosen to be nine. In addition, the dielectric stack is to be optically matched to a PVB bonding layer of index of refraction about 1.48. The configuration for this side of the thermal control film is therefore PET $TiO_2$| $SiO_2$| $TiO_2$| $SiO_2$| $TiO_2$| $SiO_2$| $TiO_2$| $SiO_2$| $TiO_2$| PVB.

As in Example 1, the FTG FilmStar® computer program is utilized to optimize layer thicknesses while maximizing reflectance at 1403 nm, the center wavelength. (Again, since this third coating was ultimately intended to be used in combination with the first and second coatings described above, the layer thicknesses were further refined for the configuration of the final glazing assembly). Through this method, the FTG FilmStar® computer program output the following layer thicknesses, where layer 1 is the layer closest to the PET substrate, and layer 9 is the outermost layer. Note that the layer thicknesses differ from the simple quarterwave calculation by as much as 33%; this arises by optimizing the overall reflectance and transmittance properties of the complete triple-coating structure, rather than merely optimizing the reflectance and transmittance properties of the individual coatings individually without consideration of the interactions between the three coatings.

TABLE 14

| Layer # | Material | Index of refraction, n at 550 nm | Physical Thickness (nm) | Optical Thickness (in quarterwaves) | |
|---|---|---|---|---|---|
| | | | | At 1403 nm | At 550 nm |
| 1 | $TiO_2$ | 2.28 | 112.8 | 0.687 | 1.872 |
| 2 | $SiO_2$ | 1.46 | 178.1 | 0.727 | 1.885 |
| 3 | $TiO_2$ | 2.28 | 228.6 | 1.391 | 3.794 |
| 4 | $SiO_2$ | 1.46 | 179.4 | 0.733 | 1.898 |
| 5 | $TiO_2$ | 2.28 | 221.6 | 1.349 | 3.678 |
| 6 | $SiO_2$ | 1.46 | 178.6 | 0.729 | 1.890 |
| 7 | $TiO_2$ | 2.28 | 221.8 | 1.350 | 3.682 |
| 8 | $SiO_2$ | 1.46 | 179.0 | 0.731 | 1.894 |
| 9 | $TiO_2$ | 2.28 | 214.3 | 1.304 | 3.556 |

Having determined a preferred configuration, the multilayer coatings are then deposited on opposite faces of the thin flexible polymer substrate using Ion-Assisted-Deposition (IAD) as described in Example 3. The first multilayer coating is deposited using Ion-Assisted-Deposition (IAD) as described in Example 1. After depositing the first multilayer coating, the sheet is demounted, flipped over, and remounted so that the uncoated PET surface is presented. The second multilayer coating is then deposited using Ion-Assisted-Deposition (IAD) as described in Example 2.

A glazing assembly is then prepared using the resulting single-sided and double-sided thermal control films, two glazing substrates with index of refraction 1.52, and poly-vinyl butyral (PVB) bonding layers with index of refraction about 1.48. The assembly has the configuration glass | PVB | PET coating 1| PVB | coating 2| PET | coating 3| PVB | glass.

Figure 17:
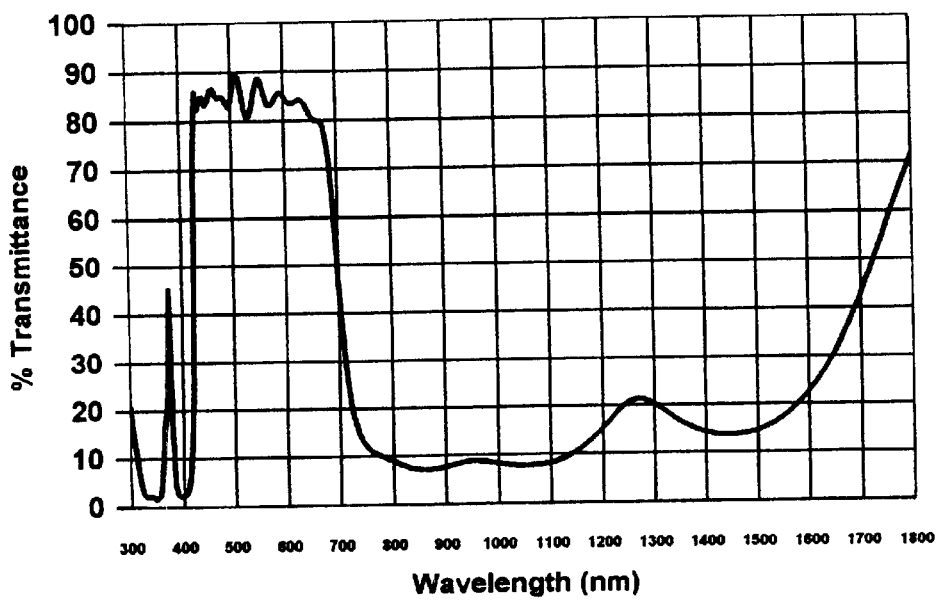
FIG. 17 is a graph of calculated transmission at 0° incidence, as a function of wavelength, for the glazing assembly as described in Example 10.
Figure 18:
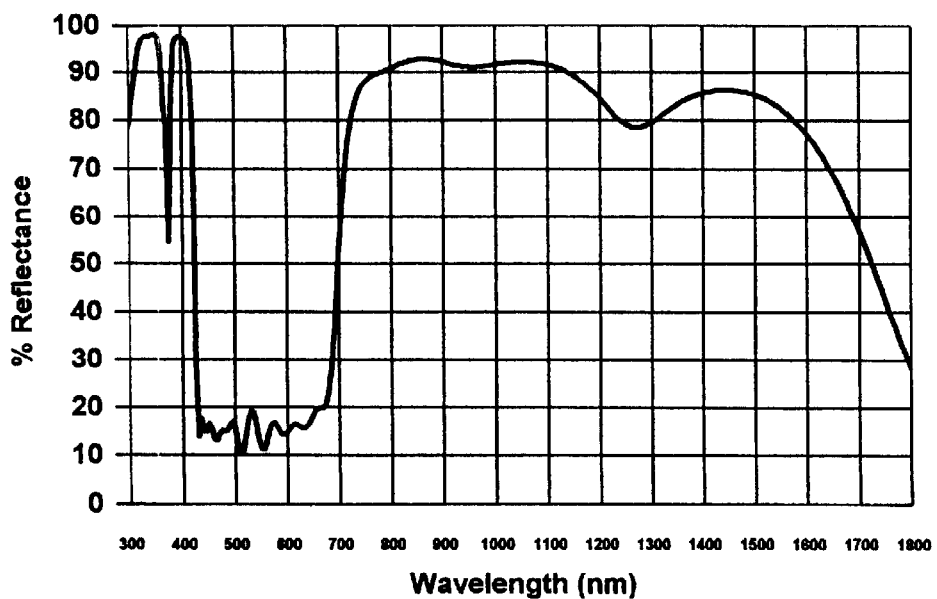
FIG. 18 is a graph of calculated reflectance at 0° incidence, as a function of wavelength, for the glazing assembly as described in Example 10.

The expected transmittance and reflectance at 0° incidence of the glazing assembly was calculated using the FTG FilmStar® computer program. The calculated data for the wavelength range 300 to 1800 nm are presented in FIGS. 17 and 18, respectively. The calculated values are expected to approximate the measured values. The glazing assembly is calculated to have high transmittance of visible light and high reflectance for a band of near infrared radiation from about 750 to 1630 nm and centered on about 980 nm. The average transmittance over the range 380 to 750 nm (visible) is calculated to be about 64%. The average transmittance over the near infrared range of 750 to 1630 nm is calculated to be about 13%, and thus the average reflectance over this range is calculated to be about 68%. The average transmittance over the near infrared range of 750 to 1300 nm was about 11% and thus the average reflectance over this range was about 89%.

Example 11

Double-Sided Thermal Control Film Designed with Center Wavelengths at 900 nm and 1105 nm with Protective Coating and Retrofitting Adhesive In this example, an 8.5 inch×1 1 inch×3 mil thick (~21.6 cm×~27.5 cm×~0.075 mm) sheet of DuPont Mylar® Type D (biaxially oriented poly(ethylene terephthalate), PET) is selected as a thin flexible polymeric substrate. The substrate has an estimated index of refraction of about 1.66. Silica is chosen as a low index of refraction coating material and titania is chosen as a high index of refraction material.

For one side of the thermal control film, a dielectric stack with a center wavelength of 900 nm, in the near infrared, is chosen and the number of dielectric layers is chosen to be seven. In addition, the dielectric stack is to be optically matched to an adhesive or protective layer of index of refraction of about 1.5. The configuration for this side of the thermal control film is therefore PET | $TiO_2$| $SiO_2$| $TiO_2$| $SiO_2$| $TiO_2$| $SiO_2$| $TiO_2$| retrofitting adhesive/protective layer.

As in Example 1, the FTG FilmStar® computer program is utilized to optimize layer thicknesses while maximizing reflectance at 900 nm, the center wavelength. (Since this first coating was ultimately intended to be used in combination with the second coating described below, the layer thicknesses were further refined for the configuration of the final double-sided thermal control film with protective coating and retrofitting adhesive). Through this method, the FTG FilmStar® computer program output the following layer thicknesses, where layer 1 is the layer closest to the PET substrate, and layer 7 is the outermost layer.

TABLE 15

| Layer # | Material | Index of refraction, n at 550 nm | Physical Thickness (nm) | Optical Thickness (in quarterwaves) | |
|---|---|---|---|---|---|
| | | | | At 900 nm | At 550 nm |
| 1 | $TiO_2$ | 2.28 | 107.9 | 1.043 | 1.791 |
| 2 | $SiO_2$ | 1.46 | 161.6 | 1.032 | 1.710 |
| 3 | $TiO_2$ | 2.28 | 99.2 | 0.958 | 1.645 |
| 4 | $SiO_2$ | 1.46 | 159.3 | 1.017 | 1.685 |
| 5 | $TiO_2$ | 2.28 | 93.9 | 0.907 | 1.558 |
| 6 | $SiO_2$ | 1.46 | 166.8 | 1.065 | 1.765 |
| 7 | $TiO_2$ | 2.28 | 108.9 | 1.053 | 1.808 |

For the opposite side of the thermal control film, a dielectric stack with a center wavelength of 1105 nm, in the near infrared, is chosen and the number of dielectric layers is chosen to be seven. In addition, the dielectric stack is to be optically matched to a retrofitting adhesive or protective layer of index of refraction of about 1.5. The configuration for this side of the thermal control film is therefore PET | $TiO_2$| $SiO_2$| $TiO_2$| $SiO_2$| $TiO_2$| $SiO_2$| $TiO_2$| retrofitting adhesive/protective layer.

As in Example 1, the FTG FilmStar® computer program is utilized to optimize layer thicknesses while maximizing reflectance at 1105 nm, the center wavelength. (Again, since this second coating was ultimately intended to be used in combination with the first coating described above, the layer thicknesses were further refined for the configuration of the final double-sided thermal control film with protective coating and retrofitting adhesive, as described below). Through this method, the FTG FilmStar® computer program output the following layer thicknesses, where layer 1 is the layer closest to the PET substrate, and layer 7 is the outermost layer.

TABLE 16

| Layer # | Material | Index of refraction, n at 550 nm | Physical Thickness (nm) | Optical Thickness (in quarterwaves) At 1105 nm | At 550 nm |
|---|---|---|---|---|---|
| 1 | $TiO_2$ | 2.28 | 123.7 | 0.959 | 2.052 |
| 2 | $SiO_2$ | 1.46 | 194.6 | 1.010 | 2.059 |
| 3 | $TiO_2$ | 2.28 | 128.8 | 0.998 | 2.137 |
| 4 | $SiO_2$ | 1.46 | 209.2 | 1.085 | 2.213 |
| 5 | $TiO_2$ | 2.28 | 127.0 | 0.984 | 2.108 |
| 6 | $SiO_2$ | 1.46 | 197.9 | 1.027 | 2.094 |
| 7 | $TiO_2$ | 2.28 | 120.4 | 0.934 | 1.999 |

Having determined a preferred configuration, the multilayer coatings are then deposited on opposite faces of the thin flexible polymer substrate using Ion-Assisted-Deposition (IAD) as described in Example 3. The first multilayer coating is deposited using Ion-Assisted-Deposition (IAD) as described in Example 1. After depositing the first multilayer coating, the sheet is demounted, flipped over, and remounted so that the uncoated PET surface is presented. The second multilayer coating is then deposited using Ion-Assisted-Deposition (IAD) as described in Example 2.

The double-sided thermal control film is then further modified to have, on one face, an additional protective layer (e.g., a hardcoat), and on the opposite face, an adhesive layer (optically with a release liner or liners).

Figure 19:
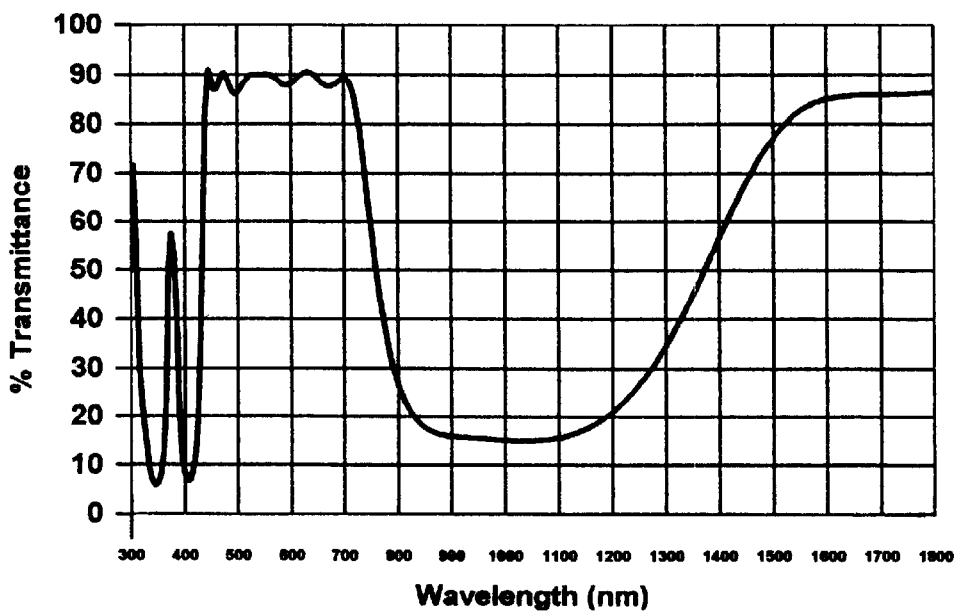
FIG. 19 is a graph of calculated transmission at 0° incidence, as a function of wavelength, for the double-sided thermal control film with protective coating and retrofitting adhesive, as described in Example 11.
Figure 20:
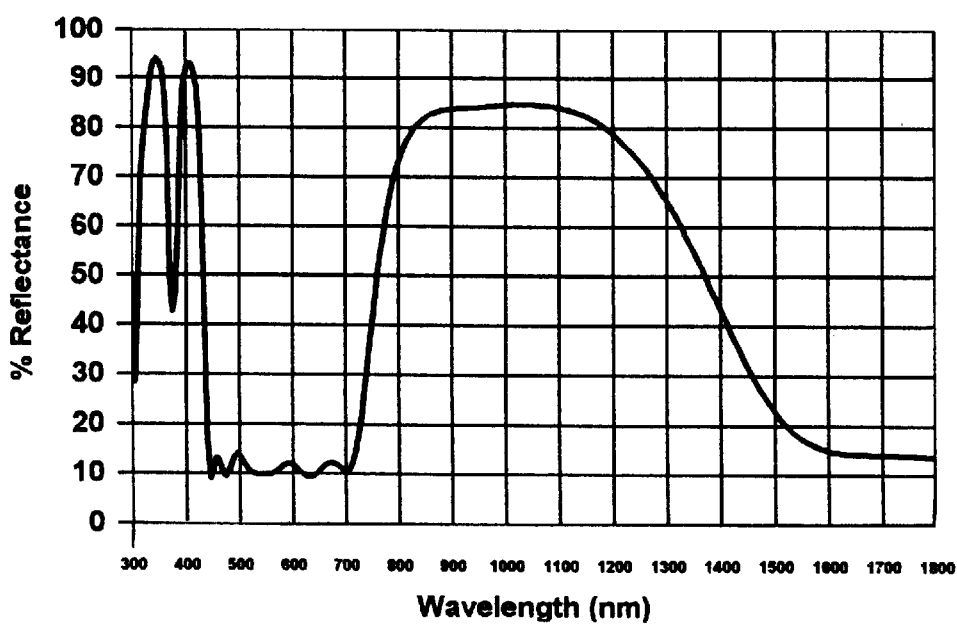
FIG. 20 is a graph of calculated reflectance at 0° incidence, as a function of wavelength, for the double-sided thermal control film with protective coating and retrofitting adhesive, as described in Example 1.

The expected transmittance and reflectance at 0° incidence of the modified thermal control film adhered to a glass substrate with index of refraction 1.52 was calculated using the FTG filmStar® computer program. The calculated data for the wavelength range 300 to 1800 nm are presented in FIGS. 19 and 20, respectively. The calculated values are expected to approximate the measured values. The thermal control film is calculated to have high transmittance of visible light and high reflectance for a band of near infrared radiation from about 750 to 1300 nm and centered on about 951 nm. The average transmittance over the range 380 to 780 nm (visible) is calculated to be about 77%. The average transmittance over the near infrared range of 750 to 1300 nm was about 21% and thus the average reflectance over this range was about 79%.

REFERENCES

The disclosures of the publications, patents, and published patent specifications referenced below are hereby incorporated by reference into the present disclosure to more fully describe the state of the art to which this invention pertains.

Ando et al., 1991, "Solar Control Glass with Neutral Color for Automobiles," International Congress and Exposition, Detroit Mich., Feb. 25–Mar. 1, 1991, published by Society of Automotive Engineers, No. 910541, pp. 1–7.

Antonson et al., 1966, U.S. Pat. No. 3,290,203 issued Dec. 6, 1966.

Austin, 1994, U.S. Pat. No. 5,337,191 issued Aug. 9, 1994.

Belkind et al., 1996, U.S. Pat. No. 5,563,734 issued Oct. 8, 1996.

Belkind et al., 1994, U.S. Pat. No. 5,377,045 issued Dec. 27, 1994.

Brandrup et al., 1989, Polymer Handbook, 3rd Edition, Wiley & Co.

Buchel et al., 1993, "Properties of $TiO_2$ and $SiO_2$ Films Prepared by Ion-Assisted Deposition Using a Gridless End-Hall Ion Source," Society of Vacuum Coaters, 36th Annual Technical Conference Proceedings, pp. 82–87.

Burger, 1978, U.S. Pat. No. 4,095,013 issued Jun. 13, 1978.

Chiou, 1986, "Application of Solar-Powered Ventilator in Automobiles," Automobile Heating and Cooling SP-668, published by Society of Automotive Engineers, Inc., No. 860585, pp. 13–22.

Dablen et al., 1980, U.S. Pat. No. 4,226,91 0 issued Oct. 7, 1980.

Dimmick, 1946, U.S. Pat. No. 2,412,496 issued Dec. 10, 1946.

Edwards, 1968, U.S. Pat. No. 3,410,625 issued Nov. 12, 1968.

Fan et aL, 1982, U.S. Pat. No. 4,337,990 issued Jul. 6, 1982.

Fan et al., 1988, U.S. Pat. No. 4,721,349 issued Jan. 26, 1988.

Fujimori et al., 1983, U.S. Pat. No. 4,386,945 issued Jan. 18, 1983.

Fulton et al., 1994, "Application of ion-assisted-deposition using a gridless end-Hall ion source for volume manufacturing of thin-film optical filters," in Optical Interference Coatings, (Florin Abeles, Editor), Proc. SPIE 2253, pp. 374–393. Fulton et al., 1996, "Approaches explored for producing a variety of ion-assisted-deposited thin-film coatings using an end-Hall ion source," in *Developments in Optical Component Coatings* (Ian Reid, Editor), Proc. SPIE 2276, pp. 114–125.

Granqvist, 1983, "Optical Coatings for Energy Efficiency and Solar Applications: Some Recent Developments," Thin Film Technologies, Vol. 401, pp. 330–355.

Guiselen, 1997, U.S. Pat. No. 5,595,825 issued Jan. 21, 1997.

Haginda et al., 1991, U.S. Pat. No. 4,983,001 issued Jan. 08, 1991.

Hayashi et al., 1983, U.S. Pat. No. 4,386,130 issued May 31, 1983.

Hoffinan, 1922, U.S. Pat. No. 1,425,967 issued Aug. 15, 1922.

Hood et al., 1991, U.S. Pat. No. 5,071,206 issued Dec. 10, 1991.

Hood et al., 1994, U.S. Pat. No. 5,306,547 issued Apr. 26, 1994.

Hopper, 1981, U.S. Pat. No. 4,247,599 issued Jan. 27, 1981.

Huber, 1988, "Physical Characteristics of Heat-Absorbing Glass and Their Influence on the 1Driver," published by Society of Automotive Engineers, Inc., No. 885052, pp. 427–433.

Hymore et al., 1991, "Development of a Test Procedure for Quantifying Performance Benefits of Solar Control Glazing on Occupant Comfort," International Congress and Exposition, Detroit Mich., Feb. 25–Mar. 1, 1991, published by Society of Automotive Engineers, No. 910536, pp. 1–8.

Ishida, 1988, U.S. Pat. No. 4,747,666 May 31, 1988.

Kageyama, 1989, U.S. Pat. No. 4,865,405 issued Sep. 12, 1989.

Kavanagh et al., 1991, U.S. Pat. No. 5,024,895 issued Jun. 18, 1991.

Lizardo et al., 1982, U.S. Pat. No. 4,335,166 issued Jun. 15, 1982.

Lynam, 1990, "Smart Windows for Automobiles," International Congress and Exposition, Detroit Mich., Feb. 26–Mar. 2, 1990, published by Society of Automotive Engineers, No. 900419, pp. 1–21.

Macleod, 1995, Introduction to Thin Film Optical Coatings and Filters, Thin Film Center, Inc., Tucson, Ari., pp. 1–45.

Meyer et al., 1989, U.S. Pat. No. 4,799,745 issued Jan. 24, 1989.

Meyers et al., 1987, *Encyclopedia of Physical Science and Technology*, Academic Press, Inc., Vol. 6, p. 656.

Mills et al., 1996, U.S. Pat. No. 5,523,132 issued Jun. 4, 1996.

Misiano et al., 1996, U.S. Pat. No. 5,571,574 issued Nov. 5, 1996.

Muromachi et al., 1994, U.S. Pat. No. 5,336,565 issued Aug. 9, 1994.

Murphy, 1979, U.S. Pat. No. 4,157,417 issued Jun. 5, 1979.

Murphy, 1979, U.S. Pat. No. 4,157,417 issued Jun. 5, 1979.

Nistering, 1991, U.S. Pat. No. 5,073,450 issued Dec. 17, 1991.

Oliver et al., 1987, U.S. Pat. No. 4,634,637 issued Jan. 6, 1987.

Perilloux et al., 1990, U.S. Pat. No. 4,896,928 issued Jan. 30, 1990.

Phillips et al., 1986, U.S. Pat. No. 4,565,719 issued Jan. 21, 1986.

Phillips et al., 1995, U.S. Pat. No. 5,424,119 issued Jun. 13, 1995.

Ploke, 1966, U.S. Pat. No. 3,279,317 issued Oct. 18, 1966.

R. D. Mathis Company, "Thin Film Evapoation Source Reference," R. D. Mathis Company, Long Beach, Calif., USA.

Rancourt et al., 1980, U.S. Pat. No. 4,229,066 issued Oct. 21, 1980.

Sato et al., 1984, U.S. Pat. No. 4,461,532 issued Jul. 24, 1984.

Schroder, 1954, U.S. Pat. No. 2,668,478 issued Feb. 9, 1954.

Theissen, 1972, U.S. Pat. No. 3,681,179 issued Aug. 1, 1972.

Thelen, 1996, "Design of a Hot Mirror: Contest Results," Optics, Vol. 35, No. 25, pp. 4966–4977.

Vincent et al., 1989, U.S. Pat. No. 4,853,264 issued Aug. 1, 1989.

Widdop et al., 1953, U.S. Pat. No. 2,624,238 issued Jan. 6, 1953.

Wildorf, 1976, U.S. Pat. No. 3,956,559 issued May 11, 1976.

Wolfe et al., 1990, U.S. Pat. No. 4,965,121 issued Jan. 23, 1990.

Wolfe et al., 1991, U.S. Pat. No. 5,047,131 issued Sep. 10, 1991.

Wolfe et al., 1996, U.S. Pat. No. 5,563,734 issued Oct. 8, 1996.

Woodard, 1993, U.S. Pat. No. 5,189,551 issued Feb. 23, 1993.

Yatabe et al., 1986, U.S. Pat. No. 4,590,118 issued May 20, 1986.

Yatabe et al., 1987, U.S. Pat. No. 4,639,069 issued Jan. 27, 1987.

Zycha, 1972, U.S. Pat. No. 3,697,153 issued Oct. 10, 1972.

What is claimed is:

1. A glazing assembly comprising:
(i) a glazing substrate having at least one face; and,
(ii) a thermal control film, juxtaposed adjacent said face, that does not substantially contribute to the accumulation of greenhouse heat in an enclosed space, further comprised of:
   (a) a thin flexible polymeric sheet having a first face and an opposite second face and a thickness of from 0.1 to 100 mils; and,
   (b) a multilayer coating adhered to said first face, said coating comprising two or more contiguous alternating layers of comparatively higher and lower index of refraction inorganic dielectric material, which coating has at least two or more layers independently having an optical thickness approximately equal to one quarter of an infrared wavelength, $\lambda_o$, between 750 and 2000 nm;
   said thermal control film characterized by an average transmittance of visible radiation of wavelength 380 to 750 nm at 0° incidence of at least 50%;
   said thermal control film further characterized by an average reflectance of infrared radiation in an infrared radiation band which is at least 100 nm wide and falls within the wavelength band 750 to 2000 nm, at 0° incidence, of at least 50%;
   said thermal control film further characterized by an average transmittance of infrared radiation of wavelength 7 to 10 microns at 0° incidence of at least 50%,
   wherein, said thermal control film is used in vehicular glazing or in architectural glazing and allows the transmittance through the film of a majority of the infrared radiation incident upon the thermal control film in the 7 to 20 micron wavelength region that is emitted by interior materials in the enclosed space.

2. A glazing assembly having thermal control film according to claim 1, wherein said multilayer coating comprises three or more contiguous alternating layers of comparatively higher and lower index of refraction inorganic dielectric material, which coating has at least three of more layers independently having an optical thickness approximately equal to one quarter of an infrared wavelength, $\lambda_o$, between 750 and 2000 nm.

3. A glazing assembly having a thermal control film according to claim 1, wherein said multilayer coating comprises two or more contiguous alternating layers of silica and titania of optical thickness approximately equal to one quarter of an infrared wavelength, $\lambda_o$, between 750 and 2000 nm.

4. A glazing assembly having a thermal control film according to claim 1, characterized by an average transmittance of visible radiation of wavelength 380 to 750 nm at 0° incidence of at it 60%.

5. A glazing assembly having a thermal control film according to claim 1, characterized by an average transmittance of visible radiating of wavelength 380 to 750 nm at 0° incidence of at least 70%.

6. A glazing assembly having a thermal control film according to claim 1, characterized by an average reflectance of infrared radiation in an infrared radiation band which is at least 100 nm wide and falls within the wavelength band 750 to 2000 nm, at 0° incidence, of at least 60%.

7. A glazing assembly having a thermal control film according to claim 1, characterized by an average reflectance of infrared radiation in an infrared radiation band which is at least 100 nm wide and falls within the wavelength band 750 to 2000 nm, at 0° incidence, of at least 70%.

8. A glazing assembly having a thermal control film according to claim 1, further comprising an adhesive layer.

9. A glazing assembly having a thermal control film according to claim 1, further comprising a protective layer.

10. A glazing assembly of claim 1, further comprising:
   a second glazing substrate having at least one face that is adhered to thermal control film on the side opposite that to which the first glazing substrate is adhered, sandwiching the thermal control film therebetween.

11. A method of making the glazing assembly of claim 1, comprising the steps of:
   (i) providing said glazing substrate having at least one face; and,
   (ii) adhering to said face said thermal control film.

12. A method of making the glazing assembly of claim 1, comprising the steps of:
   (i) providing said glazing substrate;
   (ii) providing a second glazing substrate; and,
   (iii) positioning between said first and second glazing substrates, and adhering to said first and second glazing substrates, said thermal control film.

13. A glazing assembly comprising:
   (i) a glazing substrate having at least one face; and,
   (ii) a thermal control film, juxtaposed adjacent said face, that does not substantially contribute to the accumulation of greenhouse heat in an enclosed space, further comprised of:
      (a) a thin flexible polymeric sheet having a first face and an opposite second face and a thickness of from 0.1 to 10 mils; and,
      (b) a first multilayer coating adhered to said first face, said coating comprising two or more contiguous alternating layers of comparatively higher and lower index of refraction inorganic dielectric material, which first coating has at least two or more layers independently having an optical thickness approximately equal to one quarter of a first infrared wavelength, $\lambda_1$ between 750 and 2000 nm;
      (c) a second multilayer coating adhered to said second face, said coating comprising two or more contiguous alternating layers of comparatively higher and lower index of refraction inorganic dielectric material, which second coating has at least two or more layers independently having an optical thickness approximately equal to one quarter of a second infrared wavelength, $\lambda_2$, between 750 and 2000 nm;
   said thermal control film characterized by an average transmittance of visible radiation of wavelength 380 to 750 nm at 0° incidence of at least 50%;
   said thermal control film further characterized by an average reflectance of infrared radiation in an infrared radiation band which is at least 100 nm wide and falls within the wavelength band of 750 to 2000 nm, at 0° incidence, of at least 50%;
   said thermal control film further characterized by an average transmittance of infrared radiation of wavelength 7 to 10 microns at 0° incidence of at least 50%,
   wherein, said thermal control film is used in vehicular glazing or in architectural glazing and allows the transmittance through the film of a majority of the infrared radiation incident upon the thermal control film in the 7 to 20 micron wavelength region that is emitted by interior materials in the enclosed space.

14. A glazing assembly having a thermal control film according to claim 13, wherein each of said first and second multilayer coatings comprises three or more contiguous alternating layers of comparatively higher and lower index of refraction inorganic dielectric material, which coatings have at least three or more layers independently having an optical thickness approximately equal to one quartet of an infrared wavelength, $\lambda_0$, between 750 and 2000 nm.

15. A glazing assembly having a thermal control film according to claim 13, wherein each of said first and second multilayer coatings comprises two or more contiguous alternating layers of silica and titania of optical thickness approximately equal to one quarter of an infrared wavelength, $\lambda_0$, between 750 and 2000 nm.

16. A glazing assembly having a thermal control film according to claim 13, characterized by an average transmittance of visible radiation of wavelength 380 to 750 nm at 0° incidence of at least 60%.

17. A glazing assembly having a thermal control film according to claim 13, characterized by an average transmittance of visible radiation of wavelength 380 to 750 nm at 0° incidence of at least 70%.

18. A glazing assembly having a thermal control film according to claim 13, characterized by an average reflectance of infrared radiation in an infrared radiation band which is at least 100 nm wide and falls within the wavelength band 750 to 2000 nm, at 0° incidence, of at least 60%.

19. A glazing assembly having a thermal control film according to claim 13, characterized by an average reflectance of infrared radiation in an infrared radiation band which is at least 100 nm wide and falls within the wavelength band 750 to 2000 nm, at 0° incidence, of at least 70%.

20. A glazing assembly having a thermal control film according to claim 13, wherein said first infrared wavelength and said second infrared wavelength differ by at least 100 nm.

21. A glazing assembly having a thermal control film according to claim 13, wherein said first infrared wavelength and said second infrared wavelength differ by at least 200 nm.

22. A glazing assembly having a thermal control film according to claim 13, wherein said first infrared wavelength and said second infrared wavelength differ by at least 100 nm; said first infrared wavelength is 1000±200 nm; and said second infrared wavelength is 1200±200 nm.

23. A glazing assembly having a thermal control film according to claim 13, further comprising an adhesive layer.

24. A glazing assembly having a thermal control film according to claim 13, further comprising a protective layer.

25. A glazing assembly of claim 13, further comprising:
   a second glazing substrate having at least one face that is adhered to the thermal control film on the side opposite that to which the first glazing substrate is adhered, sandwiching the thermal control film therebetween.

26. A glazing assembly of claim 13, further comprising:
   (i) a second glazing substrate; and,
   (ii) the thermal control film being positioned between said first and second glazing substrates, but separated from said first and second glazing substrates by a layer of a gas.

27. A method of making the glazing assembly of claim 13 comparing the steps of:
   (i) providing said glazing substrate having at least one face; and,
   (ii) adhering to said face said thermal control film.

28. A method of making the glazing assembly of claim 13 comprising the steps of:
   (i) providing sad glazing substrate;
   (ii) providing a second glazing substrate; and, (iii) positioning between said first and second glazing substrates, and adhering to said first and second glazing substrates, said thermal control film.

29. A method of making the glazing assembly of claim 13 comprising the steps of:
   (i) providing said glazing substrate;
   (ii) providing a second glazing substrate; and,
   (iii) positioning between said first and second glazing substrates said thermal control film, said thermal control film separated from said first and second glazing substrates by a layer of a gas.

30. A glazing assembly comprising:
   (i) a glazing substrate having at least one face; and,
   (ii) a composite thermal control film, juxtaposed adjacent to said face, that does not substantially contribute to the accumulation of greenhouse heat in an enclosed space, further comprised of:
      (i) a first thermal control film comprising:
         (a) a first thin flexible polymeric sheet having a first face and an opposite second face and a thickness of from 0.1 to 100 mils; and,
         (b) a first multilayer coating adhered to said first face of said first sheet, said coating comprising two or more contiguous alternating layers of comparatively higher and lower index of refraction inorganic dielectric material, which first coating has at least two or more layers independently having an optical thickness approximately equal to one quarter of a first infrared wavelength, $\lambda_1$, between 750 and 2000 nm;
      (ii) a second thermal control film comprising:
         (a) a second thin flexible polymeric sheet having a first face and an opposite second face and a thickness of from 0.1 to 100 mils; and,
         (b) a second multilayer coating adhered to said first face of said second sheet, said coating comprising two or more contiguous alternating layers of comparatively higher and lower index of refraction inorganic dielectric material, which second coating has at least two or more layers independently having an optical thickness approximately equal to one quarter of a second infrared wavelength, $\lambda_2$, between 750 and 2000 nm;
      wherein said first thermal control film is adhered to said second thermal control film;
      said composite thermal control film characterized by an average transmittance of visible radiation of wavelength 380 to 750 nm at 0° incidence of at least 50%;
      said thermal control film further characterized by an average reflectance of infrared radiation in an infrared radiation band which is at least 100 nm wide and falls within the wavelength band 750 to 2000 nm, at 0° incidence, of at least 50%;
      said thermal control film further characterized by an average transmittance of infrared radiation of wavelength 7 to 10 microns at 0° incidence of at least 50%,
      wherein said thermal control film is used in vehicular glazing or in architectural glazing and allows the transmittance through the film of a majority of the infrared radiation incident upon the thermal control film in the 7 to 20 micron wavelength region that is emitted by interior materials in the enclosed space.

31. A glazing assembly having a composite thermal control film according to claim 30, wherein said first thermal control film is adhered to said second thermal control film via a bonding or adhesive layer.

32. A glazing assembly having a composite thermal control film according to claim 30, wherein each of said first and second multilayer coatings comprises three or more contiguous alternating layers of comparatively higher and lower index of refraction inorganic dielectric material, which coatings have at least three or more layers independently having an optical thickness approximately equal to one quarter of an infrared wavelength, $\lambda_0$, between 750 and 2000 nm.

33. A glazing assembly having a composite thermal control film according to claim 30, wherein each of said first and second multilayer coatings comprises two or more contiguous alternating layers of silica and titania of optical thickness approximately equal to one quarter of an infrared wavelength, $\lambda_0$, between 750 and 2000 nm.

34. A glazing assembly having a composite thermal control film according to claim 30, characterized by an average transmittance of visible radiation of wavelength 380 to 750 nm at 0° incidence of at least 60%.

35. A glazing assembly having a composite thermal control film according to claim 30, characterized by an average transmittance of visible radiation of wavelength 380 to 750 nm at 0° incidence of at least 70%.

36. A glazing assembly having a composite thermal control film according to claim 30, characterized by an average reflectance of infrared radiation in an infrared radiation band which is at least 100 nm wide and falls within the wavelength band 750 to 2000 nm, at 0° incidence, of at least 60%.

37. A glazing assembly having a composite thermal control film according to claim 30, characterized by an average reflectance of infrared radiation in an infrared radiation band which is at least 100 nm wide and falls within the wavelength band 750 to 2000 nm, at 0° incidence, of at least 70%.

38. A glazing assembly having a composite thermal control film according to claim 30, wherein said first infrared wavelength and said second infrared wavelength differ by at least 100 nm.

39. A glazing assembly having a composite thermal control film according to claim 30, wherein said first infrared wavelength and second infrared wavelength differ by at least 100 nm; said first infrared wavelength is 1000±200 nm; and said second infrared wavelength is 1200±200 nm.

40. A glazing assembly according to claim 30, further comprising an adhesive layer.

41. A glazing assembly according to claim 30, further comprising a protective layer.

42. A glazing assembly of claim 30, further comprising:
   a second glazing substrate having at least one face that is adhered to the thermal control film on the side opposite that to which the first glazing substrate is adhered, sandwiching the thermal control film therebetween.

43. A glazing assembly of claim 30, further comprising:
   (i) a second glazing substrate; and,
   the thermal control film being positioned between said first and second glazing substrate, but separated from said first and second glazing substrates by a layer of a gas.

44. A method of making the glazing assembly of claim 30 comprising the steps of:
   (i) providing said glazing substrate having at least one face; and,
   (ii) adhering to said face said composite thermal control film.

45. A method of making the glazing assembly of claim 30 comprising the steps of:
   (i) providing said glazing substrate;
   (ii) providing a second glazing substrate; and,
   (iii) positioning between said first and second glazing substrates, and adhering to said first and second glazing substrates, said composite thermal control film.

46. A method of making the glazing assembly of claim 30 comprising the steps of:
(i) providing said glazing substrate;
(ii) providing a second glazing substrate; and,
(iii) positioning between said first and second glazing substrates said composite thermal control film, said thermal control film separated from said first and second glazing substrate by a layer of a gas.

47. A glazing assembly comprising:
(i) a glazing substrate having at least one face; and,
(ii) a thermal control film, juxtaposed adjacent said face, that does not substantially contribute to the accumulation of greenhouse heat in an enclosed space, further comprised of:
(a) a thin flexible polymeric sheet having a first face and an opposite second face and a thickness of from 0.1 to 100 mils; and,
(b) a first multilayer coating adhered to said first face, said coating comprising at least one layer of an inorganic dielectric material having an index of refraction, said at least one layer having an optical thickness approximately equal to one quarter of an infrared wavelength, $\lambda_1$, between 750 and 2000 nm;
(c) a second multilayer coating adhered to said second face, said coating comprising at least one layer of an inorganic dielectric material having an index of refraction, said at least one layer having an optical thickness approximately equal to one quarter of an infrared wavelength, $\lambda_2$, between 750 and 2000 nm, said thermal control film characterized by an average transmittance of visible radiation of wavelength 380 to 750 nm at 0° incidence of at least 50%;
said thermal control film further characterized by an average reflectance of infrared radiation in an infrared radiation band which is at least 100 nm wide and falls within the wavelength band of 750 to 2000 nm, at 0° incidence, of at least 50%;
said thermal control film further characterized by an average transmittance of infrared radiation of wavelength 7 to 10 microns at 0° incidence of at least 50%,
wherein said thermal control film is used in vehicular glazing or in architectural glazing and allows the transmittance through the film of a majority of the infrared radiation incident upon the thermal control film in the 7 to 20 micron wavelength region that is emitted by interior materials in the enclosed space.

48. A glazing assembly having a thermal control film according to claim 47, wherein said first infrared wavelength and said second infrared wavelength differ by at least 100 nm.

49. A glazing assembly having a thermal control film according to claim 47, wherein said first infrared wavelength and said second infrared wavelength differ by at least 200 nm.

50. A glazing assembly having a thermal control film according to claim 47, wherein said first infrared wavelength and said second infrared wavelength differ by at least 100 nm; said first infrared wavelength is 1000±200 nm; and said second infrared wavelength is 1200±200 nm.

51. A glazing assembly having a thermal control film according to claim 47, further comprising an adhesive layer.

52. A glazing assembly having a thermal control film according to claim 47, further comprising a protective layer.

53. A glazing assembly of claim 47, further comprising:
a second glazing substrate having at least one face that is adhered to the thermal control film on the side oppositive that to which the first glazing substrate is adhered sandwiching, the thermal control film therebetween.

54. A glazing assembly of claim 47, further comprising:
(i) a second glazing substrate; and,
the thermal control film being positioned between said first and second glazing substrates, but separated from said first and second glazing substrates by a layer of a gas.

55. A method of making the glazing assembly of claim 47, comprising the steps of:
(i) providing said glazing substrate having at least one face; and,
(ii) adhering to said face said thermal control film.

56. A method of making the glazing assembly of claim 47, comprising the steps of:
(i) providing said glazing substrate;
(ii) providing a second glazing substrate; and,
(iii) positioning between said first and second glazing substrates, and adhering to said first and second glazing substrates, said thermal control film.

57. A Method of making the glazing assembly of claim 47, comprising the steps of:
(i) providing said glazing substrate;
(ii) providing a second glazing substrate; and,
(ii) positioning between said first and second glazing substrates said thermal control film, said thermal control film separated from said first and second glazing substrates by a layer of a gas.

58. A glazing assembly used to at least partially enclose an enclosable space, the assembly comprising:
a substrate having at least one face; and
a film comprising a layer of dielectric material having an optical thickness about equal to ¼ of an infrared wavelength, fixed to the at least one face of the substrate, the film being effective to reduce heat accumulation within the enclosable space relative to a substantially similar enclosable space not including the film,
said film is characterized by an average transmittance of visible radiation of wavelength 380 to 750 nm at 0° incidence of at least 50%;
said film is further characterized by an average reflectance of infrared radiation in an infrared radiation band which is at least 100 nm wide and falls within the wavelength band 750 to 2000 nm, at 0° incidence, of at least 50%;
said thermal control film further characterized by an average transmittance of infrared radiation of wavelength 7 to 10 micron at 0° incidence of at least 50%.

59. The assembly of claim 58 which is substantially optically clear.

60. The assembly of claim 58 wherein the film comprises a plurality of layers of at least two different dielectric materials having comparatively higher and lower indices of refraction.

61. The assembly of claim 58 wherein the at least two different layers of dielectric material have indices of refraction which differ from each other by at least 0.2.

62. The assembly of claim 58 wherein the film comprises contiguous, alternating layers of at least two different dielectric materials having comparatively higher and lower indices of refraction.

63. The assembly of claims 58 wherein the substrate comprises a flexible substrate.

64. The assembly of claim 58 wherein said film is effective to control temperature within the enclosable space.

* * * * *